US009467599B2

(12) United States Patent
Hosaka et al.

(10) Patent No.: US 9,467,599 B2
(45) Date of Patent: Oct. 11, 2016

(54) VIDEO PROCESSING METHOD, VIDEO PROCESSING CIRCUIT, LIQUID CRYSTAL DISPLAY, AND ELECTRONIC APPARATUS

(75) Inventors: Hiroyuki Hosaka, Matsumoto (JP); Taku Kitagawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 172 days.

(21) Appl. No.: 13/704,310

(22) PCT Filed: Jan. 19, 2012

(86) PCT No.: PCT/JP2012/000315
§ 371 (c)(1),
(2), (4) Date: Dec. 14, 2012

(87) PCT Pub. No.: WO2012/101990
PCT Pub. Date: Aug. 2, 2012

(65) Prior Publication Data
US 2013/0083244 A1    Apr. 4, 2013

(30) Foreign Application Priority Data

Jan. 27, 2011    (JP) ................. 2011-015578

(51) Int. Cl.
*G09G 3/36* (2006.01)
*H04N 5/14* (2006.01)

(52) U.S. Cl.
CPC .............. *H04N 5/14* (2013.01); *G09G 3/3648* (2013.01); *G09G 2320/0209* (2013.01); *G09G 2320/0257* (2013.01); *G09G 2320/0261* (2013.01); *G09G 2320/103* (2013.01); *G09G 2340/16* (2013.01)

(58) Field of Classification Search
CPC ................. G09G 3/36; G09G 3/3648; G09G 2320/0209; G09G 2320/0242; G09G 2320/0257; G09G 2320/0261; G09G 2320/0271; G09G 2320/0295; G09G 2320/103; G09G 2340/16; G09G 3/3548; H04N 5/14
USPC .................. 345/690, 210, 87, 89, 94, 95
See application file for complete search history.

(56) References Cited

U.S. PATENT DOCUMENTS

| 2002/0097207 | A1 | 7/2002 | Pfeiffer et al. |
| 2008/0018630 | A1 | 1/2008 | Fujino |
| 2009/0073192 | A1* | 3/2009 | Kobayashi ........... G09G 3/3614 345/643 |

(Continued)

FOREIGN PATENT DOCUMENTS

| JP | 06-034965 A | 2/1994 |
| JP | 2009-069608 A | 4/2009 |

(Continued)

*Primary Examiner* — Andrew Sasinowski
*Assistant Examiner* — Brent D Castiaux
(74) *Attorney, Agent, or Firm* — Maschoff Brennan

(57) ABSTRACT

A video processing circuit detects a risk boundary, which a portion of the boundary between a dark pixel and a bright pixel in an image represented by a video signal Vid-in, and is determined by a tilt azimuth of liquid crystal molecules, from the boundary, and corrects a video signal corresponding to at least one of the dark pixel and the bright pixel which is contiguous to the detected risk boundary in at least one field of a plurality of fields constituting one frame such that a period in which the risk boundary is present in one frame period is shortened.

13 Claims, 36 Drawing Sheets

(56) References Cited

U.S. PATENT DOCUMENTS

| | | | |
|---|---|---|---|
| 2009/0243983 A1* | 10/2009 | Ohashi | G09G 3/2011 345/89 |
| 2010/0207934 A1* | 8/2010 | Kato | G09G 3/3648 345/214 |
| 2011/0051006 A1 | 3/2011 | Iisaka et al. | |
| 2011/0051007 A1 | 3/2011 | Hosaka et al. | |
| 2011/0109815 A1 | 5/2011 | Hosaka et al. | |
| 2011/0176071 A1 | 7/2011 | Iisaka et al. | |
| 2011/0181795 A1 | 7/2011 | Hosaka et al. | |
| 2011/0205207 A1 | 8/2011 | Hosaka et al. | |
| 2011/0205208 A1 | 8/2011 | Iisaka et al. | |
| 2011/0205439 A1 | 8/2011 | Iisaka et al. | |
| 2011/0205440 A1 | 8/2011 | Hosaka et al. | |
| 2011/0205452 A1 | 8/2011 | Hosaka et al. | |
| 2011/0205479 A1 | 8/2011 | Hosaka et al. | |

FOREIGN PATENT DOCUMENTS

| | | |
|---|---|---|
| JP | 2009-237366 A | 10/2009 |
| JP | 2010-204515 A | 9/2010 |
| JP | 2011-053390 A | 3/2011 |
| JP | 2011-053417 A | 3/2011 |
| JP | 2011-107174 A | 6/2011 |
| JP | 2011-107497 A | 6/2011 |
| JP | 2011-145501 A | 7/2011 |
| JP | 2011-150223 A | 8/2011 |
| JP | 2011-170235 A | 9/2011 |
| JP | 2011-170236 A | 9/2011 |
| JP | 2011-175136 A | 9/2011 |
| JP | 2011-175137 A | 9/2011 |
| JP | 2011-175199 A | 9/2011 |
| JP | 2011-175200 A | 9/2011 |

* cited by examiner

Fig. 6
(a) VA
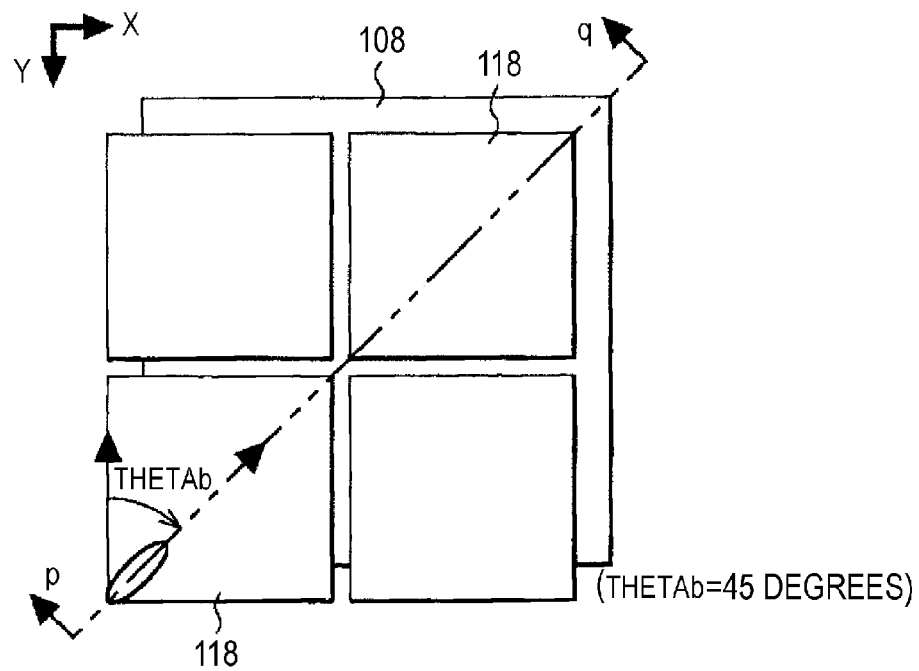
(THETAb=45 DEGREES)
(b)
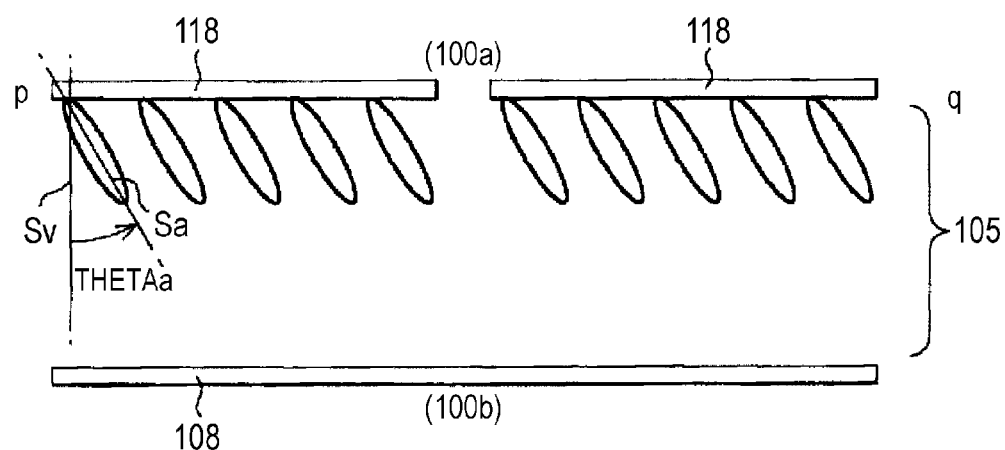

Fig. 10
(a)
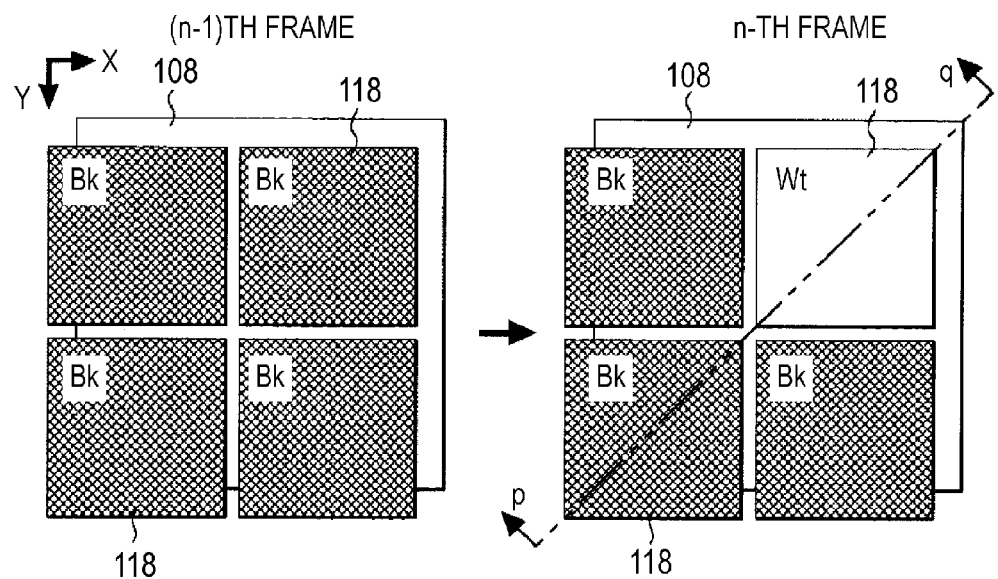
(b)
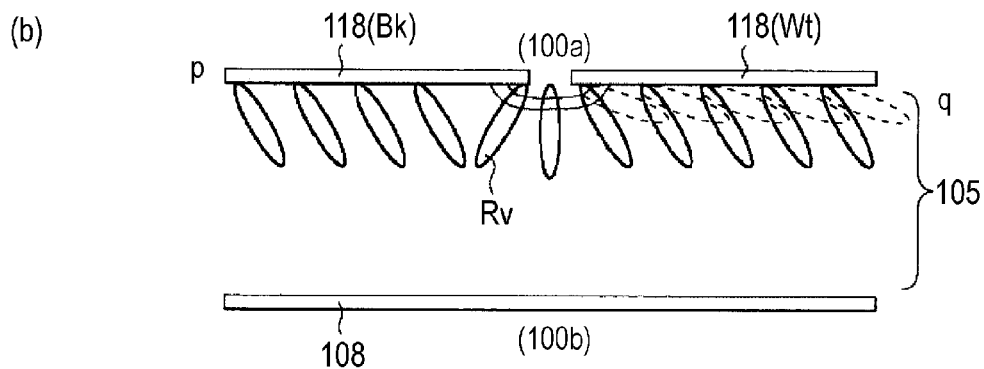
(c)
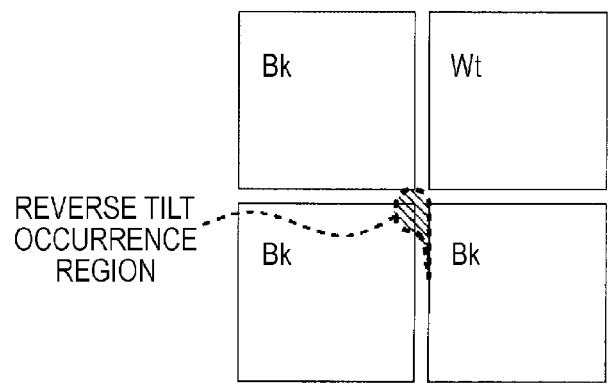

Fig. 12
(1) VIDEO SIGNAL (BEFORE PROCESSING)
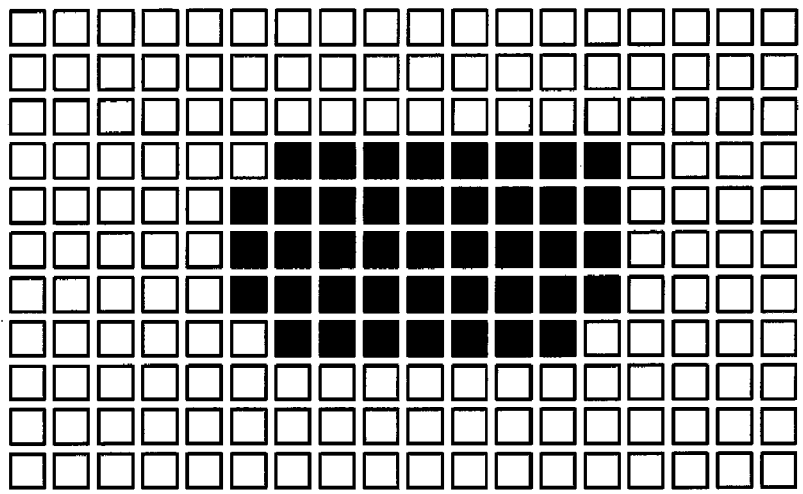
(2) BOUNDARY DETECTION    BOUNDARY
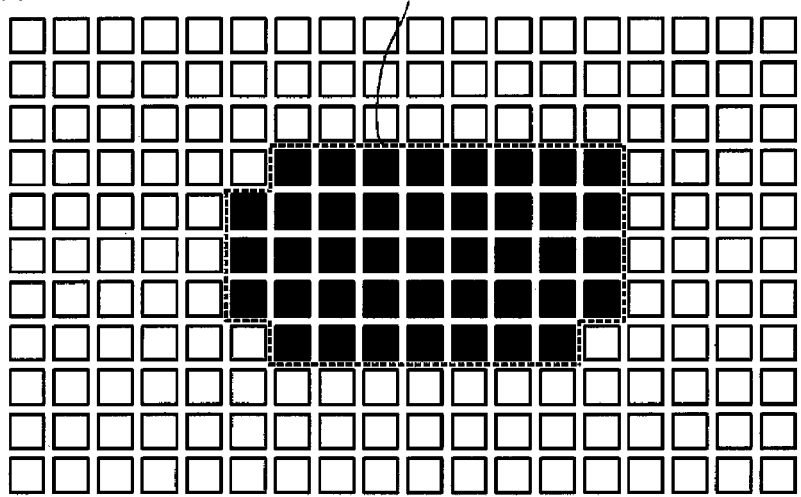
(3) RISK BOUNDARY    RISK BOUNDARY
    DETECTION
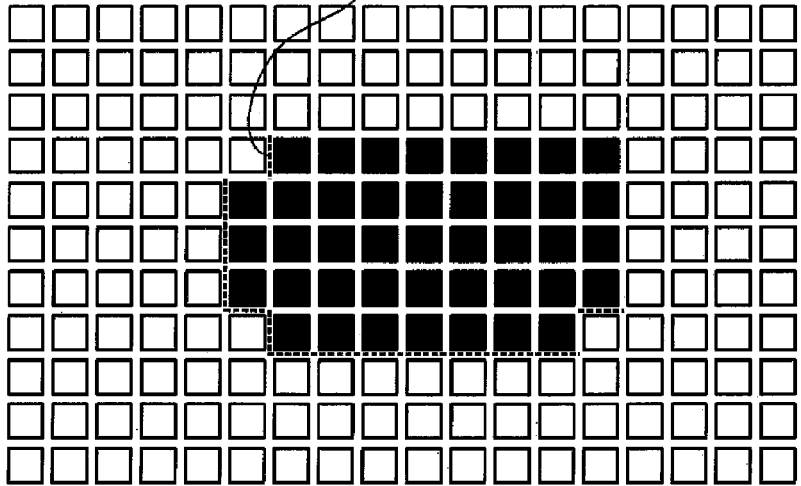

Fig. 13
(a) CORRECTION PROCESS (LOW-POTENTIAL 1 PIXEL, THETAb=45 DEGREES)
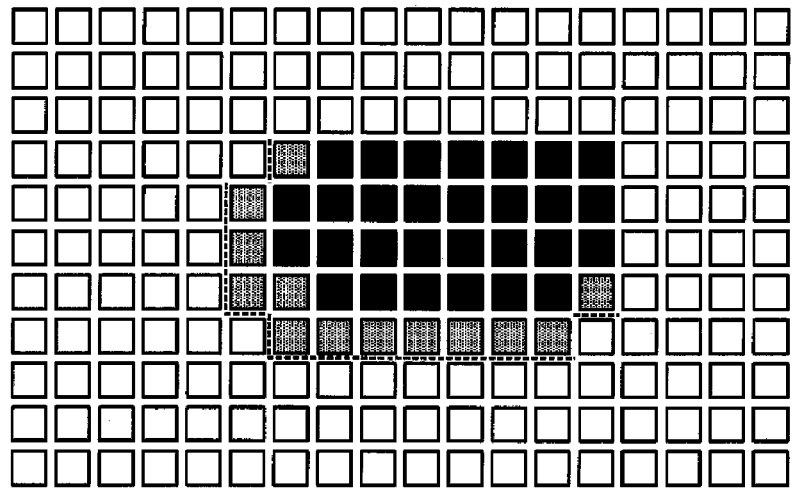
(b) CORRECTION PROCESS (LOW-POTENTIAL 1 PIXEL, THETAb=90 DEGREES)
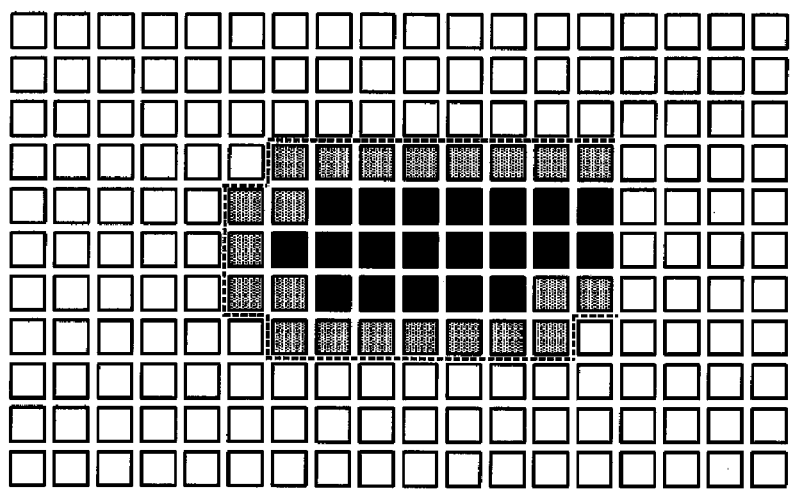
(c) CORRECTION PROCESS (LOW-POTENTIAL 1 PIXEL, THETAb=225 DEGREES)
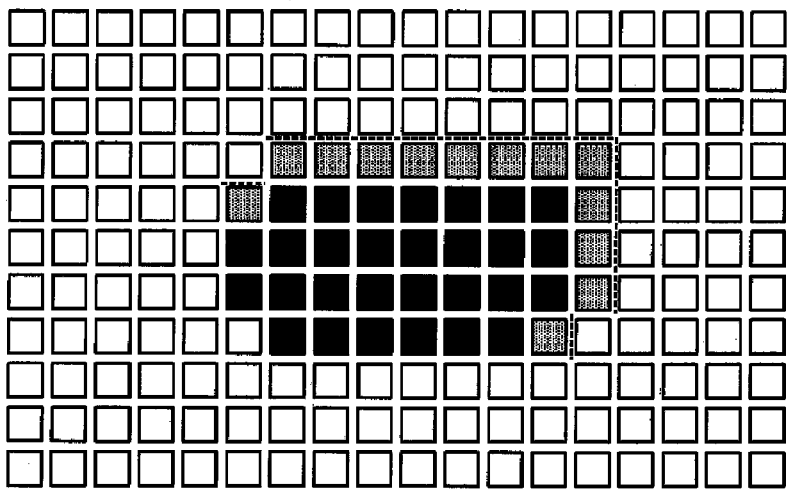

Fig. 14
(a)
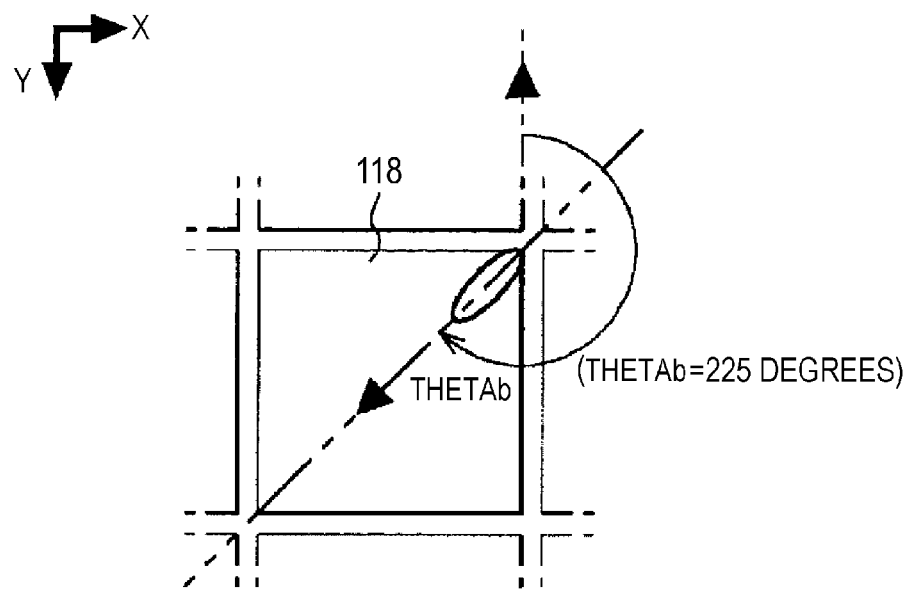
(b)
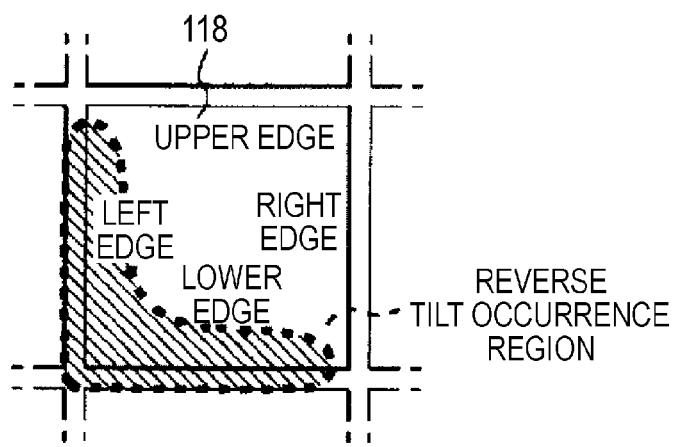

Fig. 15
(a)
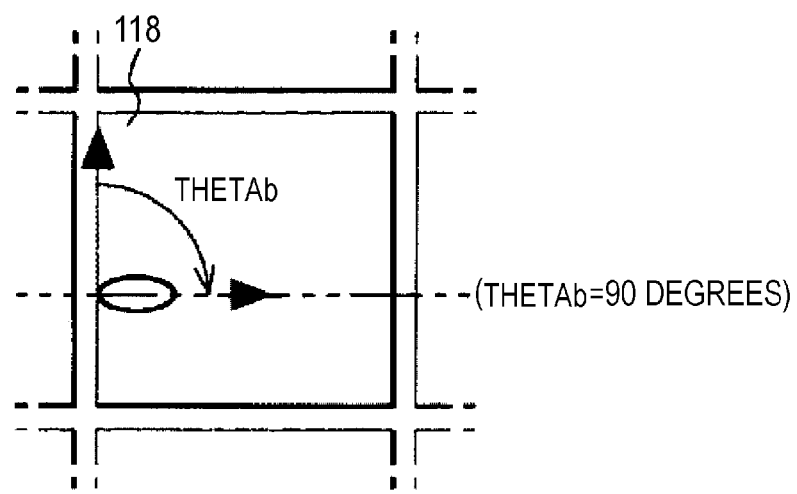
(b)
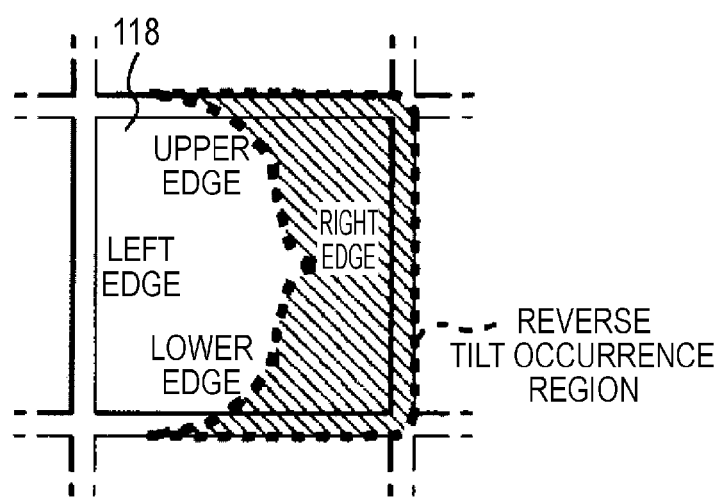

Fig. 18
(a) CORRECTION PROCESS (LOW-POTENTIAL 2 PIXELS, THETAb=45 DEGREES)
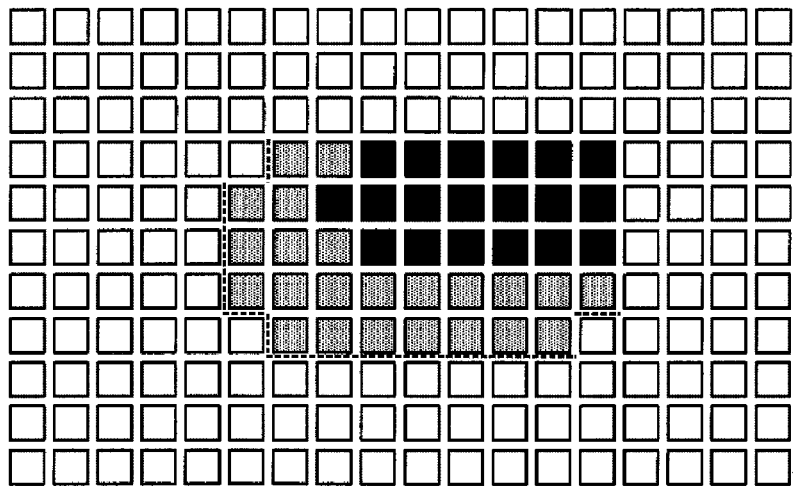
(b) CORRECTION PROCESS (LOW-POTENTIAL 2 PIXELS, THETAb=90 DEGREES)
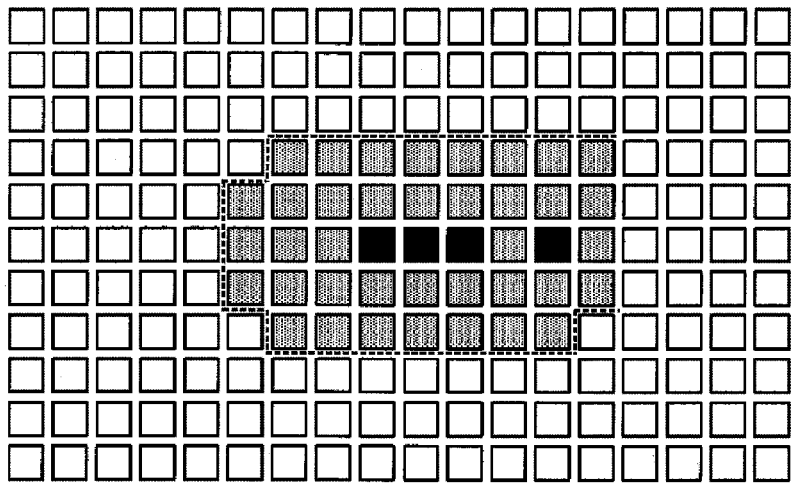
(c) CORRECTION PROCESS (LOW-POTENTIAL 2 PIXELS, THETAb=225 DEGREES)
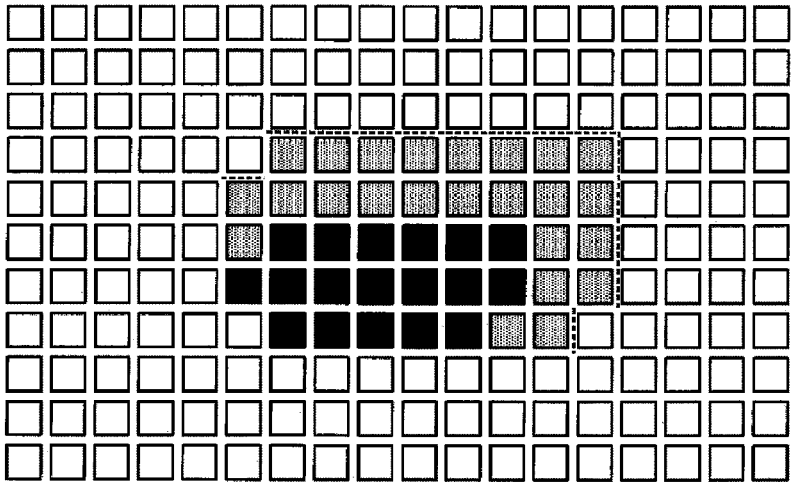

Fig. 20
(a) CORRECTION PROCESS (HIGH-POTENTIAL 1 PIXEL, THETAb=45 DEGREES)
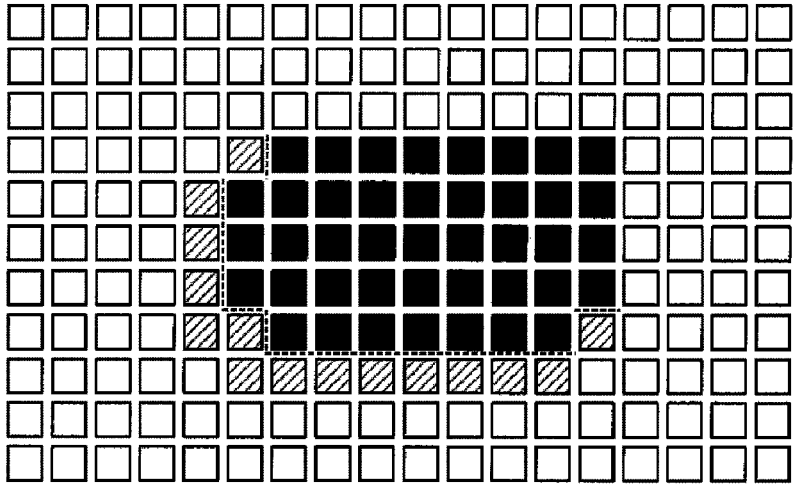
(b) CORRECTION PROCESS (HIGH-POTENTIAL 1 PIXEL, THETAb=90 DEGREES)
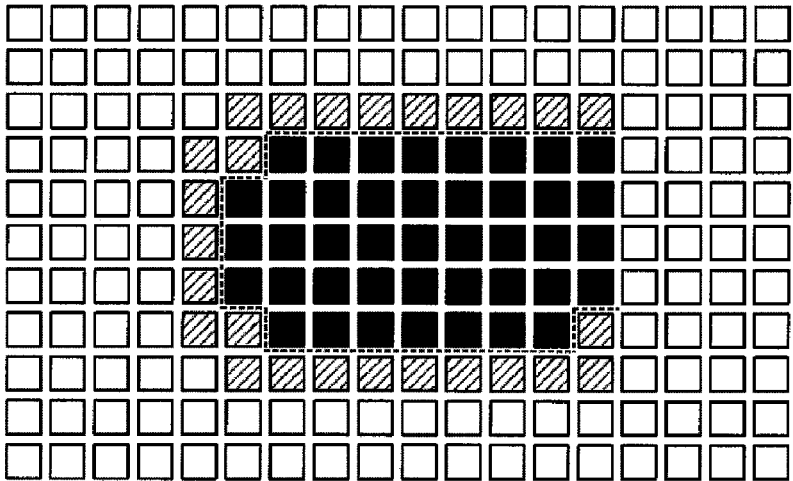
(c) CORRECTION PROCESS (HIGH-POTENTIAL 1 PIXEL, THETAb=225 DEGREES)
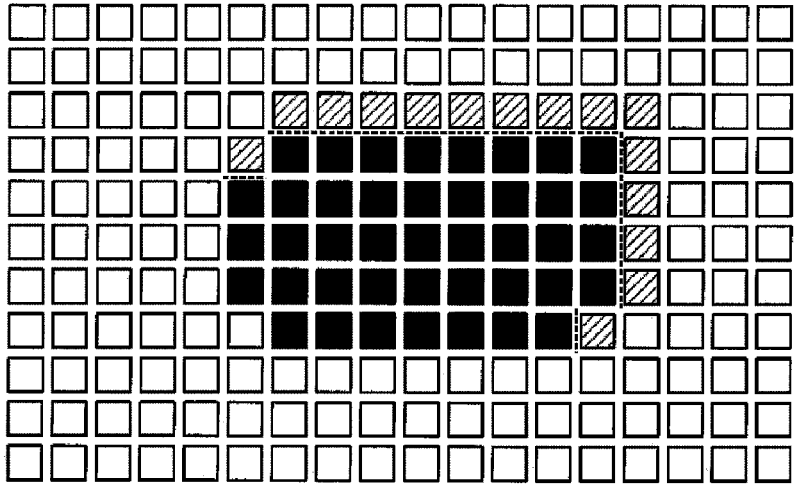

Fig. 22
(a) CORRECTION PROCESS (HIGH-POTENTIAL 2 PIXELS, THETAb=45 DEGREES)
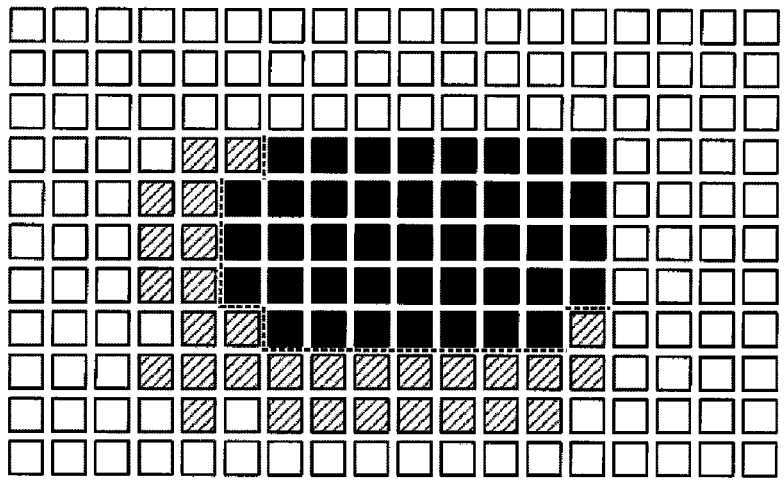
(b) CORRECTION PROCESS (HIGH-POTENTIAL 2 PIXELS, THETAb=90 DEGREES)
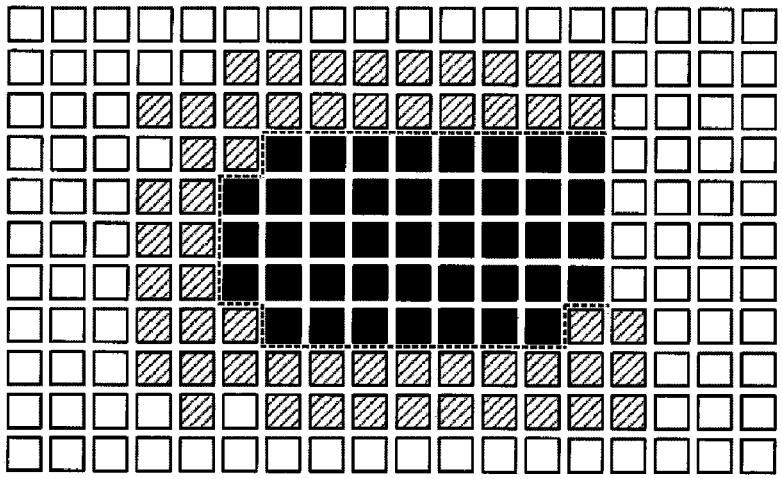
(c) CORRECTION PROCESS (HIGH-POTENTIAL 2 PIXELS, THETAb=225 DEGREES)
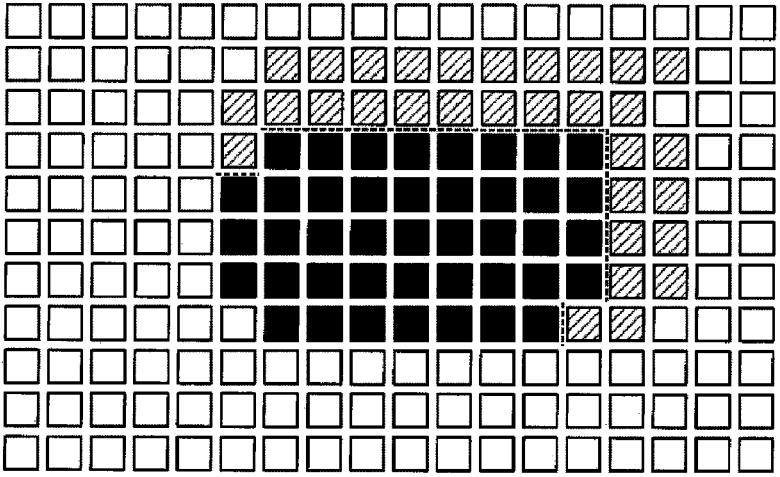

Fig. 24
(a) CORRECTION PROCESS (LOW+HIGH-POTENTIAL 2 PIXELS, THETAb=45 DEGREES)
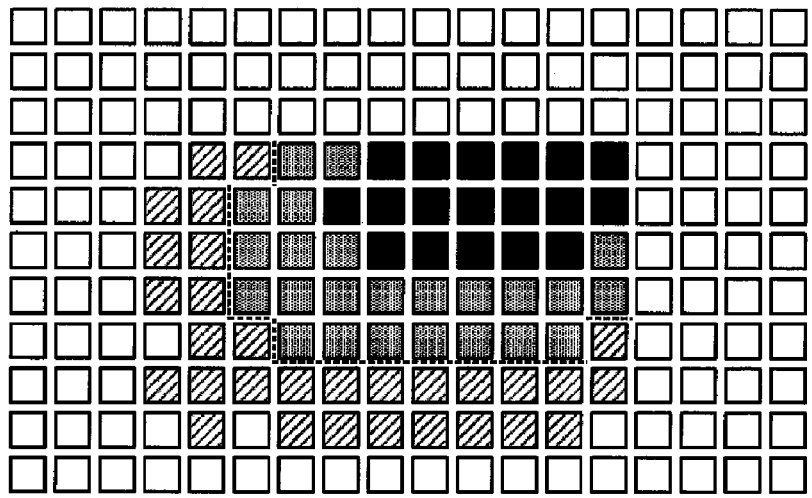
(b) CORRECTION PROCESS (LOW+HIGH-POTENTIAL 2 PIXELS, THETAb=90 DEGREES)
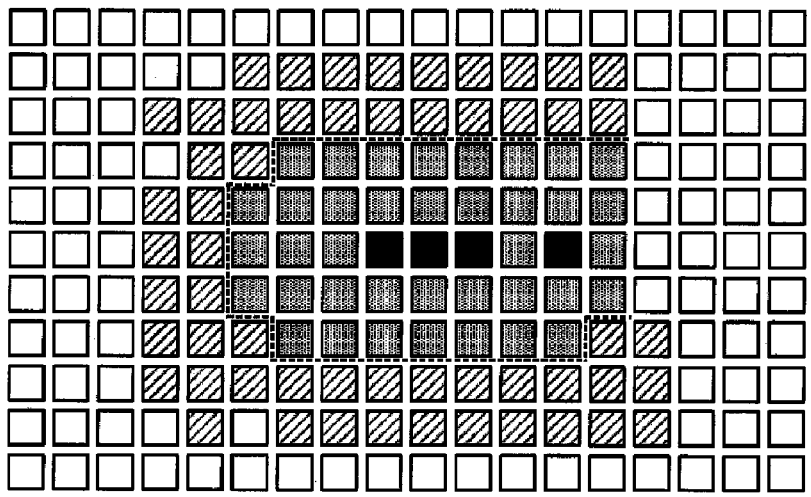
(c) CORRECTION PROCESS (LOW+HIGH-POTENTIAL 2 PIXELS, THETAb=225 DEGREES)
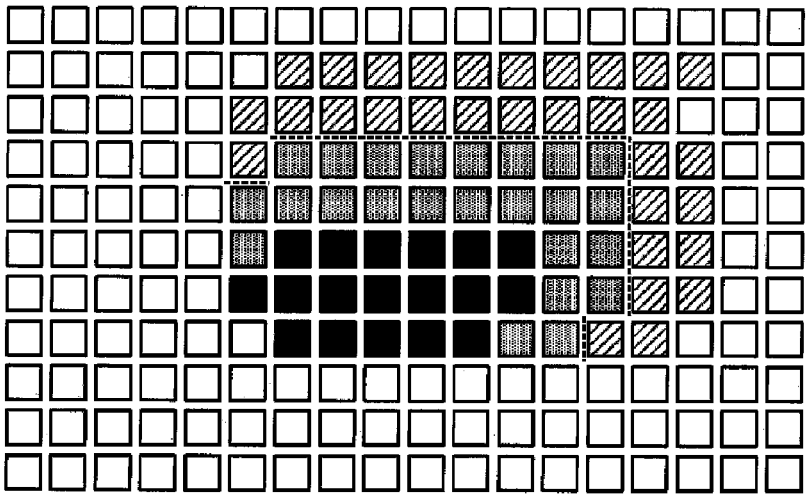

Fig. 27
(a) CORRECTION PROCESS (LOW+HIGH-POTENTIAL 2 PIXELS, THETAb=45 DEGREES)
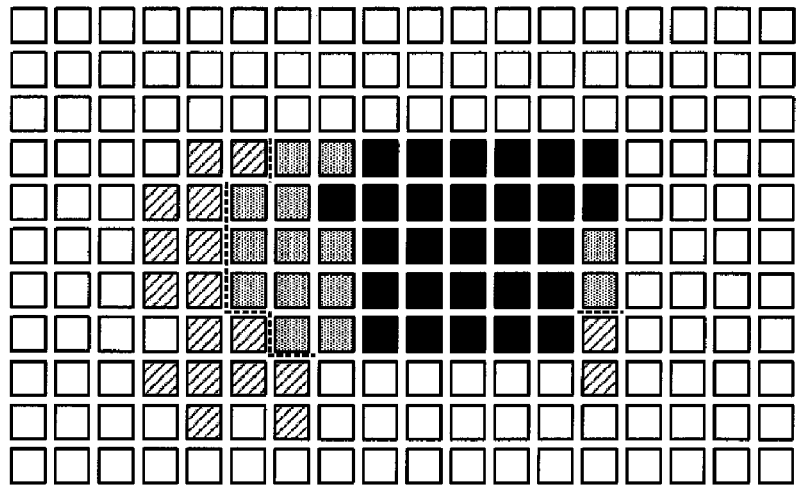
(b) CORRECTION PROCESS (LOW+HIGH-POTENTIAL 2 PIXELS, THETAb=90 DEGREES)
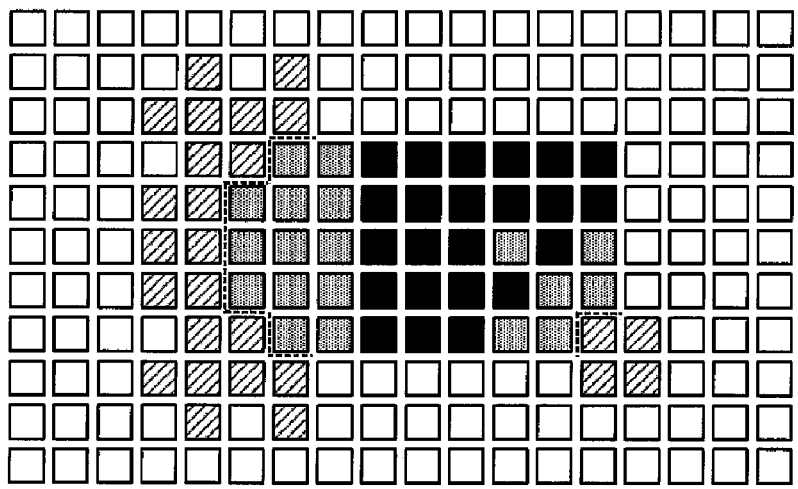
(c) CORRECTION PROCESS (LOW+HIGH-POTENTIAL 2 PIXELS, THETAb=225 DEGREES)
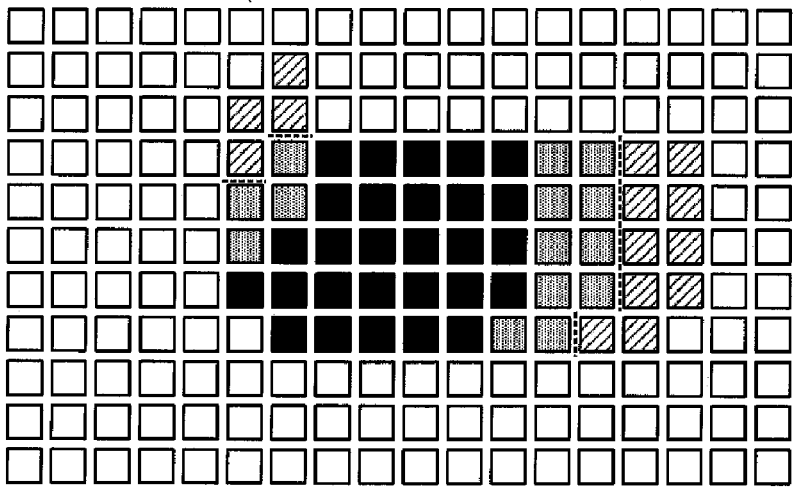

Fig. 31
(a) TN
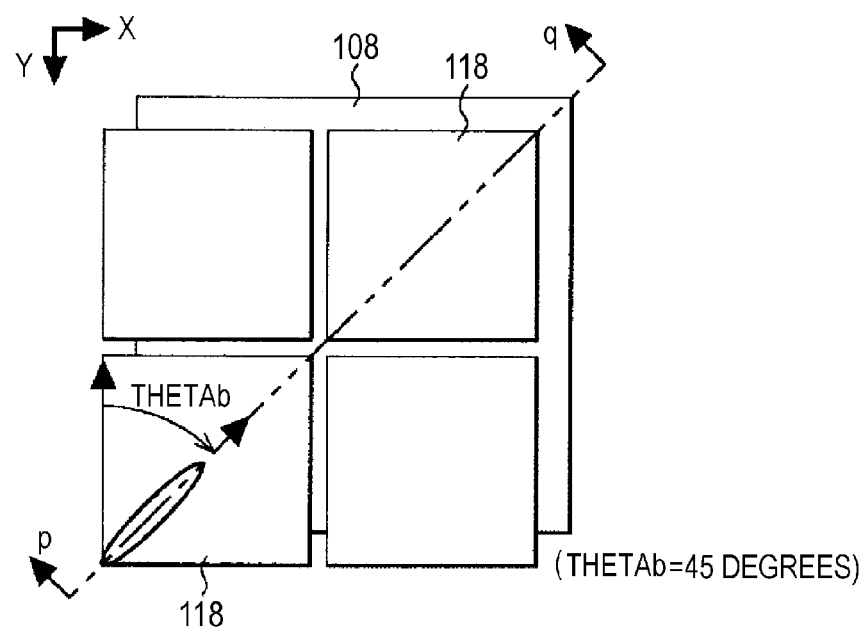
(THETAb=45 DEGREES)
(b)
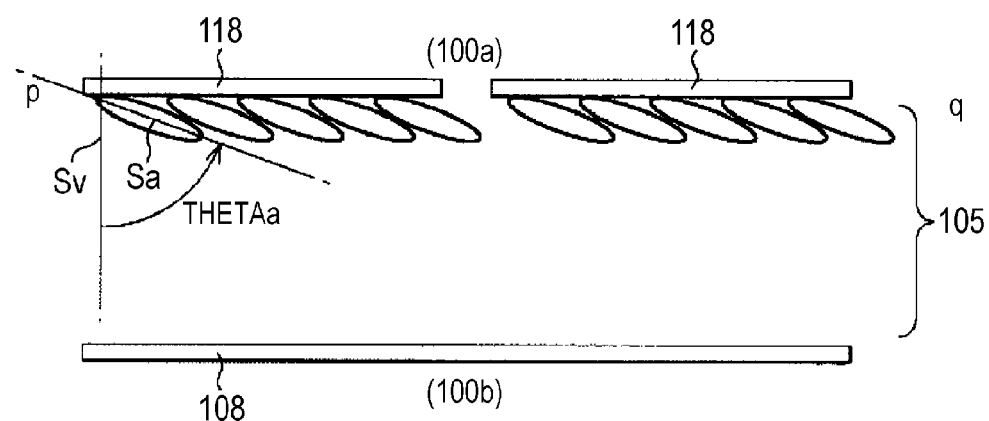

Fig. 32
(a)
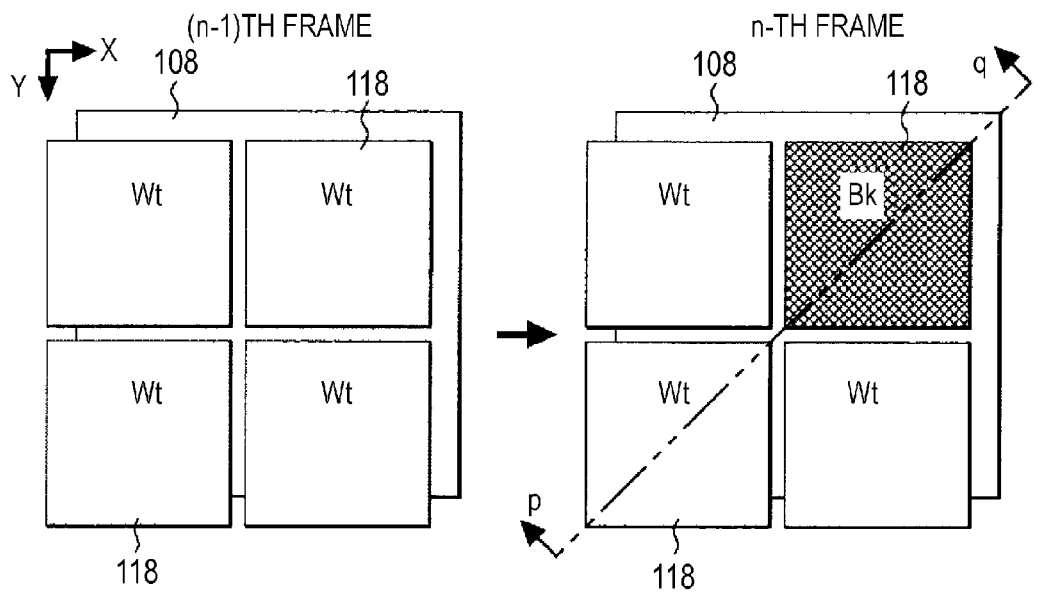
(b)
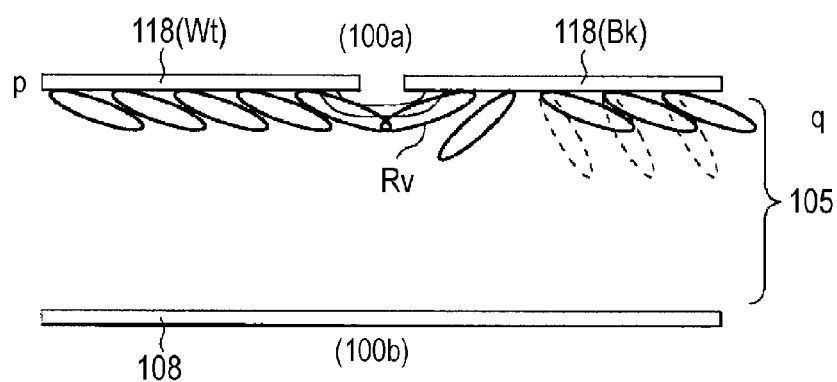
(c)
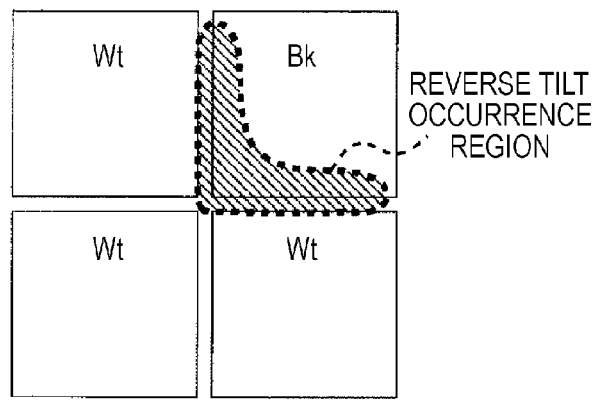

VIDEO PROCESSING METHOD, VIDEO PROCESSING CIRCUIT, LIQUID CRYSTAL DISPLAY, AND ELECTRONIC APPARATUS

TECHNICAL FIELD

The present invention relates to a technique for reducing display defects in a liquid crystal panel.

BACKGROUND ART

A liquid crystal panel has a configuration in which liquid crystal is interposed between a pair of substrates arranged at a given gap. Specifically, the liquid crystal panel has a configuration in which one substrate has pixel electrodes arranged in a matrix to correspond to pixels, another substrate has a common electrode in common for the pixels, and liquid crystal is interposed between the pixel electrodes and the common electrode. If a voltage according to a gray-scale level is applied and held between the pixel electrodes and the common electrode, the alignment state of liquid crystal is defined for each pixel, thereby controlling transmittance or reflectance. Accordingly, in the above-described configuration, it can be said that, of the electric field acting on the liquid crystal molecules, only a component in a direction from the pixel electrode toward the common electrode (or the opposite direction), that is, a component in a direction perpendicular to the substrate surface (vertical direction) contributes to display control.

On the other hand, in recent years, if a pixel pitch is narrowed for reduction in size and higher resolution, an electric field is generated between adjacent pixel electrodes, that is, an electric field in a direction parallel to the substrate surface (lateral direction) is generated, and the influence thereof is becoming non-negligible. For example, if a lateral electric field is applied to liquid crystal which should be driven by a vertical electric field as in the VA (Vertical Alignment) mode, the TN (Twisted Nematic) mode, or the like, an alignment defect of liquid crystal (that is, reverse tilt domain) occurs, causing a display defect.

In order to reduce the influence of the reverse tilt domain, a technique for devising the structure of a liquid crystal panel by, for example, defining a light shielding layer (opening) according to the shape of a pixel electrode (for example, see PTL 1) has been proposed. A technique for clipping a video signal having a set value or more on the basis of the determination that a reverse tilt domain is generated when an average luminance value calculated from a video signal is equal to or smaller than a threshold value (for example, see PTL 2), a technique for improving defective image quality by applying a correction voltage to a pixel where the phenomenon occurs for defective image quality due to a lateral electric field in a matrix driving display device (for example, see PTL 3), or the like has been also proposed.

CITATION LIST

Patent Literature

PTL 1: JP-A-6-34965 (FIG. 1)
PTL 2: JP-A-2009-69608 (FIG. 2)
PTL 3: JP-A-2009-237366 (FIG. 14)

SUMMARY OF INVENTION

Technical Problem

However, the technique for reducing the reverse tilt domain with the structure of the liquid crystal panel described in PTL 1 has such drawbacks that the aperture ratio is likely to decrease, and that the technique may not be applied to an existing liquid crystal panel which has been manufactured without devising the structure. The technique for clipping a video signal having a set value or more described in PTL 2 has such a drawback that the brightness of an image to be displayed is limited to the set value. The technique described in PTL 3 requires a process procedure in which a potential difference between video signals input to two adjacent pixels in the same frame period is detected, when there is the potential difference between input video signals to two adjacent pixels, a correction-target pixel is selected on the basis of the potential difference between the two pixels, a scanning direction, and the deposition direction of an alignment film, and a driving voltage is corrected with a correction amount based on the potential difference between the two pixels and the potential of the input video signal corresponding of the correction-target pixel.

Solution to Problem

An advantage of some aspects of the invention is to provide a technique for reducing a reverse tilt domain while eliminating these drawbacks.

An aspect of the invention is directed to a video processing method which corrects an input video signal specifying a voltage to be applied to a liquid crystal element for each pixel and defines the voltage to be applied to the liquid crystal element on the basis of the corrected video signal. The method includes a risk boundary detection step of detecting a risk boundary which is a portion of the boundary between a first pixel whose applied voltage specified by an input video signal falls below a first voltage and a second pixel whose applied voltage exceeds a second voltage higher than the first voltage, and is determined by a tilt azimuth of the liquid crystal, and a correction step of correcting a video signal, which specifies a voltage to be applied to a liquid crystal element corresponding to at least one of the first and second pixels contiguous to the risk boundary detected in the risk boundary detection step, in at least one field of a plurality of fields constituting one frame such that a period in which the risk boundary is present in one frame period is shortened.

According to the aspect of the invention, the period, in which the risk boundary is present at the same position, in one frame period is shortened, and the stabilization of the defective alignment state of the liquid crystal molecules is suppressed, making it possible to prevent the occurrence of a display defect due to a reverse tilt domain. Since it is not necessary to change the structure of the liquid crystal panel having the liquid crystal elements, there is no case where the aperture ratio decreases, and the invention can be applied to a liquid crystal panel which has been manufactured without devising the structure. Since a correction-target pixel is determined under the condition that a pixel is adjacent to the risk boundary, the correction-target pixel is easily identified, and the correction value of a video signal to be used can be selected in a wide range.

In the video processing method according to the aspect of the invention, in the correction step, a video signal which specifies a voltage to be applied to a liquid crystal element corresponding to the first pixel contiguous to the risk boundary detected in the risk boundary detection step or liquid crystal elements corresponding to r (where r is an integer of 2 or more) continuous first pixels on an opposite side of the risk boundary from the first pixel may be corrected to a video signal which specifies the first voltage or higher in any field.

According to this configuration, since the voltage to be applied to the liquid crystal element corresponding to the first pixel is corrected from the voltage corresponding to the gray-scale level specified by the video signal and is corrected to the first voltage or higher, there is no case where the brightness of an image to be displayed is limited to the set value.

In the video processing method according to the aspect of the invention, in the correction step, a video signal corresponding to the first pixel as a correction target may be corrected to a video signal of the maximum gray-scale level.

According to this configuration, it is possible to make a user unlikely to perceive a change in an image to be displayed in accordance with the input video signal.

In the video processing method according to the aspect of the invention, in the correction step, a video signal which specifies a voltage to be applied to a liquid crystal element corresponding to the second pixel contiguous to the risk boundary detected in the risk boundary detection step or liquid crystal elements corresponding to s (where s is an integer of 2 or more) continuous second pixels on an opposite side of the risk boundary from the second pixel may be corrected to a video signal which specifies the second voltage or lower in any field.

According to this configuration, since the voltage to be applied to the liquid crystal element corresponding to the second pixel is corrected from the voltage corresponding to the gray-scale level specified by the video signal to the second voltage or lower, there is no case where the brightness of an image to be displayed is limited to the set value.

In the video processing method according to the aspect of the invention, in the correction step, a video signal corresponding to the second pixel as a correction target may be corrected to a video signal of the minimum gray-scale level.

According to this configuration, it is possible to make a user unlikely to perceive a change in an image to be displayed in accordance with the input video signal.

In the video processing method according to the aspect of the invention, in the correction step, a video signal which specifies a voltage to be applied to a liquid crystal element corresponding to the first pixel contiguous to the risk boundary detected in the risk boundary detection step or liquid crystal elements corresponding to r (where r is an integer of 2 or more) continuous first pixels on an opposite side of the risk boundary from the first pixel may be corrected to a video signal which specifies the first voltage or higher in any field, and a video signal which specifies a voltage to be applied to a liquid crystal element corresponding to the second pixel contiguous to the detected risk boundary or liquid crystal elements corresponding to s (where s is an integer of 2 or more) continuous second pixels on an opposite side of the risk boundary from the second pixel may be corrected to a video signal which specifies the second voltage or lower in the field.

According to this configuration, the effect of suppressing a reverse tilt domain increases compared to a case when one of a bright pixel and a dark pixel is a correction target.

The video processing method according to the aspect of the invention may further include a movement detection step of detecting a boundary, which changes from a previous frame one frame before a current frame to the current frame, from among the boundaries between the first pixel and the second pixel. In the correction step, the video signal corresponding to a correction-target pixel determined by the risk boundary detected in the risk boundary detection step in the boundary detected in the movement detection step may be corrected.

According to this configuration, it is possible to correct a video signal focusing on a place where a reverse tilt domain is more likely to occur.

In the aspect of the invention, in the correction step, the video signal corresponding to a correction-target pixel determined by the risk boundary moved pixel by pixel from a previous frame to a current frame in the boundary detected in the movement detection step may be corrected.

According to this configuration, it is possible to suppress a change in the input video signal by correcting the video signal focusing on a place where it is susceptible to a reverse tilt domain and tailing phenomenon is noticeable.

In the aspect of the invention, in the correction step, the video signal corresponding to a correction-target pixel may not be corrected in any field of a plurality of fields.

According to this configuration, it is possible to suppress a change in an image due to the correction of the video signal.

In the aspect of the invention, in the correction step, the video signal corresponding to a correction-target pixel may be corrected for each of a plurality of fields.

According to this configuration, even when the video signal is corrected in all of the fields constituting one frame, it is possible to suppress a reverse tilt domain.

Other aspects of the invention can be conceptualized as, in addition to the video processing method, a video processing circuit, a liquid crystal display, and an electronic apparatus including the liquid crystal display.

BRIEF DESCRIPTION OF DRAWINGS

FIG. 6 illustrates explanatory views of initial alignment when a VA mode is used in the liquid crystal panel.

FIG. 10 illustrates explanatory views of reverse tilt which occurs in the liquid crystal panel.

FIG. 12 illustrates explanatory views of a risk boundary detection procedure in the video processing circuit.

FIG. 13 illustrates diagrams showing a correction process in the video processing circuit.

FIG. 14 illustrates diagrams showing when another tilt azimuth angle is set in the liquid crystal panel.

FIG. 15 illustrates diagrams showing when another tilt azimuth angle is set in the liquid crystal panel.

FIG. 18 illustrates diagrams showing a correction process in the video processing circuit.

FIG. 20 illustrates diagrams showing a correction process in the video processing circuit.

FIG. 22 illustrates diagrams showing a correction process in the video processing circuit.

FIG. 24 illustrates diagrams showing a correction process in the video processing circuit.

FIG. 27 illustrates diagrams showing a correction process in the video processing circuit.

FIG. 31 illustrates explanatory views of initial alignment when a TN mode is used in the liquid crystal panel.

FIG. 32 illustrates explanatory views of reverse tilt which occurs in the liquid crystal panel.

DESCRIPTION OF EMBODIMENTS

First Embodiment

Hereinafter, embodiments of the invention will be described with reference to the drawings.

First, a first embodiment of the invention will be described.

Figure 1:
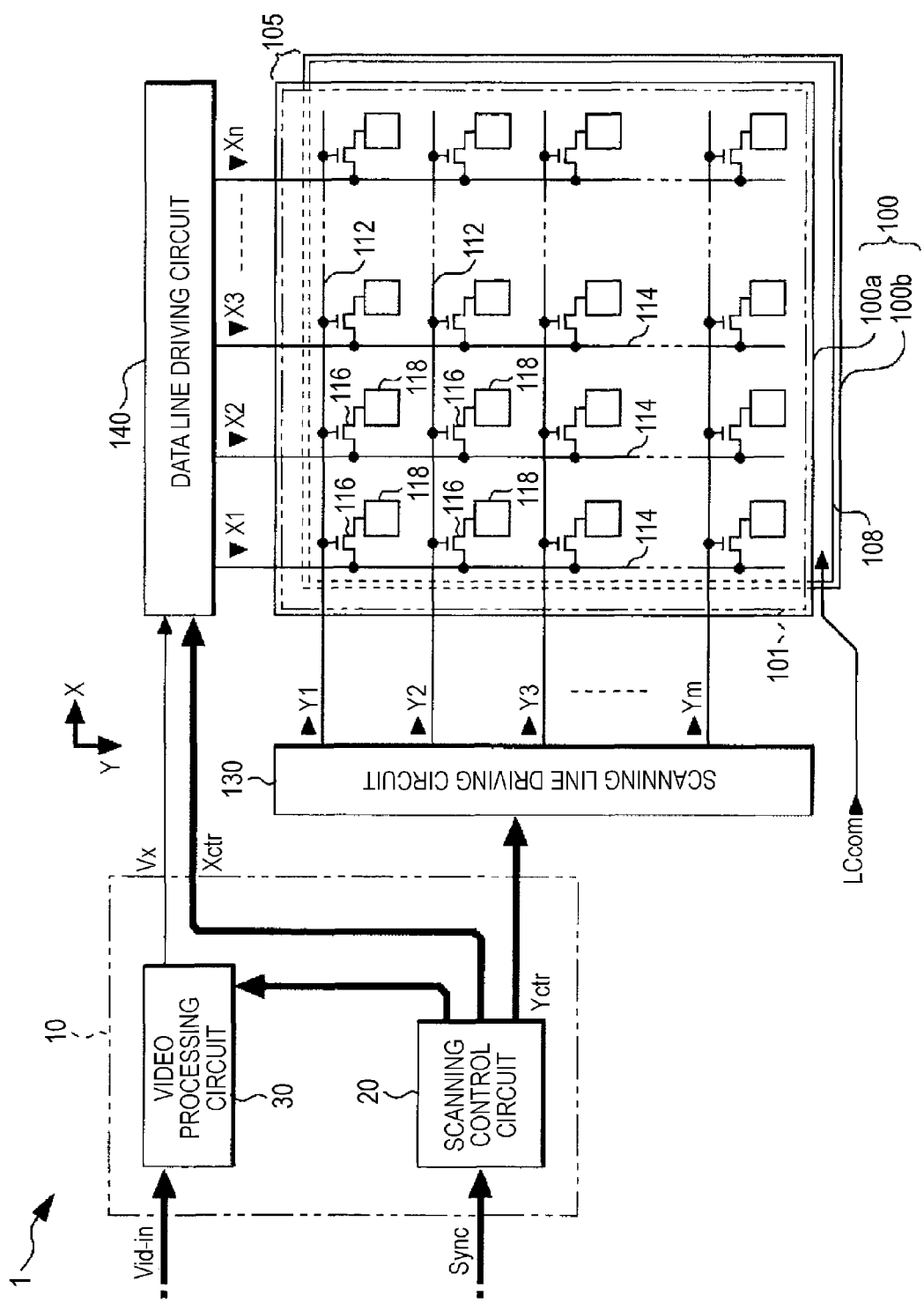
FIG. 1 is a diagram showing a liquid crystal display to which a video processing circuit according to a first embodiment of the invention is applied.

FIG. 1 is a block diagram showing the overall configuration of a liquid crystal display 1 to which a video processing circuit of this embodiment is applied.

As shown in FIG. 1, the liquid crystal display 1 includes a control circuit 10, a liquid crystal panel 100, a scanning line driving circuit 130, and a data line driving circuit 140. A video signal Vid-in is supplied from a higher-level device to the control circuit 10 in synchronization with a synchronization signal Sync. The video signal Vid-in is digital data which specifies the gray-scale level of each pixel in the liquid crystal panel 100 and supplied in a scanning order according to a vertical scanning signal, a horizontal scanning signal, and a dot clock signal (none of them are shown) included in the synchronization signal Sync. In this embodiment, the frequency at which the video signal Vid-in is supplied is 60 Hz, and the video signal Vid-in for displaying an image of one frame (one unit) in the period 16.67 milliseconds which is the reciprocal of 60 Hz is supplied.

Although the video signal Vid-in specifies a gray-scale level, it can be safely said that the video signal Vid-in specifies a voltage to be applied to a liquid crystal element since the voltage to be applied to a liquid crystal element is determined depending on a gray-scale level.

The control circuit 10 includes a scanning control circuit 20 and a video processing circuit 30. The scanning control circuit 20 generates various control signals and controls the respective units in synchronization with the synchronization signal Sync. The video processing circuit 30, which will be described below in detail, processes the digital video signal Vid-in and outputs an analog data signal Vx.

The liquid crystal panel 100 has a configuration in which an element substrate (first substrate) 100a and a counter substrate (second substrate) 100b are bonded together at a given gap, and liquid crystal 105 which is driven by an electric field in the vertical direction is interposed in the gap. On a surface of the element substrate 100a facing the counter substrate 100b, a plurality of m rows of scanning lines 112 are provided along the X (horizontal) direction in the drawing, and a plurality of n columns of data lines 114 are provided along the Y (vertical) direction so as to maintain electrical insulation from the scanning lines 112.

In this embodiment, for distinguishing between the scanning lines 112, the scanning lines 112 may be referred to as the first, second, third, . . . , (m−1)th, and m-th rows in this order from the top in the drawing. Similarly, for distinguishing between the data lines 114, the data lines 114 may be referred to as the first, second, third, . . . , (n−1)th, and n-th columns in this order from the left in the drawing.

A set of an n-channel TFT 116 and a transparent pixel electrode 118 having a rectangular shape is provided on the element substrate 100a so as to correspond to each intersection of the scanning lines 112 and the data lines 114. The TFT 116 has a gate electrode connected to the scanning line 112, a source electrode connected to the data line 114, and a drain electrode connected to the pixel electrode 118. On a surface of the counter substrate 100b facing the element substrate 100a, a transparent common electrode 108 is provided over the entire surface. A voltage LCcom is applied to the common electrode 108 by a circuit (not shown).

In FIG. 1, although the facing surface of the element substrate 100a is on the rear side of the paper, such that the scanning lines 112, the data lines 114, the TFTs 116, and the pixel electrodes 118 provided on the facing surface should be indicated by broken lines, all of them are indicated by solid lines to make the drawing easier to read.

Figure 2:
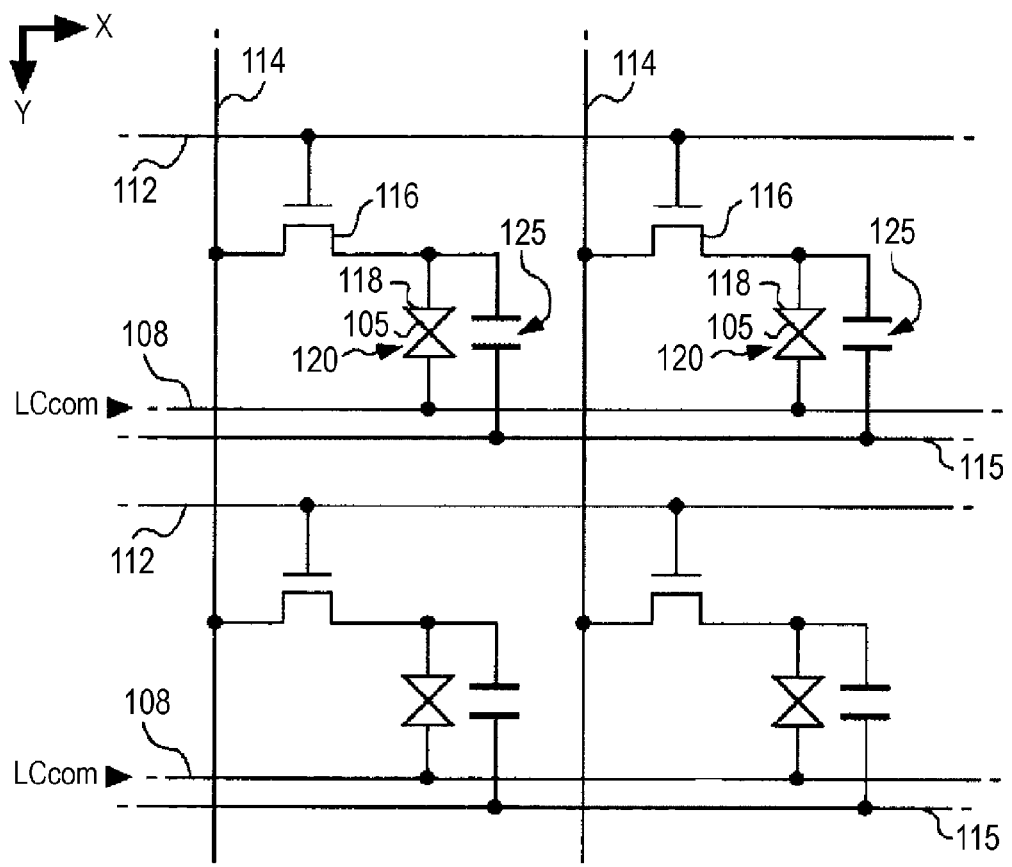
FIG. 2 is a diagram showing an equivalent circuit of a liquid crystal element in the liquid crystal display.

FIG. 2 is a diagram showing an equivalent circuit in the liquid crystal panel 100.

As shown in FIG. 2, the liquid crystal panel 100 has a configuration in which liquid crystal elements 120 are arranged to correspond to the intersections of the scanning lines 112 and the data lines 114 with the liquid crystal 105 interposed between the pixel electrodes 118 and the common electrode 108. Though not shown in FIG. 1, in the equivalent circuit of the liquid crystal panel 100, as shown in FIG. 2, an auxiliary capacitor (storage capacitor) 125 is actually provided in parallel with the liquid crystal element 120. The auxiliary capacitor 125 has one end connected to the pixel electrode 118, and the other end connected to a capacitor line 115 in common. The capacitor line 115 is held at a constant voltage in terms of time.

If the scanning line 112 is at H level, the TFT 116 whose gate electrode is connected to the scanning line is turned on, and the pixel electrode 118 is connected to the data line 114. For this reason, if a data signal of a voltage according to a gray-scale is supplied to the data line 114 when the scanning line 112 is at H level, the data signal is applied to the pixel electrode 118 through the TFT 116 in the on state. If the scanning line 112 is at L level, the TFT 116 is turned off, but the voltage applied to the pixel electrode 118 is held by the capacitance of the liquid crystal element 120 and the auxiliary capacitor 125.

In the liquid crystal element 120, the molecular alignment state of the liquid crystal 105 changes depending on an electric field generated by the pixel electrode 118 and the common electrode 108. For this reason, the liquid crystal element 120 has transmittance according to the applied and held voltage if the liquid crystal element 120 is of a transmissive type. In the liquid crystal panel 100, since transmittance changes between the liquid crystal elements 120, the liquid crystal element 120 corresponds to a pixel. An arrangement region of the pixels serves as a display region 101.

In this embodiment, it is assumed that the liquid crystal 105 is VA mode liquid crystal, and that the normally black mode is used in which the liquid crystal element 120 is in a black state when no voltage is applied.

Figure 5:
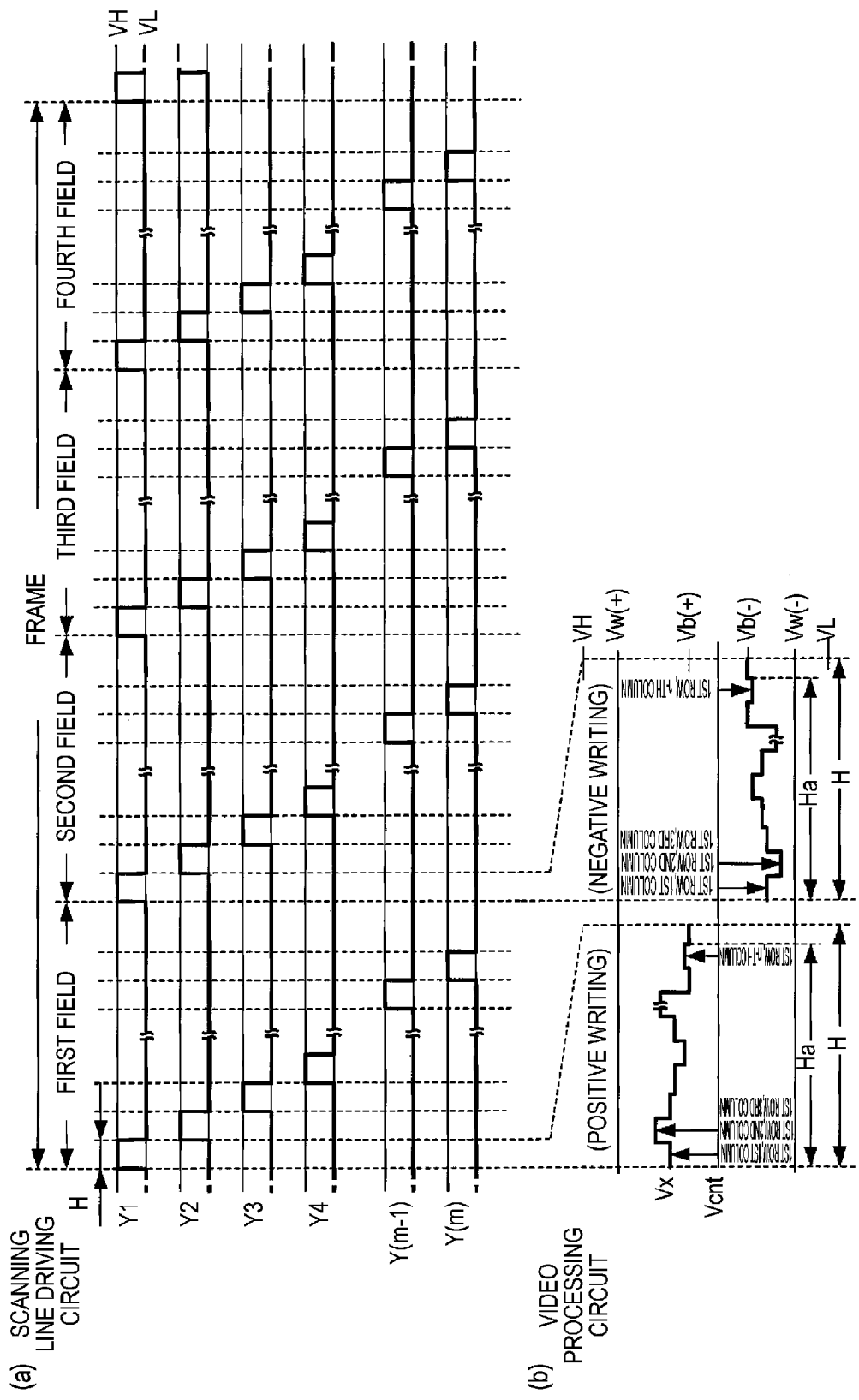
FIG. 5 illustrates diagrams showing a display operation in the liquid crystal panel.

The scanning line driving circuit 130 supplies scanning signals Y1, Y2, Y3, . . . , and Ym to the scanning lines 112 in the first, second, third, . . . , and m-th rows in accordance with a control signal Yctr from the scanning control circuit 20. Specifically, as shown in FIG. 5(a), the scanning line driving circuit 130 selects the scanning lines 112 in order of the first, second, third, . . . , (m−1)th, and m-th rows over a frame. The scanning line driving circuit 130 sets a scanning signal to the selected scanning line to a selection voltage $V_H$ (H level), and sets a scanning signal to other scanning lines to a non-selection voltage $V_L$ (L level).

The term "frame" used herein means the time necessary for driving the liquid crystal panel 100 to display a unit of image on the liquid crystal panel 100. In this embodiment, the frequency of the vertical scanning signal which is controlled by the synchronization signal Sync is 240 Hz. As shown in FIG. 5(a), in the liquid crystal display 1 of this embodiment, one frame is divided into four fields of a first field to a fourth field, and so-called four-fold speed driving is realized in which the scanning lines in the first to m-th rows are scanned in each field. That is, on the basis of the video signal Vid-in supplied from the higher-level device at a supply speed of 60 Hz, and the liquid crystal display 1 drives the liquid crystal panel 100 at a driving speed of 240 Hz to display a unit of image on the basis of the video signal Vid-in. One field period corresponds to a ¼ frame period, and in this case, about 4.16 milliseconds. In the liquid crystal display 1, positive writing is specified in the first and third fields and negative writing is specified in the second and fourth fields. Thus, the writing polarity is inverted in each field to write data to the pixels. With the use of many-fold speed driving, it is possible to reduce impression of residual image compared to one-fold speed driving.

The data line driving circuit 140 samples the data signal Vx supplied from the video processing circuit 30 for the data lines 114 in the first to n-th columns as data signals X1 to Xn in accordance with the control signal Xctr by the scanning control circuit 20.

In the embodiment of the invention, with regard to a voltage, a ground potential (not shown) is the reference of zero voltage, except for the voltage to be applied to the liquid crystal element 120, unless otherwise specified. The voltage to be applied to the liquid crystal element 120 is a potential difference between the voltage LCcom of the common electrode 108 and the pixel electrode 118, and thus the applied voltage is distinguished from other voltages.

In the normally black mode, the relationship between the voltage to be applied to the liquid crystal element 120 and transmittance is represented by the V-T characteristic shown in FIG. 4(a). For this reason, in order to make the liquid crystal element 120 have transmittance according to the gray-scale level specified by the video signal Vid-in, it should suffice that a voltage according to the gray-scale level is applied to the liquid crystal element 120. However, when the voltage to be applied to the liquid crystal element 120 is simply defined in accordance with the gray-scale level specified by the video signal Vid-in, a display defect due to a reverse tilt domain may occur.

An example of a display defect due to a reverse tilt domain will be described. For example, as shown in FIG. 35, in an image represented by the video signal Vid-in, when a black pattern having continuous black pixels on a background having white pixels moves pixel by pixel in the right direction, a kind of tailing phenomenon that a pixel which should be changed from a black pixel to a white pixel in the left edge portion (tail edge portion of movement) does not change to a white pixel appears due to the occurrence of a reverse tilt domain.

If the response time of the liquid crystal element is shorter than the time interval (one frame period) at which the display screen is updated when a region of black pixels on a background having white pixels moves by two pixels every frame, in the liquid crystal panel 100, the tailing phenomenon does not appear (or is hard to be viewed). The reason is considered as follows. That is, it is considered that, when a white pixel and a black pixel are adjacent to each other in one frame, a reverse tilt domain may occur in the white pixel, but taking into consideration movement of an image, pixels where a reverse tilt domain occurs are discrete and not visually noticeable.

Figure 35:
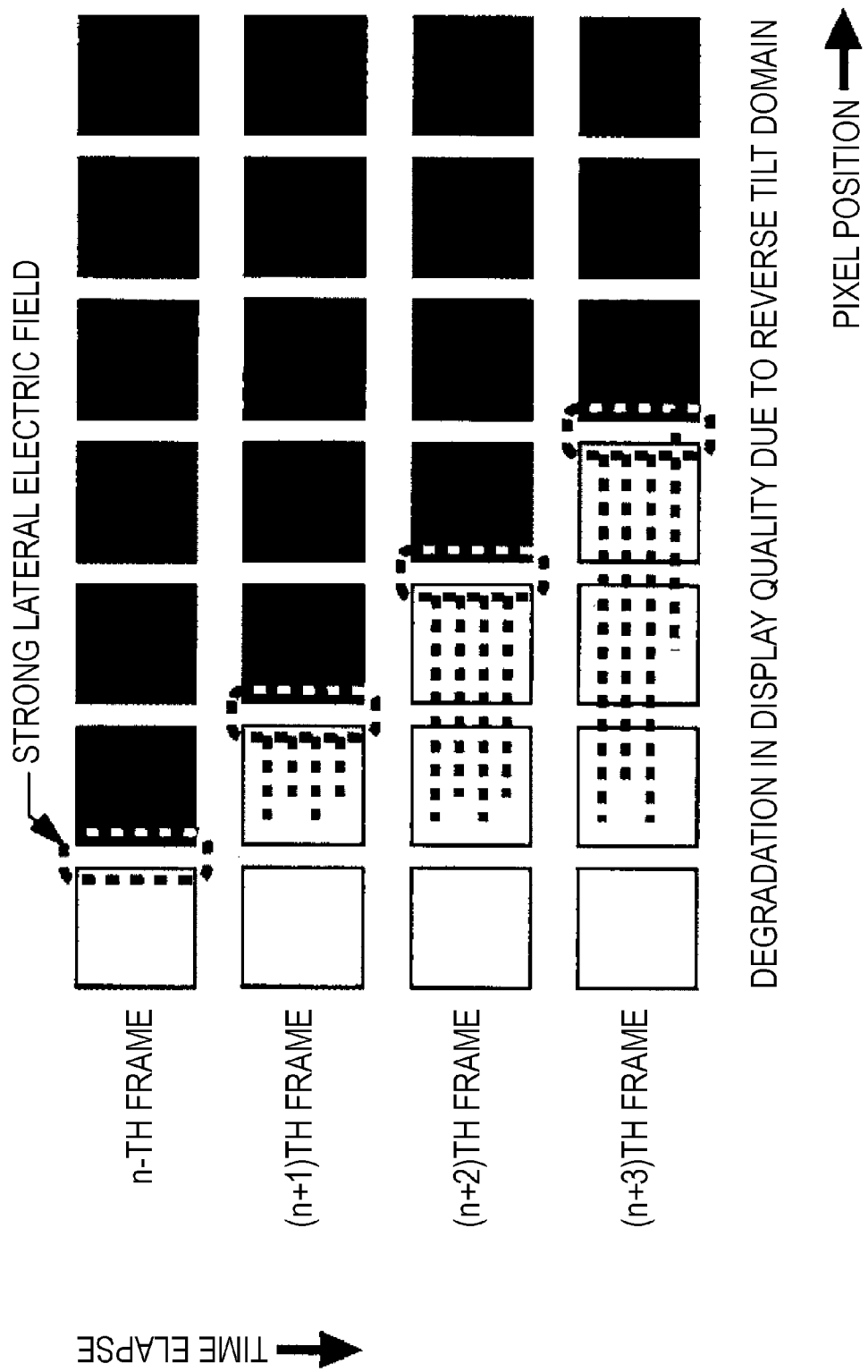
FIG. 35 is a diagram showing a display defect or the like by the influence of a lateral electric field.

Viewed from another perspective, in FIG. 35, when a white pattern having continuous white pixels on a background having black pixels moves pixel by pixel in the right direction every frame, a pixel which should be changed from a black pixel to a white pixel in the right edge portion (leading edge of movement) of the white pattern does not change to a white pixel due to the occurrence of a reverse tilt domain.

In FIG. 35, for convenience of description, a portion of one line near a boundary in an image is illustrated.

One of the reasons of a display defect due to a reverse tilt domain is considered as follows: when the liquid crystal molecules interposed in the liquid crystal element 120 are unstable, the alignment of the liquid crystal molecules is disturbed by the influence of a lateral electric field; and thereafter, the liquid crystal molecules are hard to go into an alignment state according to the applied voltage.

Here, the condition under which the liquid crystal molecules are affected by the lateral electric field is a case where the potential difference between adjacent pixel electrodes is great, which means a case where a dark pixel at black level (or close to black level) and a bright pixel at white level (or close to white level) are adjacent to each other in an image to be displayed.

It is defined that the dark pixel means a pixel of the liquid crystal element 120 whose applied voltage is within a voltage range A equal to or higher than a voltage Vbk at black level and lower than a threshold value Vth1 (first voltage) in the normally black mode. For convenience, a transmittance range (gray-scale level) of the liquid crystal element whose applied voltage is within the voltage range A is defined as "a".

It is defined that the bright pixel means a pixel of the liquid crystal element 120 whose applied voltage is within a voltage range B equal to or higher than a threshold value Vth2 (second voltage) and equal to or lower than a voltage Vwt at white level in the normally black mode. For convenience, a transmittance range (gray-scale range) of the liquid crystal element whose applied voltage is within the voltage range B is defined as "b".

When the condition under which the liquid crystal molecules are unstable, the voltage to be applied to the liquid crystal element falls below Vc1 (third voltage) within the voltage range A. When the voltage to be applied to the liquid crystal element falls below Vc1, an anchoring force of a vertical electric field due to the applied voltage is weak compared to an anchoring force due to an alignment film. Accordingly, the alignment state of the liquid crystal molecules is likely to be disturbed by a small external factor. Thereafter, even when the applied voltage becomes equal to or higher than Vc1, and the liquid crystal molecules attempt to tilt in accordance with the applied voltage, it takes time for the liquid crystal molecules to respond. Conversely, if the applied voltage is equal to or higher than Vc1, the liquid crystal molecules start to tilt in accordance with the applied voltage (transmittance starts to change), and therefore, the alignment state of the liquid crystal molecules is stable. For this reason, the voltage Vc1 is lower than the threshold value Vth1 defined in terms of transmittance.

When thinking in this way, it can be said that a pixel whose liquid crystal molecules are unstable before change is in a situation where a reverse tilt domain is likely to occur by the influence of a lateral electric field when a dark pixel and a bright pixel are adjacent to each other by movement of an image. However, when a study is made in view of the initial alignment state of the liquid crystal molecules, a reverse tilt domain may occur or may not occur depending on the positional relationship between a dark pixel and a bright pixel.

These cases will now be studied below.

FIG. 6(a) is a diagram showing 2-by-2 adjacent pixels in the vertical and horizontal directions in the liquid crystal panel 100. FIG. 6(b) is a simplified sectional view of the liquid crystal panel 100 taken at a vertical plane including line p-q in FIG. 6(a).

As shown in FIG. 6, it is assumed that the VA mode liquid crystal molecules are initially aligned at a tilt angle of THETAa and a tilt azimuth angle of THETAb (=45 degrees) in a state where the potential difference (the voltage to be applied to the liquid crystal element) between the pixel electrode 118 and the common electrode 108 is zero. As described above, since a reverse tilt domain occurs due to the lateral electric field between the pixel electrodes 118, the behavior of the liquid crystal molecules on the side of the element substrate 100a where the pixel electrodes 118 are provided causes a problem. For this reason, the tilt azimuth angle and the tilt angle of the liquid crystal molecules are defined based on the side of the pixel electrode 118 (element substrate 100a).

Specifically, as shown in FIG. 6(b), the tilt angle THETAa is defined as an angle made by a long axis Sa of a liquid crystal molecule based on a substrate normal line Sv when, with one end of the long axis Sa on the pixel electrode 118 side as a fixed point, the other end of the long axis Sa on the common electrode 108 side tilts.

On the other hand, the tilt azimuth angle THETAb is defined as an angle made by a substrate vertical plane (vertical plan including the line p-q) including the long axis Sa of the liquid crystal molecule and the substrate normal line Sv based on a substrate vertical plane along the Y direction as the arrangement direction of the data line 114. As viewed in plan from pixel electrode 118 toward the common electrode 108, the tilt azimuth angle THETAb is an angle defined in a clockwise fashion from the upper direction of the screen (the opposite direction to the Y direction) to a direction (upper right direction in FIG. 6(a)) toward the other end of the long axis of the liquid crystal molecule as a starting point.

Similarly, as viewed in plan from the pixel electrode 118, a direction from one end of the liquid crystal molecule on the pixel electrode side toward the other end is referred to as a downstream side of the tilt azimuth for convenience, whereas a direction (lower left direction in FIG. 6(a)) from the other end toward one end is referred to as an upstream side of the tilt azimuth for convenience.

In the liquid crystal panel 100 using the liquid crystal 105 with such an initial alignment, for example, as shown in FIG. 7(a), attention is focused on 2-by-2=4 pixels surrounded by a broken line. FIG. 7(a) shows a case where a pattern having pixels at black level (black pixels) on a background of a region having pixels at white level (white pixels) moves in the upper right direction pixel by pixel every frame. In the following description, a frame before t frames (t is a natural number) from the n-th frame is represented by the "(n−t)th frame", and a frame after t frames from the n-th frame is represented by the "(n+t)th frame".

As shown in FIG. 8(a), it is assumed that, in a state where all 2-by-2=4 pixels are black pixels in the (n−1)th frame, only one lower left pixel is changed to a white pixel in the n-th frame. As described above, in the normally black mode, the applied voltage which is the potential difference between the pixel electrode 118 and the common electrode 108 is greater in a white pixel than in a black pixel. For this reason, in the lower left pixel to be changed from black to white, as shown in FIG. 8(b), the liquid crystal molecules attempt to tilt in a direction perpendicular to an electric field direction, attempting to change from a state indicated by a solid line to a state indicated by a broken line.

However, the potential difference generated in the gap between the pixel electrode 118 (Wt) of a white pixel and the pixel electrode 118 (Bk) of a black pixel is substantially equal to the potential difference generated between the pixel electrode 118 (Wt) of a white pixel and the common electrode 108, and in addition, the gap between the pixel electrodes is narrower than the gap between the pixel electrode 118 and the common electrode 108. Accordingly, when compared in terms of intensity of electric field, the lateral electric field generated in the gap between the pixel electrode 118 (Wt) and the pixel electrode 118 (Bk) is stronger than the vertical electric field generated in the gap between the pixel electrode 118 (Wt) and the common electrode 108.

Since the lower left pixel is a black pixel whose liquid crystal molecules are unstable in the (n−1)th frame, it takes time for the liquid crystal molecules to tilt in accordance with the intensity of the vertical electric field. On the other hand, the lateral electric field from the adjacent pixel electrode 118 (Bk) is stronger than the vertical electric field induced by applying the voltage at white level to the pixel electrode 118 (Wt). Accordingly, in the pixel to be changed to white, as shown in FIG. 8(b), a liquid crystal molecule Rv on the side next to a black pixel is brought into a reverse tilt state earlier than the other liquid crystal molecules which attempt to tilt in accordance with the vertical electric field.

The liquid crystal molecules Rv which has been earlier brought into the reverse tilt state adversely affects the movement of other liquid crystal molecules which attempt to tilt in the substrate horizontal direction in accordance with the vertical electric field as indicated by the broken line. For this reason, as shown in FIG. 8(c), a region where reverse tilt occurs in the pixel which should be changed to white does not stay within the gap between the pixel which should be changed to white and the black pixel, but expands from the gap over a wide range so as to erode the pixel which should be changed to white.

Figure 8:
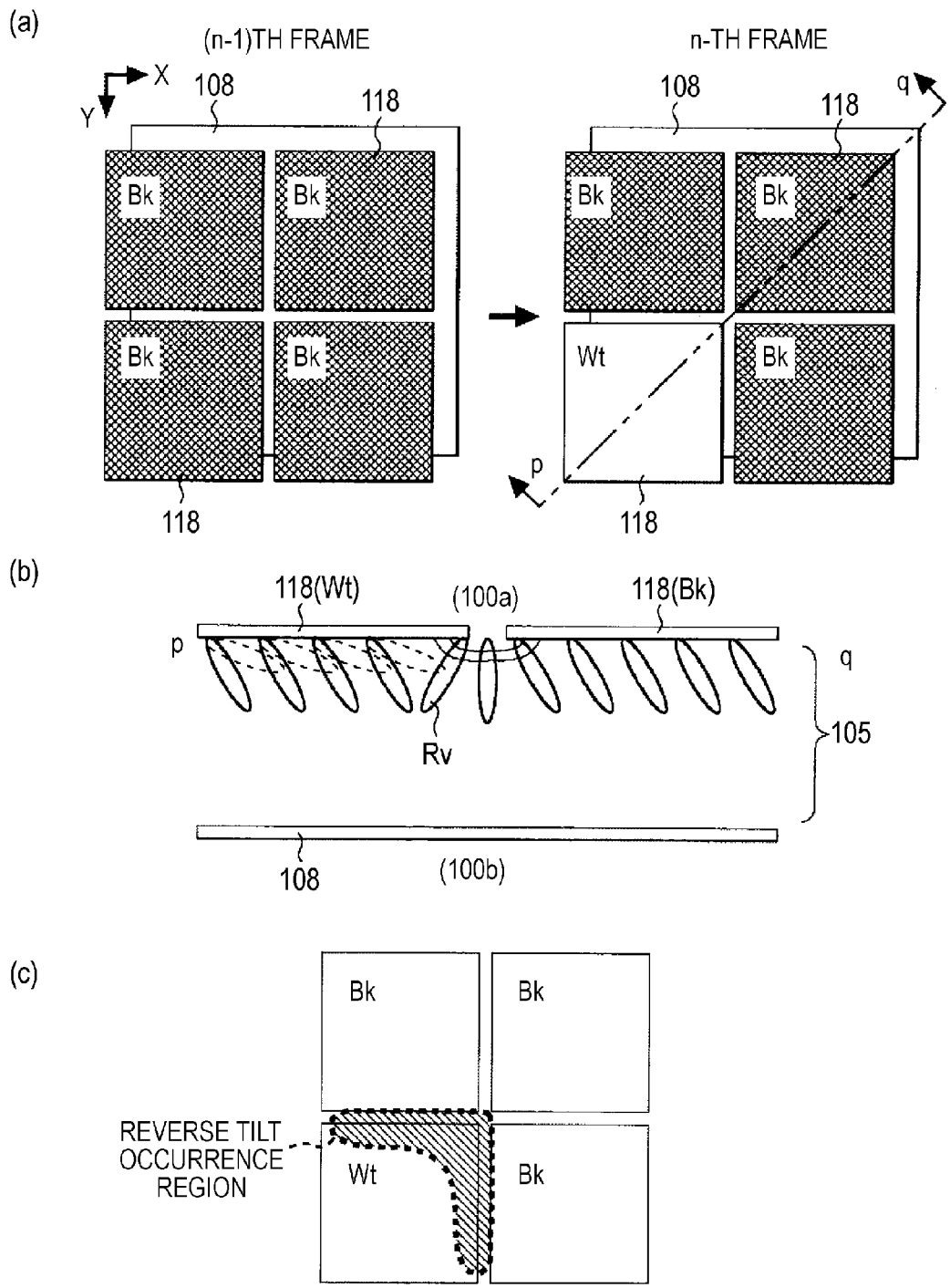
FIG. 8 illustrates explanatory views of a reverse tilt which occurs in the liquid crystal panel.

From FIG. 8, it can be said that, in a case where there are black pixels in the vicinity of an attention pixel to be changed to white, when the black pixels are next to the attention pixel on the upper right, on the right and on the upper, reverse tilt occurs in the inner peripheral region along the right edge and upper edge of the attention pixel.

The pattern change shown in FIG. 8(a) occurs not only in the example shown in FIG. 7(a), but also in a case where the pattern having black pixels moves in the right direction pixel by pixel every frame as shown in FIG. 7(b), or in a case where the pattern moves in the upper direction pixel by pixel every frame as shown in FIG. 7(c). As in the description of FIG. 35 where viewed from another perspective, the pattern change also occurs in a case where the pattern having white pixels on the background of the region having black pixels moves in the upper right, right, or upper direction pixel by pixel every frame.

Figure 9:
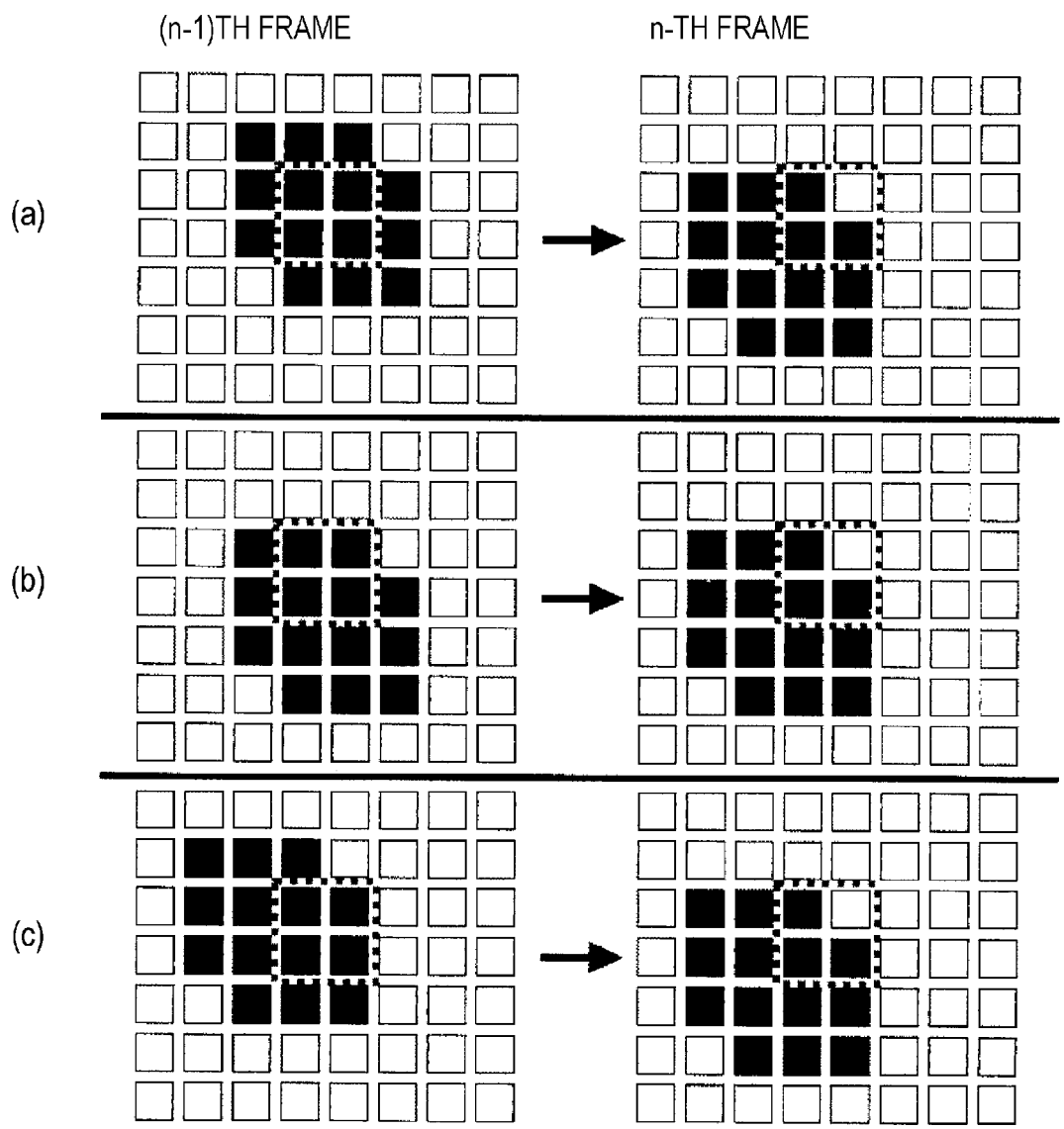
FIG. 9 illustrates diagrams illustrating movement of an image in the liquid crystal panel.

Next, in the liquid crystal panel 100, as shown in FIG. 9(a), when a pattern having black pixels on a background of a region having white pixels moves in the lower left direction pixel by pixel every frame, attention is focused on 2-by-2=4 pixels surrounded by a broken line.

That is, as shown in FIG. 10(a), it is assumed that, in a state where all 2-by-2=4 pixels are black pixels in the (n−1)th frame, only one upper right pixel is changed to a white pixel in the n-th frame.

Also after this change, the lateral electric field stronger than the vertical electric field in the gap between the pixel electrode 118 (Wt) and the common electrode 108 is generated in the gap between the pixel electrode 118 (Bk) of a black pixel and the pixel electrode 118 (Wt) of a white pixel. With the lateral electric field, as shown in FIG. 10(b), the liquid crystal molecules Rv in the black pixel and on the side next to the white pixel change in alignment earlier than other liquid crystal molecules which attempt to tilt in accordance with the vertical electric field, and therefore are brought into the reverse tilt state. In the black pixel, however, the vertical electric field does not change from the (n−1)th frame, and therefore, the liquid crystal molecules Rv have little influence on other liquid crystal molecules. For this reason, in the pixel which is not changed from a black pixel, as shown in FIG. 10(c), the region where reverse tilt occurs is so narrow as to be negligible compared to the example of FIG. 8(c).

On the other hand, in the upper right pixel which is changed from black to white from among 2-by-2=4 pixels, the initial alignment direction of the liquid crystal molecules is a direction which is less likely to be affected by the lateral electric field. Therefore, even when the vertical electric field is applied, there are few liquid crystal molecules which are brought into the reverse tilt state. For this reason, in the upper right pixel, as the intensity of the vertical electric field increases, the liquid crystal molecules tilt correctly in the horizontal direction of the substrate surface as indicated by a broken line in FIG. 10(b). As a result, since the upper right pixel is changed to an intended white pixel, display quality is unlikely to be deteriorated.

The pattern change shown in FIG. 10(a) occurs not only in the example shown in FIG. 9(a), but also in a case where the pattern having black pixels moves in the left direction pixel by pixel every frame as shown in FIG. 9(b), or in a case where the pattern moves in the lower direction pixel by pixel every frame as shown in FIG. 9(c). As in the description of FIG. 35 where viewed from another perspective, the pattern change also occurs in a case where the pattern having white pixels on the background of the region having black pixels moves in the lower left, left, or lower direction pixel by pixel every frame.

From the description of FIGS. 6 to 10, in the VA mode (normally black mode) liquid crystal, when an n-th frame is focused, it can be said that the next pixel is affected by the reverse tilt domain in the n-th frame with all the following requirements satisfied. That is, in the n-th frame, reverse tilt is likely to occur in the bright pixel in a case where:

(1) when an n-th frame is focused, a dark pixel and a bright pixel are adjacent to each other, that is, a pixel whose applied voltage is low and a pixel whose applied voltage is high are adjacent to each other to increase the lateral electric field;

(2) in the n-th frame, the bright pixel (applied voltage is high) is on the lower left or left of, or below the adjacent dark pixel (applied voltage is low) corresponding to the upstream side of the tilt azimuth in a liquid crystal molecule; and (3) in a pixel to be changed to the bright pixel in the n-th frame, the liquid crystal molecules are unstable in the (n−1)th frame one frame before the n-th frame.

Though the reason has already been described, in the requirement (2), when a boundary which represents a portion where a dark pixel and a bright pixel are adjacent to each other moves by one pixel from the previous frame, it is considered that the next pixel is more likely to be affected by the reverse tilt domain.

Figure 7:
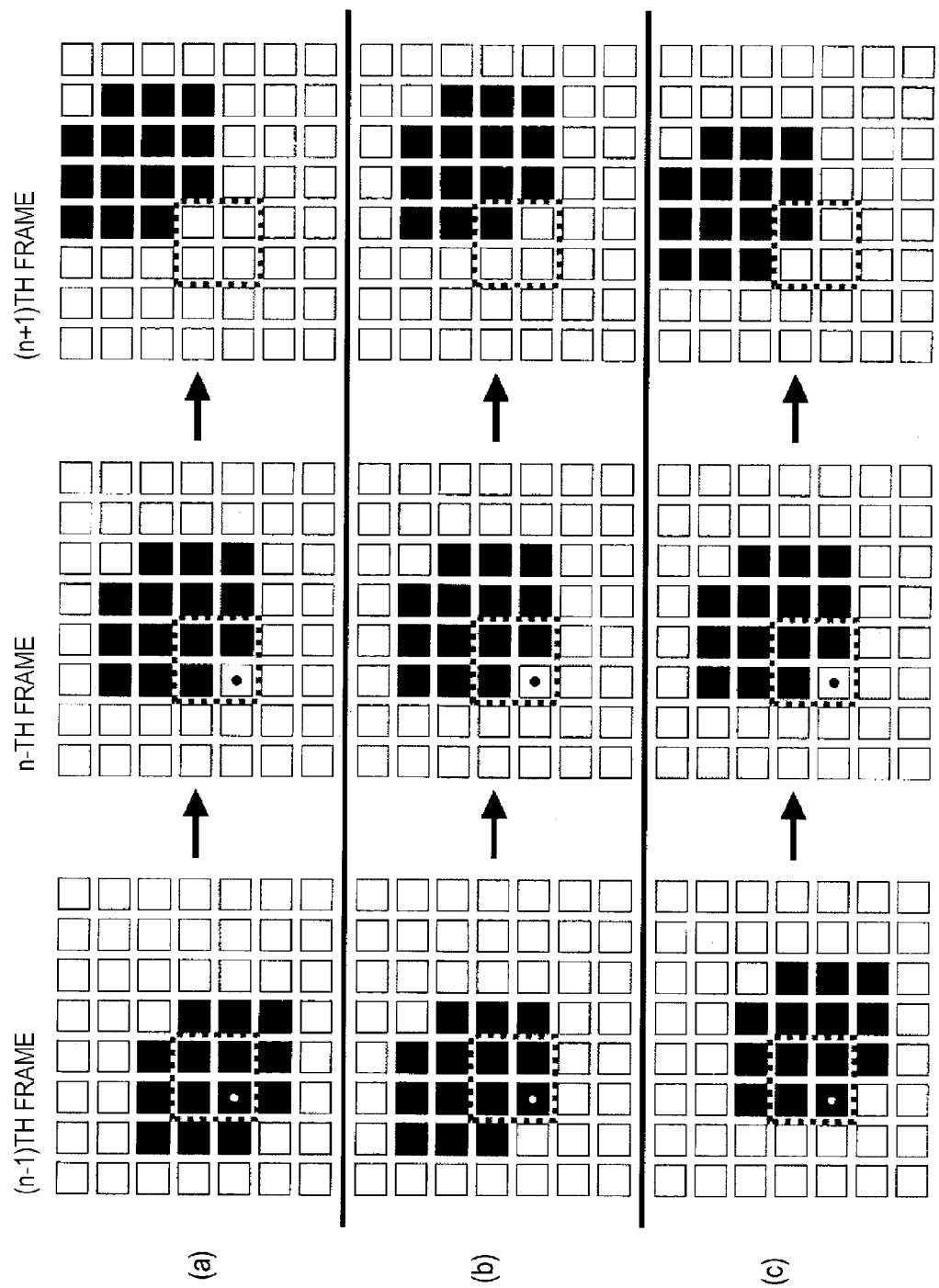
FIG. 7 illustrates diagrams illustrating movement of an image in the liquid crystal panel.

FIG. 7 illustrates the example where 2-by-2=4 pixels are black in the (n−1)th frame, and only the lower left pixel is changed to a white pixel in the next n-th frame. In general, however, similar movement is involved not only in the (n−1)th frame and the n-th frame, but also over a plurality of frames before and after these frames. For this reason, as shown in (a) to (c) in FIG. 7, in the dark pixel (pixel marked with a white dot) whose liquid crystal molecules are unstable in the (n−1)th frame, it is considered from the movement of the image pattern that there are many cases where a bright pixel is next to the lower left or left of, or below the dark pixel.

For this reason, in the (n−1)th frame in advance, when a dark pixel and a bright pixel are adjacent to each other in an image represented by the video signal Vid-in, and the dark pixel is positioned on the upper right or right of, or above the bright pixel, a voltage is applied to a liquid crystal element corresponding to the dark pixel in the n-th frame such that a period in which the dark pixel is adjacent to the bright pixel becomes shorter than one frame period. When this happens, the period in which the requirements (1) to (3) are satisfied in the n-th frame are satisfied is shortened, such that a defective alignment state of the liquid crystal molecules is hard to be generated, and the reverse tilt domain is not generated in the n-th frame. Specifically, when the applied voltage specified by the video signal Vid-in falls below Vth1, and when the applied voltage is corrected to a voltage equal to or higher than Vth1 and applied to the liquid crystal element, the dark pixel is not a dark pixel, and therefore, the risk boundary is not present at the same position over one frame period. In this embodiment, it is assumed that, for a dark pixel as a correction target, a video signal is corrected to a video signal whose gray-scale level is the maximum gray-scale level Cmax such that the lateral electric field generated between the dark pixel and the adjacent bright pixel can be weakened. The video signal at the maximum gray-scale level Cmax specifies the voltage to be applied to a liquid crystal element 120 where the potential difference from the voltage LCcom of the common electrode 108 becomes 5.0 V, and the applied voltage is the maximum value of a voltage which is used for gray-scale expression in the liquid crystal display 1.

On the basis of the consideration described above, a circuit which processes the video signal Vid-in in the current frame to prevent the occurrence of a reverse tilt domain in the liquid crystal panel 100 is the video processing circuit 30 in FIG. 1.

Figure 3:
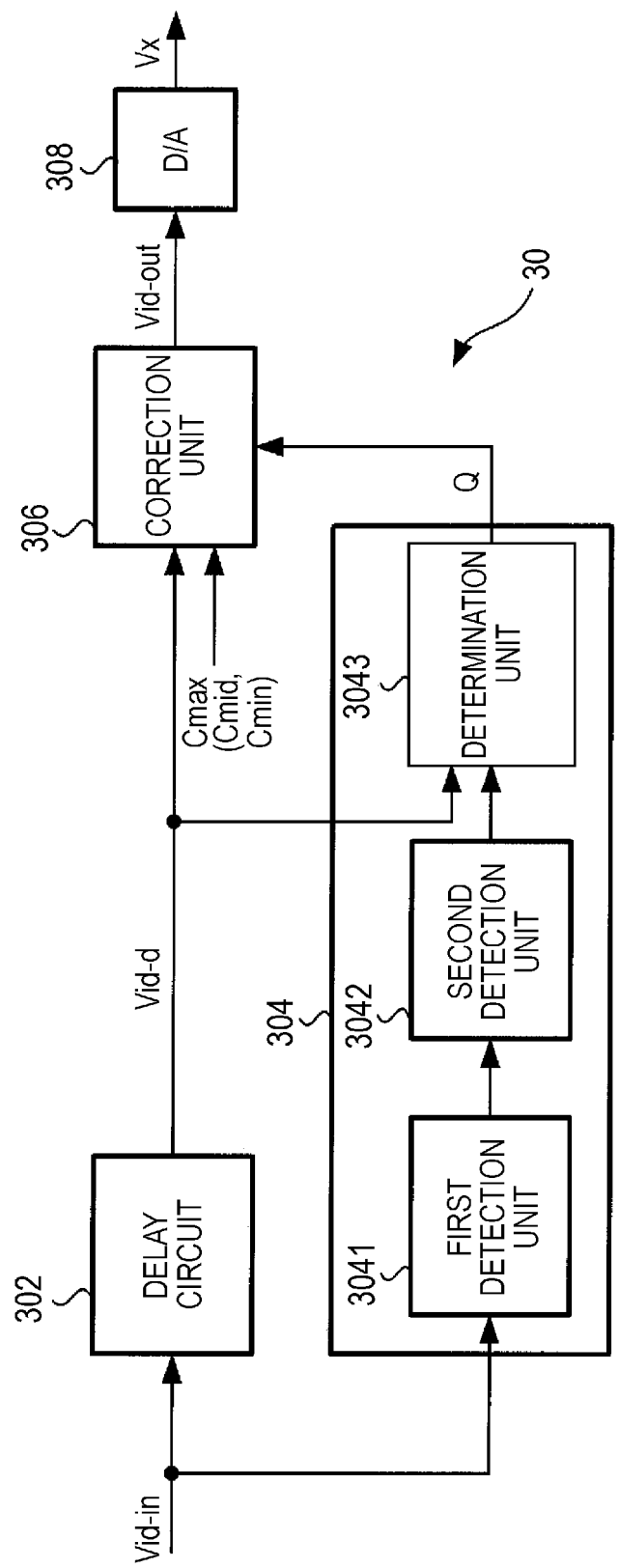
FIG. 3 is a diagram showing the configuration of the video processing circuit.

Next, the details of the video processing circuit 30 will be described with reference to FIG. 3. As shown in FIG. 3, the video processing circuit 30 includes a delay circuit 302, a boundary detection unit 304, a correction unit 306, and a D/A converter 308.

The delay circuit 302 includes a FIFO (First In First Out) memory, a multistage latch circuit, or the like. The delay circuit 302 accumulates the video signal Vid-in supplied from the higher-level device, reads the video signal after a predetermined time elapses, and outputs the video signal as a video signal Vid-d. The accumulation and readout in the delay circuit 302 are controlled by the scanning control circuit 20.

The boundary detection unit 304 includes a first detection unit 3041, a second detection unit 3042, and a determination unit 3043.

The first detection unit 3041 analyzes an image represented by the video signal Vid-in, and determines whether or not there is a portion where a dark pixel (first pixel) in a gray-scale range a and a bright pixel (second pixel) in a gray-scale range b are adjacent to each other in the vertical or horizontal direction. When it is determined that there is an adjacent portion, the first detection unit 3041 detects the adjacent portion as a boundary, and outputs positional information of the boundary.

The term "boundary" used herein thoroughly means a portion where a dark pixel in the gray-scale range a and a bright pixel in the gray-scale range b are adjacent to each other, that is, a portion where a strong lateral electric field is generated. For this reason, for example, a portion where a pixel in the gray-scale range a and a pixel in a gray-scale range d (see FIG. 4(*a*)) different from the gray-scale range a and the gray-scale range b are adjacent to each other, or a portion where a pixel in the gray-scale range b and a pixel in the gray-scale range d are adjacent to each other is not regarded as a boundary.

The second detection unit 3042 extracts a portion where a dark pixel is on the upper and a bright pixel is on the lower and a portion where a dark pixel is on the right and a bright pixel is on the left in the boundary detected by the first detection unit 3041, detects the portions as a risk boundary, and outputs positional information of the risk boundary.

The determination unit 3043 determines whether or not a pixel represented by the video signal Vid-d which is output in a delayed manner is a dark pixel which is contiguous to the risk boundary extracted by the second detection unit 3042. When the determination result is "Yes", the determination unit 3043 outputs an output signal with a flag Q of "1" in a period corresponding to the first and second fields for the dark pixel. When the determination result is "No", or in a period corresponding to the third and fourth fields when the determination result is "Yes", the determination unit 3043 outputs the output signal with the flag Q of "0".

A case where "a pixel is contiguous to a risk boundary" includes a case where a pixel is adjacent to a risk boundary along one side of the pixel, or a case where a risk boundary which is continuous vertically and horizontally is at one corner of the pixel. Unless a plurality of rows (at least three rows) of video signals have been accumulated, the first detection unit 3041 may not detect a boundary over in the vertical or horizontal direction in an image to be displayed. The same is also applied to the second detection unit 3042. For this reason, the delay circuit 302 is provided to adjust a supply timing of the video signal Vid-in from the higher-level device.

Since a timing of the video signal Vid-in supplied from the upper-level device differs from a timing of the video signal Vid-d supplied from the delay circuit 302, their horizontal scanning periods and the like do not coincide with each other in a precise sense. However, the following description will be provided without specifically distinguishing between them.

The accumulation and the like of the video signal Vid-in in the first detection unit 3041 and the second detection unit 3042 are controlled by the scanning control circuit 20.

As described above, the boundary detection unit 304 performs a risk boundary detection step of detecting a risk boundary.

When the flag Q supplied from the determination unit 3043 is "1", the correction unit 306 corrects the video signal Vid-d of the dark pixel to the video signal at the maximum gray-scale level Cmax, and outputs the corrected video signal as a video signal Vid-out. Thus, in the video signal Vid-out corrected by the correction unit 306, a period in which the risk boundary which is contiguous to the dark pixel in one frame period is shorter than the video signal Vid-in. In other words, a period in which there is a pixel which is contiguous to a risk boundary in one frame period becomes discontinuous. With the correction process in the correction unit 306, the risk boundary is not present continuously at the same position in one frame period. When the flag Q is "0", the correction unit 306 does not correct the video signal and directly outputs the video signal Vid-d as the video signal Vid-out (correction step).

The D/A converter 308 converts the video signal Vid-out as digital data to an analog data signal Vx. In this embodiment, since the frame inversion scheme is used, the polarity of the data signal Vx is switched every rewriting for a unit of image in the liquid crystal panel 100.

Next, the display operation of the liquid crystal display 1 will be described. The video signals Vid-in are supplied from the higher-level device in order of the first row, first column to first row, n-th column, the second row, first column to the second row, n-th column, the third row, the first column to the third row, n-th column, . . . , the m-th row, first column to the m-th row, n-th column over a frame. The video processing circuit 30 performs, a process, such as delay or correction, on the video signal Vid-in, and outputs the processed video signal as the video signal Vid-out.

In view of an effective horizontal scanning period (Ha) in which the video signals Vid-out for the first row, first column to the first row, n-th column are output, as shown in FIG. 5(b), the processed video signal Vid-out is converted to the positive or negative data signal Vx by the D/A converter 308 such that the writing polarity is switched every frame in accordance with whether a field is odd-numbered or even-numbered. In the first field, the video signal Vid-out is converted to the positive data signal. The data signal Vx is sampled for the data lines 114 in the first to n-th columns as data signals X1 to Xn by the data line driving circuit 140.

In a horizontal scanning period in which the video signals Vid-out for the first row, first column to the first row, n-th column are output, the scanning control circuit 20 controls the scanning line driving circuit 130 such that only the scanning signal Y1 is at H level. If the scanning signal Y1 is at H level, the TFTs 116 in the first row are turned on, such that the data signal sampled for the data line 114 is applied to the pixel electrodes 118 through the TFTs 116 in the on state. Thus, a positive voltage according to a gray-scale level specified by the video signal Vid-out is written to each of the liquid crystal elements in the first row, first column to the first row, n-th column.

Subsequently, the video signals Vid-in for the second row, first column to the second row, n-th column are processed similarly by the video processing circuit 30 and output as the video signal Vid-out. The video signal is converted to a positive data signal by the D/A converter 308 and then sampled for the data lines 114 in the first to n-th columns by the data line driving circuit 140.

In a horizontal scanning period in which the video signals Vid-out for the second row, first column to the second row, n-th column are output, only the scanning signal Y2 is at H level by the scanning line driving circuit 130, such that the data signals sampled for the data lines 114 are applied to the pixel electrodes 118 through the TFTs 116 in the second row in the on state. Thus, a positive voltage according to a gray-scale level specified by the video signal Vid-out is written to each of the liquid crystal elements in the second row, first column to the second row, n-th column.

Thereafter, similar writing operation is performed on the third, fourth, . . . , and m-th rows. Thus, a voltage according to a gray-scale level specified by the video signal Vid-out is written to each of the liquid crystal elements, such that a transmissive image defined by the video signal Vid-in is produced.

In the next field, similar writing operation is performed except that the video signal Vid-out is converted to a negative data signal due to the polarity inversion of the data signal.

FIG. 5(b) is a voltage waveform diagram showing an example of the data signal Vx in the first and second fields when the video signals Vid-out for the first row, first column to the first row, n-th column are output from the video processing circuit 30 over the horizontal scanning period (H). In this embodiment, since the normally black mode is used, the data signal Vx, if positive, becomes a voltage on the high-potential side (indicated by an upward arrow in the drawing) by an amount corresponding to a gray-scale level processed by the video processing circuit 30 with respect to a reference voltage Vcnt; while the data signal Vx, if negative, becomes a voltage on the low-potential side (indicated by a downward arrow in the drawing) by the amount corresponding to the gray-scale level with respect to the reference voltage Vcnt.

Specifically, the voltage of the data signal Vx, if positive, becomes a voltage shifted from the reference voltage Vcnt by an amount corresponding to the gray-scale level in a range from a voltage Vw(+) corresponding to white to a voltage Vb(+) corresponding to black; while the voltage of the data signal Vx, if negative, becomes a voltage shifted from the reference voltage Vcnt by an amount corresponding to the gray-scale level in a range from a voltage Vw(−) corresponding to white to a voltage Vb(−) corresponding to black.

The voltage Vw(+) and the voltage Vw(−) are symmetrical about the voltage Vcnt. The voltage Vb(+) and the voltage Vb(−) are symmetrical about the voltage Vcnt.

FIG. 5(b) shows the voltage waveform of the data signal Vx, which differs from the voltage (the potential difference between the pixel electrode 118 and the common electrode 108) to be applied to the liquid crystal element 120. The vertical scale of the voltage of the data signal in FIG. 5(b) is enlarged compared to the voltage waveforms of the scanning signals and the like in FIG. 5(a).

A specific example of the correction process in the video processing circuit 30 will be described.

Figure 36:
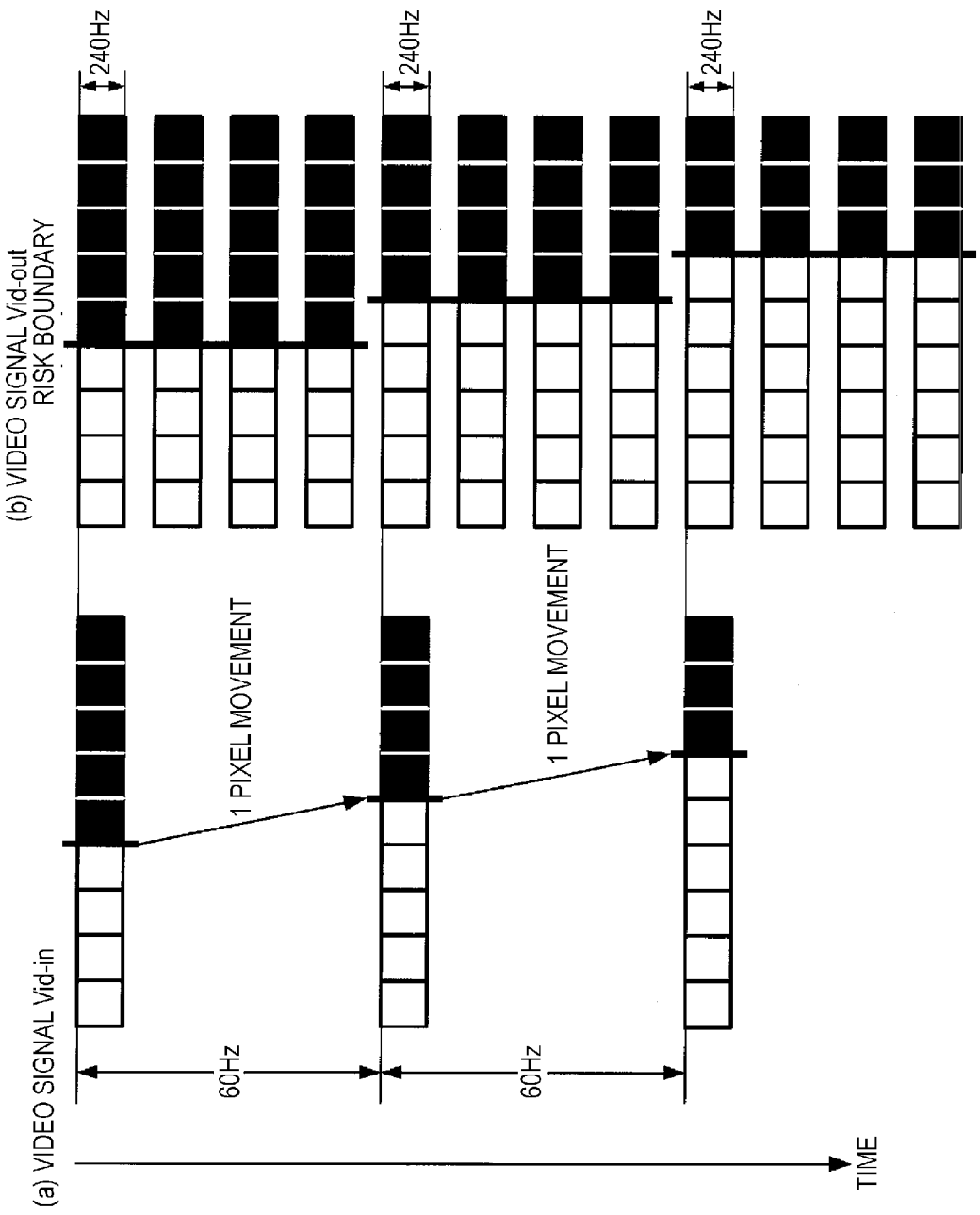
FIG. 36 illustrates explanatory views of the relationship between input/output video signals in usual four-fold speed driving.

First, the relationship between the video signal Vid-in (FIG. 36(a)) and the video signal Vid-out (FIG. 36(b)) in usual four-fold speed driving will be described. (a) and b) in FIG. 36 show a pixel group having a plurality of pixels arranged in one column, and each rectangle corresponds to one pixel. In FIG. 36 or other drawings, a pixel painted with black is a dark pixel, and a pixel painted with white is a bright pixel. In FIG. 36(b), the video signals Vid-out corresponding to the video signal Vid-in in the respective frames represent the video signal Vid-out corresponding to the first, second, third, and fourth fields in order from the top in the drawing.

As shown in FIG. 36(a), the video signal Vid-in is supplied at a supply speed of 60 Hz, and image display is specified such that, as the first frame, the second frame, and the third frame progresses by the video signal Vid-in, an image is scrolled from the left toward the right in the drawing. In this case, when the video signal Vid-out is output, as shown in FIG. 36(b), the risk boundary is fixedly present at the same position over one frame period (that is, over 16.67 milliseconds) having the first to fourth fields. If the risk boundary is present at the same position over a long period, as described above, a defective alignment state of the liquid crystal molecules is likely to be stabilized, and a reverse tilt domain is likely to occur in an adjacent pixel.

Figure 11:
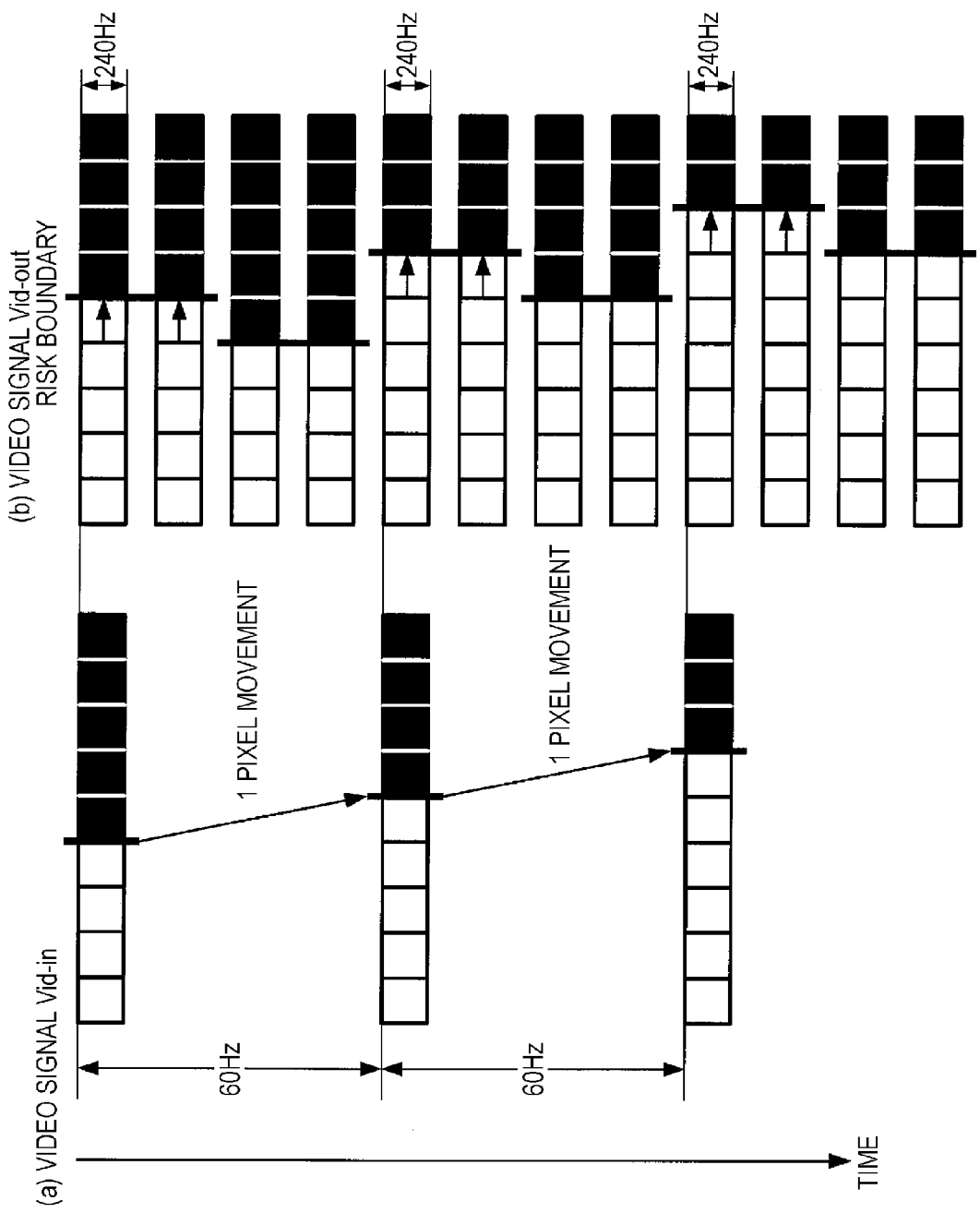
FIG. 11 illustrates explanatory views of the outline of a correction process of the video processing circuit.

FIG. 11 is a diagram illustrating the outline of the correction process of the correction unit 306 in the video processing circuit 30 of this embodiment. In this embodiment, when the video signal Vid-in which defines the image is supplied (FIG. 11(a)), the video signal Vid-out shown in FIG. 11(b) is corrected. As shown in FIG. 11(b), in this embodiment, in the first and second fields corresponding to the first half of one frame period, a dark pixel which is contiguous to the risk boundary is replaced with a bright pixel having the maximum gray-scale level Cmax. Thus, as indicated by an arrow in the drawing, the risk boundary moves virtually by only one pixel from the original risk boundary toward the right in the drawing over two fields. In the third and fourth fields, since such a correction process is not performed, there is no change in the risk boundary. In this case, the period in which the risk boundary is present at the same position is about 8.33 milliseconds which is half compared to a case where the correction of the correction unit 306 is not performed, and a defective alignment state of the liquid crystal molecules is hard to be stabilized, thereby suppressing the occurrence of a reverse tilt domain. As described above, in a frame in which an image based on the video signal Vid-out output from the correction unit 306 is displayed, the period in which the risk boundary is present at the same position is suppressed to be about half of one frame period.

For example, as shown in FIG. 12(1), when the image represented by the video signal Vid-in is an image in which a region having black (dark) pixels with the liquid crystal molecules in an unstable state is displayed on the background having white (bright) pixels in the gray-scale range b, a boundary detected by the first detection unit 3041 is as shown in FIG. 12(2).

Next, as shown in FIG. 12(3), the second detection unit 3042 extracts a portion where a dark pixel is on the upper and a bright pixel is on the lower and a portion where a dark pixel is on the right and a bright pixel is on the left in the boundary detected by the first detection unit 3041, and defines the portions as a risk boundary.

In this case, as in a dot-hatched portion of FIG. 13(a), for a dark pixel included in a correction range determined by the extracted risk boundary, the correction unit 306 corrects the video signal to the video signal at the maximum gray-scale level Cmax in a portion (in this case, two fields) of one frame. In the following description, a dot-hatched pixel means a dark pixel as a correction target.

A black pixel where a risk boundary which is continuous vertically and horizontally is positioned at one corner thereof is regarded as "being contiguous to the risk boundary". This is to cope with a situation in which an image moves by one pixel in the oblique direction. In contrast, in a black pixel where a risk boundary which is fractured only vertically or horizontally is positioned at one corner thereof, a risk boundary which is continuous vertically and horizontally is not positioned, and therefore, it is not considered that the black pixel is adjacent to the risk boundary. This content is a way to think which is used in common to a bright pixel and the same regardless of a tilt azimuth angle or the like, thus description thereof will not be repeated appropriately.

According to the first embodiment described above, the period in which the risk boundary is present at the same position becomes shorter than one frame period, and thus, before the liquid crystal molecules are aligned to be brought into the reverse tilt state in one pixel, the pixel is not contiguous to the risk boundary. Thus, the stabilization of a defective alignment state of the liquid crystal molecules is suppressed, and therefore, it becomes possible to prevent the occurrence of a display defect due to the above-described reverse tilt domain. A dark pixel as a correction target is determined under the condition that a pixel is adjacent to the risk boundary, and therefore, a correction-target pixel is easily identified. With a configuration in which the liquid crystal panel 100 uses four-fold speed driving, the video processing circuit 30 determines the presence/absence of a video signal in terms of fields, and therefore, it is not necessary to provide a complex configuration for correcting a video signal in a portion of one frame period.

In this embodiment, only a process for detecting a boundary between pixels and a risk boundary is performed, instead of a unit of image represented by the video signal, and therefore, it is possible to suppress an increase in size or complexity of the video processing circuit compared to a configuration in which two or more units of image are analyzed to detect movement. It also becomes possible to prevent a region where a reverse tilt domain is likely to occur from being continuous due to movement of a black pixel.

In this embodiment, in an image defined by the video signal Vid-d, pixels where the video signal is corrected include only pixels which are positioned on the downstream side of the tilt azimuth with respect to a dark pixel. For this reason, it is possible to suppress a portion where display not based on the video signal Vid-d occurs to be small without taking into consideration the tilt azimuth angle compared to a configuration in which all dark pixels adjacent to a bright pixel are corrected uniformly.

In this embodiment, a video signal equal to or greater than a set value is not clipped uniformly, and therefore, there is no case where a voltage range to be not used is provided to adversely affect the contrast ratio. It is not necessary to change or the like the structure of the liquid crystal panel 100, and therefore, the aperture ratio is not degraded. It is also possible to apply the invention to a liquid crystal panel which has been manufactured without devising the structure.

Other Examples of Tilt Azimuth Angle

In the above-described embodiment, an example has been described where the tilt azimuth angle THETAb is 45 degrees in the VA mode. Next, an example where the tilt azimuth angle THETAb is other than 45 degrees will be described.

First, as shown in FIG. 14(a), an example where the tilt azimuth angle THETAb is 225 degrees will be described. In this example, in a state where liquid crystal molecules in an object pixel and a peripheral pixel are unstable, when only the object pixel is changed to a bright pixel, as shown in FIG. 14(b), reverse tilt occurs in the inner peripheral region along the left edge and lower edge of the object pixel. This example is equivalent to a case where the example shown in FIG. 6 in which the tilt azimuth angle THETAb is 45 degrees is rotated by 180 degrees.

When the tilt azimuth angle THETAb is 225 degrees, the requirement (2) from among the requirements (1) to (3) that a reverse tilt domain occurs when the tilt azimuth angle THETAb is 45 degrees is revised as follows. That is, the requirement (2) is revised as follows.

(2) In the n-th frame, the bright pixel (applied voltage is high) is present on the upper right or right of, or above the adjacent dark pixel (applied voltage is low) corresponding to the upstream side of the tilt azimuth in a liquid crystal molecule.

The requirements (1) and (3) are not changed.

Accordingly, if the tilt azimuth angle THETAb is 225 degrees, when a dark pixel and a bright pixel are adjacent to each other in the n-th frame, and the dark pixel is reversely positioned on the lower left or left of, or below the bright pixel, it is preferable to take measures for a liquid crystal element corresponding to the dark pixel such that the liquid crystal molecules are not unstable.

To this end, it should suffice that the correction unit 306 of the video processing circuit 30 corrects the video signal on the basis of the risk boundary of a portion where a dark pixel is on the lower and a bright pixel is on the upper and a portion where a dark pixel is on the left and a bright pixel is on the right in the boundary detected by the first detection unit 3041.

When the tilt azimuth angle THETAb is 225 degrees, in the image shown in FIG. 12(1), the gray-scale level of a black pixel which is contiguous to a risk boundary shown in FIG. 13(c) is corrected to the gray-scale level Cmax.

With this configuration, when the tilt azimuth angle THETAb is 225 degrees, in the image defined by the video signal Vid-in, the region having black pixels moves by only one pixel in the lower left, left, or lower direction. Therefore, even when there is a portion where a black pixel is changed to a white pixel, it is possible to shorten the period in which the black pixel is contiguous to the risk boundary to a portion of one frame period, making it possible to suppress the occurrence of a reverse tilt domain.

Next, as shown in FIG. 15(a), an example where the tilt azimuth angle THETAb is 90 degrees will be described. In this example, in a state where liquid crystal molecules in an object pixel and a peripheral pixel are unstable, when only the object pixel is changed to a bright pixel, as shown in FIG. 15(b), reverse tilt occurs intensively in a region along the right edge of the object pixel. For this reason, it may be viewed from perspective that a reverse tilt domain also occurs in the upper side close to the right side and the lower side close to the right side by an amount corresponding to the width in the right side.

Accordingly, when the tilt azimuth angle THETAb is 90 degrees, the requirement (2) from among the requirements (1) to (3) that a reverse tilt domain occurs when the tilt azimuth angle THETAb is 45 degrees is revised as follows. That is, the requirement (2) is revised as follows.

(2) In the n-th frame, the bright pixel (applied voltage is high) is positioned not only on the left of the adjacent dark pixel (applied voltage is low) corresponding to the upstream side of the tilt azimuth of a liquid crystal molecules, but also above or below the adjacent dark pixel affected by an occurrence region on the left.

The requirements (1) and (3) are not changed.

Accordingly, if the tilt azimuth angle THETAb is 90 degrees, when a dark pixel and a bright pixel are adjacent to each other in the n-th frame, and the dark pixel is reversely positioned on the right of, below, or above the bright pixel, it is preferable to take measures for a liquid crystal element corresponding to the dark pixel such that the liquid crystal molecules are not unstable.

To this end, it should suffice that the correction unit 306 of the video processing circuit 30 corrects the video signal on the basis of the risk boundary of a portion where a dark pixel is on the right and a bright pixel is on the left, a portion where a dark pixel is on the upper and a bright pixel is on the lower, and a portion where a dark pixel is on the lower and a bright pixel is on the upper in the boundary detected by the first detection unit 3041.

When the tilt azimuth angle THETAb is 90 degrees, in the image shown in FIG. 12(1), the gray-scale level of a black pixel which is contiguous to a risk boundary shown in FIG. 13(b) is corrected to the gray-scale level Cmax.

With this configuration, when the tilt azimuth angle THETAb is 90 degrees, in the image defined by the video signal Vid-in, the region having black pixels moves by only one pixel in the upper, upper right, right, lower right, or lower direction. Therefore, even when there is a portion where a black pixel is changed to a white pixel, it is possible to shorten the period in which the black pixel is contiguous to the risk boundary to a portion of one frame period, making it possible to suppress the occurrence of a reverse tilt domain.

Second Embodiment

Next, a second embodiment of the invention will be described.

In this embodiment, when correcting a video signal of a dark pixel contiguous to a risk boundary, the correction unit 306 corrects the video signal to a video signal at a middle gray-scale level Cmid, not to the video signal at the maximum gray-scale level Cmax. The video signal of the middle gray-scale level Cmid is a voltage to be applied to the liquid crystal element 120, and in this case, specifies 2.5 V which is a middle voltage between an applied voltage corresponding to a maximum gray-scale level and an applied voltage corresponding to a minimum gray-scale level. A configuration, such as a dark pixel as a correction target, except for a correction voltage, is the same as in the above-described first embodiment.

Figure 16:
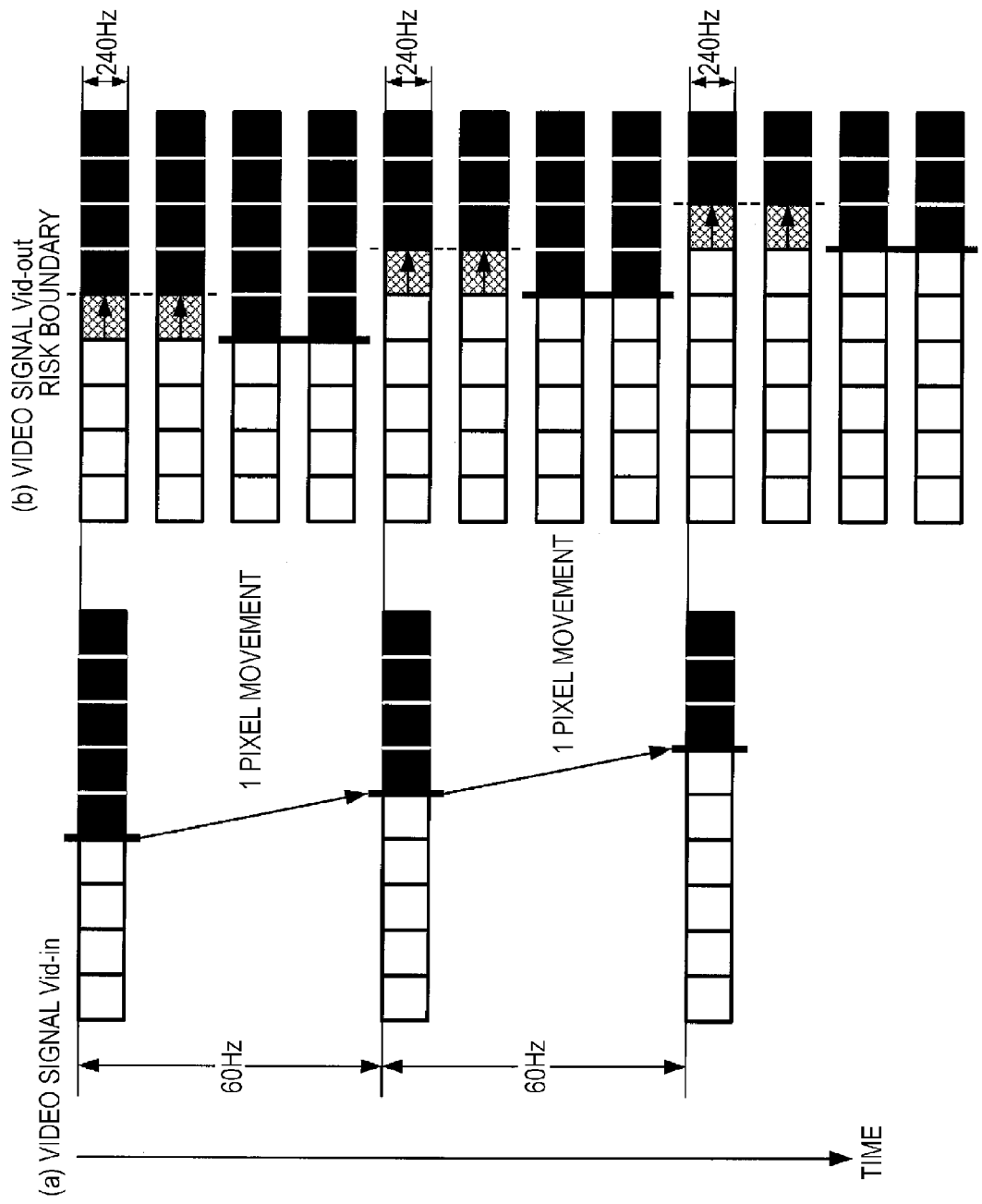
FIG. 16 is an explanatory view of the outline of a correction process of a video processing circuit according to a second embodiment of the invention.

In this embodiment, when the video signal Vid-in which specifies the display image of the liquid crystal panel 100 is supplied (FIG. 16(a)), as shown in FIG. 16(b), the video signal Vid-out is corrected. In FIG. 16 or other drawings, a pixel hatched in an oblique lattice shape is a pixel whose gray-scale level is a middle gray-scale level Cmid. Although a broken line shown in a boundary portion adjacent to the middle gray-scale level Cmid indicates that the portion is not relevant to the risk boundary, the portion may be relevant to the risk boundary. The same is applied to the following description.

As shown in FIG. 16(b), in this embodiment, in the first and second fields which are the first half of each frame, the correction unit 306 replaces the dark pixel contiguous to the risk boundary with the pixel having the middle gray-scale level Cmid. Thus, a risk boundary is not generated between a dark pixel and a bright pixel adjacent to each other over two fields. Therefore, in this case, the period in which the risk boundary is present at the same position becomes about 8.33 milliseconds which is half compared to a case where the correction of the correction unit 306 is not performed, and for the same reason as in the above-described first embodiment, a reverse tilt domain is hard to be generated. Since a correction-target pixel is corrected to the video signal at the middle gray-scale level in the middle of the maximum gray-scale level and the minimum gray-scale level, a change in an image due to the correction of the correction unit 306 on the original video signal Vid-in decreases, making it possible to make the user unlikely to perceive the change.

Third Embodiment

Next, a third embodiment of the invention will be described. In this embodiment, description will be provided assuming that the normally black mode is used. The same is applied to the following embodiments unless otherwise specified. In the following description, the same parts as those in the first and second embodiments are represented by the same reference numerals, and detailed description thereof will not be repeated appropriately. Although in the above-described first and second embodiments, the video processing circuit 30 corrects the video signal for only the dark pixel contiguous to the risk boundary, video signals of two or more continuous dark pixels on the opposite side of the risk boundary from the dark pixel contiguous to the risk boundary are corrected. Hereinafter, as in the above-described second embodiment, a case will be described where the video signal of the dark pixel is corrected to the video signal at the middle gray-scale level Cmid. As in the first embodiment, however, in a case where the video signal is corrected to the video signal at the maximum gray-scale level Cmax, if the correction voltage is changed, the same correction is carried out.

The video processing circuit 30 of this embodiment is different from the configuration of the first embodiment in that the determination content of the determination unit 3043 is different, and the number of dark pixels as a correction target in the correction unit 306 is changed.

The determination unit 3043 determines whether or not the pixel represented by the video signal Vid-d is a dark pixel which is contiguous to the risk boundary extracted by the second detection unit 3042. When the determination result is "Yes", the determination unit 3043 outputs the output signal with the flag Q of "1" in the period corresponding to the first and second fields of one frame for r (in this embodiment, r=2) continuous dark pixels in the opposite direction of the risk boundary from the dark pixel. On the other hand, when the determination result is "No", the determination unit 3043 outputs the output signal with the flag Q of "0" in the period corresponding to the third and fourth fields when the determination result is "Yes".

When the flag Q supplied from the determination unit 3043 is "1", the correction unit 306 corrects the video signal Vid-d of the dark pixel to the video signal at the middle gray-scale level Cmid, and outputs the corrected video signal as the video signal Vid-out. Thus, in the video signal Vid-out corrected by the correction unit 306, the period in which there is the risk boundary which is contiguous to the dark pixel in one frame period becomes shorter than the video signal Vid-in. On the other hand, when the flag Q is "0", the correction unit 306 does not correct the video signal, and directly outputs the video signal Vid-d as the video signal Vid-out.

A specific example of the correction process in the video processing circuit 30 will be described.

Figure 17:
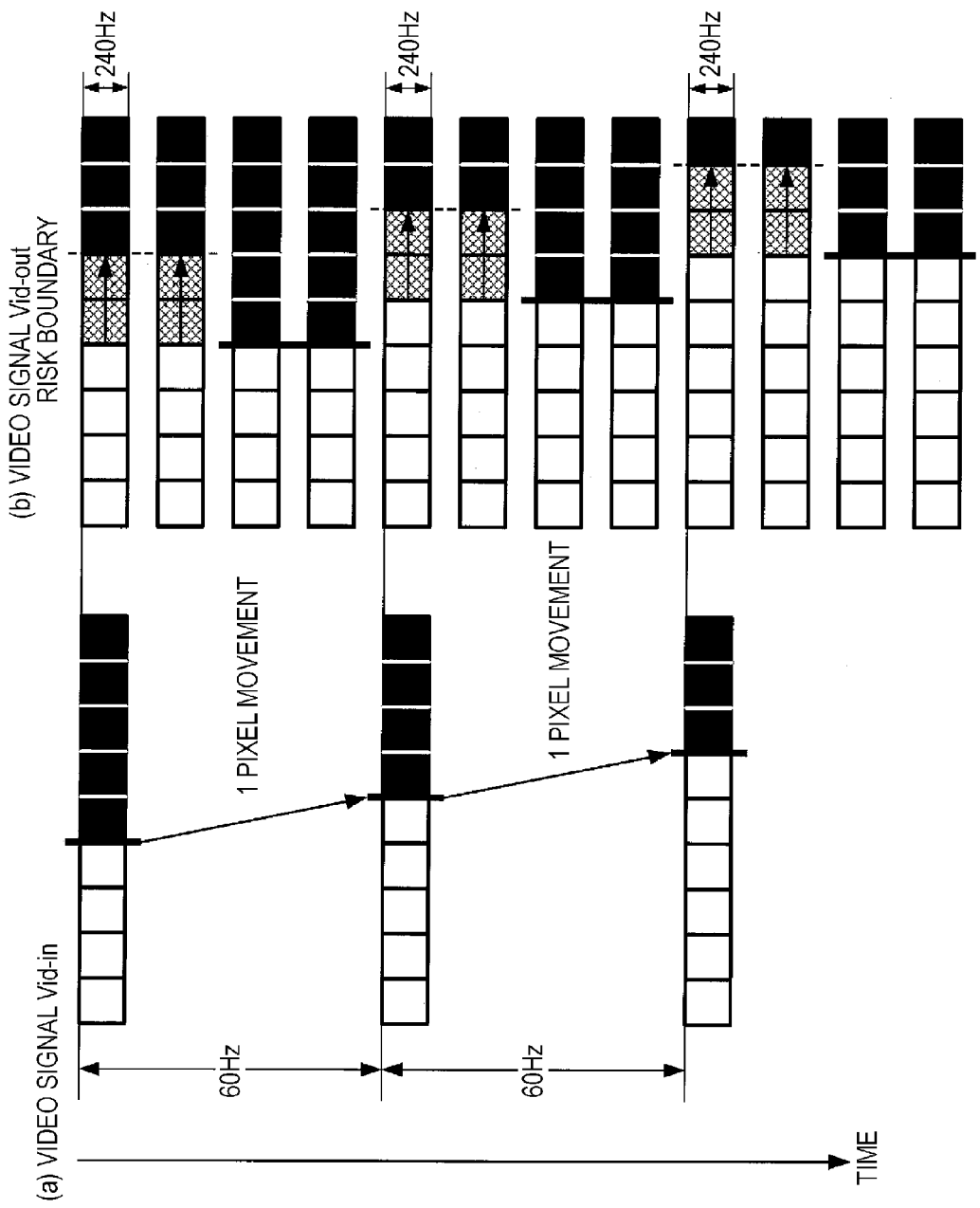
FIG. 17 illustrates explanatory views of the outline of a correction process of a video processing circuit according to a third embodiment of the invention.

In this embodiment, when a video signal Vid-in shown in FIG. 17(a) is supplied, the video signal Vid-in is corrected to a video signal Vid-out shown in FIG. 17(b). As shown in FIG. 17(b), in this embodiment, in the first and second fields which are the first half of each frame, two continuous dark pixels on the opposite side of the risk boundary from the dark pixel contiguous to the risk boundary are replaced with a pixel at a middle gray-scale level Cmid. Thus, a risk boundary is not generated between a dark pixel and a bright pixel over two fields, and a risk boundary is not present continuously in terms of time in one frame period. Therefore, in this case, a reverse tilt domain is hard to be generated.

When an image represented by the video signal Vid-in is as shown in FIG. 12(1), and as shown in FIG. 12(3), the second detection unit 3042 detects the risk boundary, the correction unit 306 corrects the video signal to the video signal at the middle gray-scale level Cmid in a portion (in this case, two fields) of one frame for a dot-hatched dark pixel in FIG. 18(a).

In the same way to think as in the first embodiment, when THETAb=90 degrees, pixels which satisfy the correction condition in the image represented by FIG. 12(1) are as shown in FIG. 18(b). When THETAb=225 degrees, pixels which satisfy the correction condition in the image shown in FIG. 12(2) are as shown in FIG. 18(c).

According to this embodiment, it is possible to make a change in the applied voltage due to the correction of the video signals of a plurality of pixels contiguous to the risk boundary unnoticeable. According to the configuration of this embodiment, in addition to the above, the same effects as in the second embodiment are achieved.

Fourth Embodiment

Next, a fourth embodiment of the invention will be described.

In this embodiment, in the configuration of the first embodiment, instead of the dark pixel contiguous to the risk boundary, video signals of bright pixels in a correction range determined by the risk boundary are corrected. In this embodiment, the correction unit 306 does not correct the video signal of the dark pixel. In this case, since a bright pixel as a correction target is not a bright pixel after correction, there is no case where the risk boundary is present at the same position over one frame period. In this embodiment, it is assumed that, for a bright pixel as a correction target, the video signal is corrected to a video signal whose gray-scale level is the minimum gray-scale level Cmin such that the lateral electric field generated between the bright pixel and the adjacent dark pixel can be reduced. The video signal at the minimum gray-scale level Cmin specifies the voltage to be applied to the liquid crystal element 120 such that the potential difference from the voltage LCcom of the common electrode 108 is 0 V (equipotential), and the applied voltage is the minimum value of a voltage which is used for gray-scale expression in the liquid crystal display 1. In the following description, the same parts as those in the first embodiment are represented by the same reference numerals, and description thereof will not be repeated appropriately.

The determination unit 3043 determines whether or not the pixel represented by the video signal Vid-d is a bright pixel which is contiguous to the risk boundary extracted by the second detection unit 3042. When the determination result is "Yes", the determination unit 3043 outputs the output signal with the flag Q of "1" in the period corresponding to the third and fourth fields. On the other hand, when the determination result is "No", the determination unit 3043 outputs the output signal with the flag Q of "0" in the period corresponding to the first and second fields when the determination result is "Yes".

When the flag Q supplied from the determination unit 3043 is "1", the correction unit 306 corrects the video signal Vid-d of the bright pixel to the video signal at the minimum gray-scale level Cmin, and outputs the corrected video signal as the video signal Vid-out. Thus, in the video signal Vid-out corrected by the correction unit 306, as indicated by an arrow in the drawing, in fact, the risk boundary moves by only one pixel toward the left in the drawing from the original risk boundary over two fields. On the other hand, in the first and second fields, since such a correction process is not performed, there is no change in the risk boundary. Therefore, in the video signal Vid-out, the period in which the risk boundary contiguous to the bright pixel is present in one frame becomes shorter than the video signal Vid-in. When the flag Q is "0", the correction unit 306 does not correct the video signal, and directly outputs the video signal Vid-d as the video signal Vid-out.

A specific example of the correction process in the video processing circuit 30 will be described.

Figure 19:
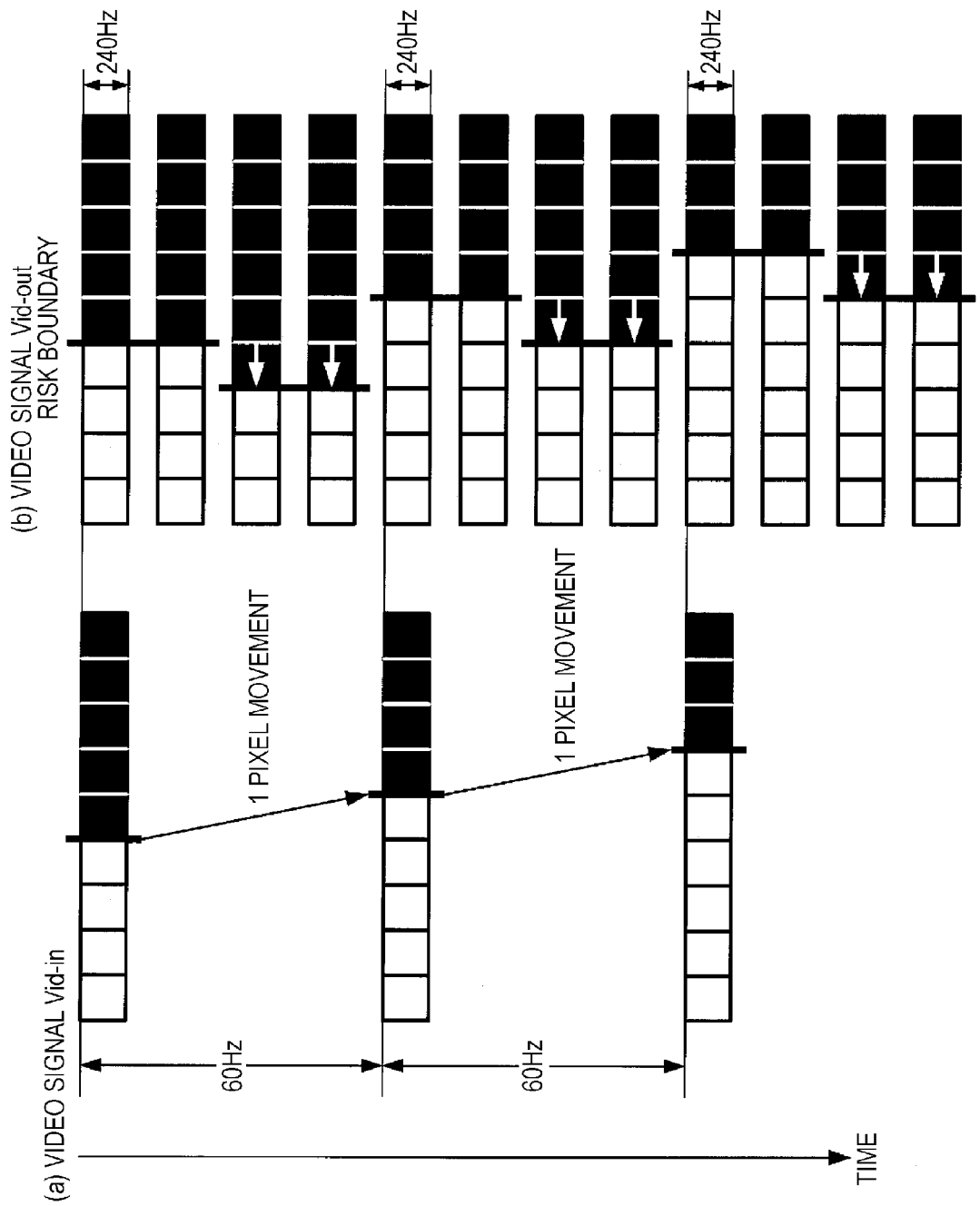
FIG. 19 illustrates explanatory views of the outline of a correction process of a video processing circuit according to a fourth embodiment of the invention.

In this embodiment, when a video signal Vid-in which defines an image having a content shown in FIG. 19(a) is supplied, the video signal Vid-in is corrected to a video signal Vid-out shown in FIG. 19(b). As shown in FIG. 19(b), in this embodiment, in the third and fourth fields, a bright pixel contiguous to the risk boundary is replaced with a dark pixel at the minimum gray-scale level Cmin. Thus, a risk boundary is not generated between a dark pixel and a bright pixel adjacent to each other over two fields. Therefore, in this case, the period in which the risk boundary is present at the same position is about 8.33 milliseconds which is half compared to a case where the correction of the correction unit 306 is not performed, and a reverse tilt domain is hard to be generated.

When the image represented by the video signal Vid-in is as shown in FIG. 12(1), and as shown in FIG. 12(3), the second detection unit 3042 detects the risk boundary, the correction unit 306 corrects the video signal to the video signal at the minimum gray-scale level Cmin in a portion (in this case, two fields) of one frame for an obliquely hatched bright pixel in FIG. 20(a). Therefore, in this case, a reverse tilt domain is hard to be generated.

In the same way to think as in the first embodiment, when THETAb=90 degrees, pixels which satisfy the correction condition in the image shown in FIG. 12(1) are as shown in FIG. 20(b). When THETAb=225 degrees, pixels which satisfy the correction condition in the image shown in FIG. 12(2) are as shown in FIG. 20(c).

In this embodiment, if the correction process is performed in the first and second fields, the boundary between a bright pixel and a dark pixel in the third and fourth fields of one frame and the boundary between a bright pixel and a dark pixel (a pixel subjected to the correction process) in the first and second fields of a frame next to one frame are at the same position. For this reason, the correction process is performed in the third and fourth fields.

According to the fourth embodiment described above, the period in which the risk boundary is present at the same position becomes shorter than one frame period, and thus, before the liquid crystal molecules are aligned to be brought into the reverse tilt state in one pixel, the pixel is not contiguous to the risk boundary. Therefore, the stabilization of a defective alignment state of the liquid crystal molecules is suppressed, making it possible to prevent the occurrence of a display defect due to the above-described reverse tilt domain.

In addition, the same effects as in the above-described first embodiment are achieved.

Fifth Embodiment

Next, a fifth embodiment of the invention will be described. Although in the above-described fourth embodiment, the video processing circuit 30 corrects the video signal for only a bright pixel contiguous to the risk boundary, video signals of two or more continuous bright pixels on the opposite side of the risk boundary from the bright pixel contiguous to the risk boundary are corrected. Hereinafter, as in the above-described second embodiment, although a case has been described where the video signal of the bright pixel is corrected to the video signal at the middle gray-scale level Cmid, as in the third embodiment, in a case where the video signal is corrected to the video signal at the minimum gray-scale level Cmin, if the correction voltage is changed, the same correction is carried out.

As described above, the video processing circuit 30 of this embodiment is different from the configuration of the fourth embodiment in that the number of bright pixels as a correction target in the correction unit 306 and the correction voltage are changed.

The determination unit 3043 determines whether or not the pixel represented by the video signal Vid-d is a bright pixel contiguous to the risk boundary extracted by the second detection unit 3042. When the determination result is "Yes", the determination unit 3043 outputs the output signal with the flag Q of "1" in the period corresponding to the first and second fields for s (in this embodiment, s=2) continuous bright pixels in the opposite direction of the risk boundary from the bright pixel. When the determination result is "No", the determination unit 3043 outputs the output signal with the flag Q of "0" in the period corresponding to the third and fourth fields when the determination result is "Yes".

When the flag Q supplied from the determination unit 3043 is "1", the correction unit 306 corrects the video signal Vid-d of the bright pixel to the video signal at the middle gray-scale level Cmid, and outputs the corrected video signal as the video signal Vid-out. Thus, in the video signal Vid-out corrected by the correction unit 306, the period in which the risk boundary contiguous to the bright pixel is present in one frame period becomes shorter than the video signal Vid-in. When the flag Q is "0", the correction unit 306 does not correct the video signal, and directly outputs the video signal Vid-d as the video signal Vid-out.

A specific example of the correction process in the video processing circuit 30 will be described.

Figure 21:
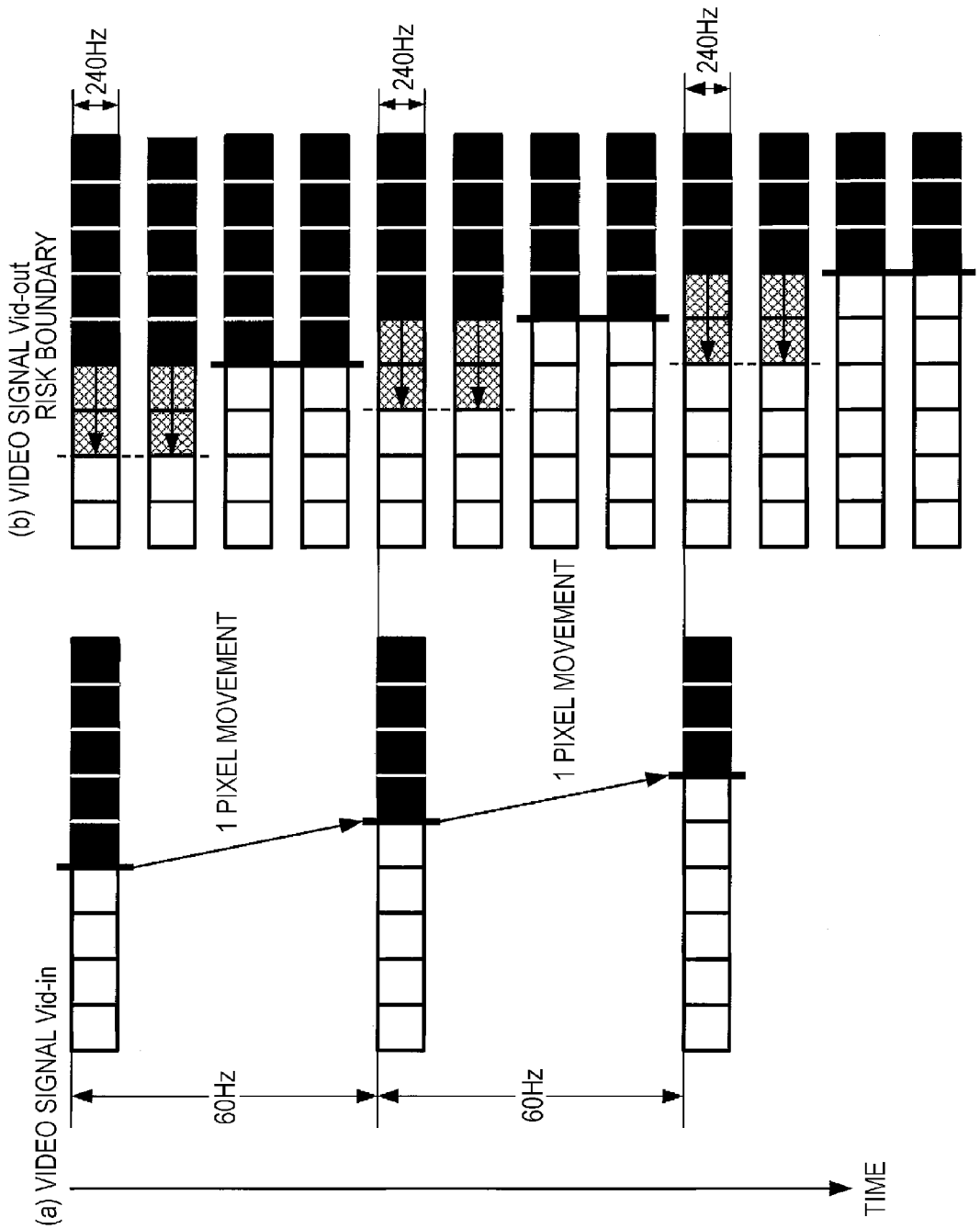
FIG. 21 illustrates diagrams showing the configuration of a video processing circuit according to a fifth embodiment of the invention.

In this embodiment, when a video signal Vid-in which defines an image having a content shown in FIG. 21(a) is supplied, the video signal Vid-in is corrected to a video signal Vid-out shown in FIG. 21(b). As shown in FIG. 21(b), in this embodiment, in the first and second fields which are the first half of each frame, two continuous bright pixels on the opposite side of the risk boundary from a bright pixel contiguous to a risk boundary are replaced with pixels at the middle gray-scale level Cmid. Thus, a boundary is not generated between a dark pixel and a bright pixel over two fields. Therefore, in this case, a reverse tilt domain is hard to be generated.

When the image represented by the video signal Vid-in is as shown in FIG. 12(1), and as shown in FIG. 12(3), the second detection unit 3042 detects the risk boundary, the correction unit 306 corrects the video signal to the video signal at the middle gray-scale level Cmid in a portion (in this case, two fields) of one frame for an obliquely hatched bright pixel in FIG. 22(a).

In the same way to think as in the first embodiment, when THETAb=90 degrees, pixels which satisfy the correction condition in the image shown in FIG. 12(1) are as shown in FIG. 22(b). When THETAb=225 degrees, pixels which satisfy the correction condition in the image shown in FIG. 12(2) are as shown in FIG. 22(c).

According to this embodiment, it is possible to make a change in the applied voltage due to the correction of the video signals of a plurality of pixels contiguous to the risk boundary unnoticeable. According to the configuration of this embodiment, in addition to the above, the same effects as in the fourth embodiment are achieved.

Sixth Embodiment

Next, a sixth embodiment of the invention will be described.

In the following description, the same parts as those in the first embodiment are represented by the same reference numerals, and description thereof will not be repeated appropriately. In this embodiment, both of the correction of the dark pixel described in the first to third embodiments and the correction of the bright pixel described in the fourth and fifth embodiments are performed. Hereinafter, description will be provided as to a case where a dark pixel is corrected as in the third embodiment and a bright pixel is corrected as in the fifth embodiment.

The video processing circuit 30 of this embodiment is different from the video processing circuit 30 of the first embodiment in that the determination content of the determination unit 3043 is changed, and a pixel as a correction target in the correction unit 306 is changed.

The determination unit 3043 performs both types of determination described in the above-described third and fifth embodiments. That is, the determination unit 3043 outputs the output signal with the flag Q of "1" in the period corresponding to the first and second fields for r (in this embodiment, r=2) continuous dark pixels in the opposite direction of the risk boundary from a dark pixel contiguous to the risk boundary extracted by the second detection unit 3042, and also outputs the output signal with the flag Q of "1" in the period corresponding to the first and second fields for s (in this embodiment, s=2) continuous bright pixels in the opposite direction of the risk boundary from a bright pixel contiguous to the risk boundary. On the other hand, the determination unit 3043 outputs the output signal with the flag Q of "0" for other pixels.

When the flag Q supplied from the determination unit 3043 is "1", the correction unit 306 corrects a video signal of a bright pixel when the flag Q is "1" to the video signal at the gray-scale level Cmid, and outputs the corrected video signal as the video signal Vid-out. Thus, in the video signal Vid-out corrected by the correction unit 306, the period in which the risk boundary contiguous to the dark pixel and the bright pixel is present in one frame period becomes shorter than the video signal Vid-in. When the flag Q is "0", the correction unit 306 does not correct the video signal, and directly outputs the video signal Vid-d as the video signal Vid-out.

A specific example of the correction process in the video processing circuit 30 will be described.

Figure 23:
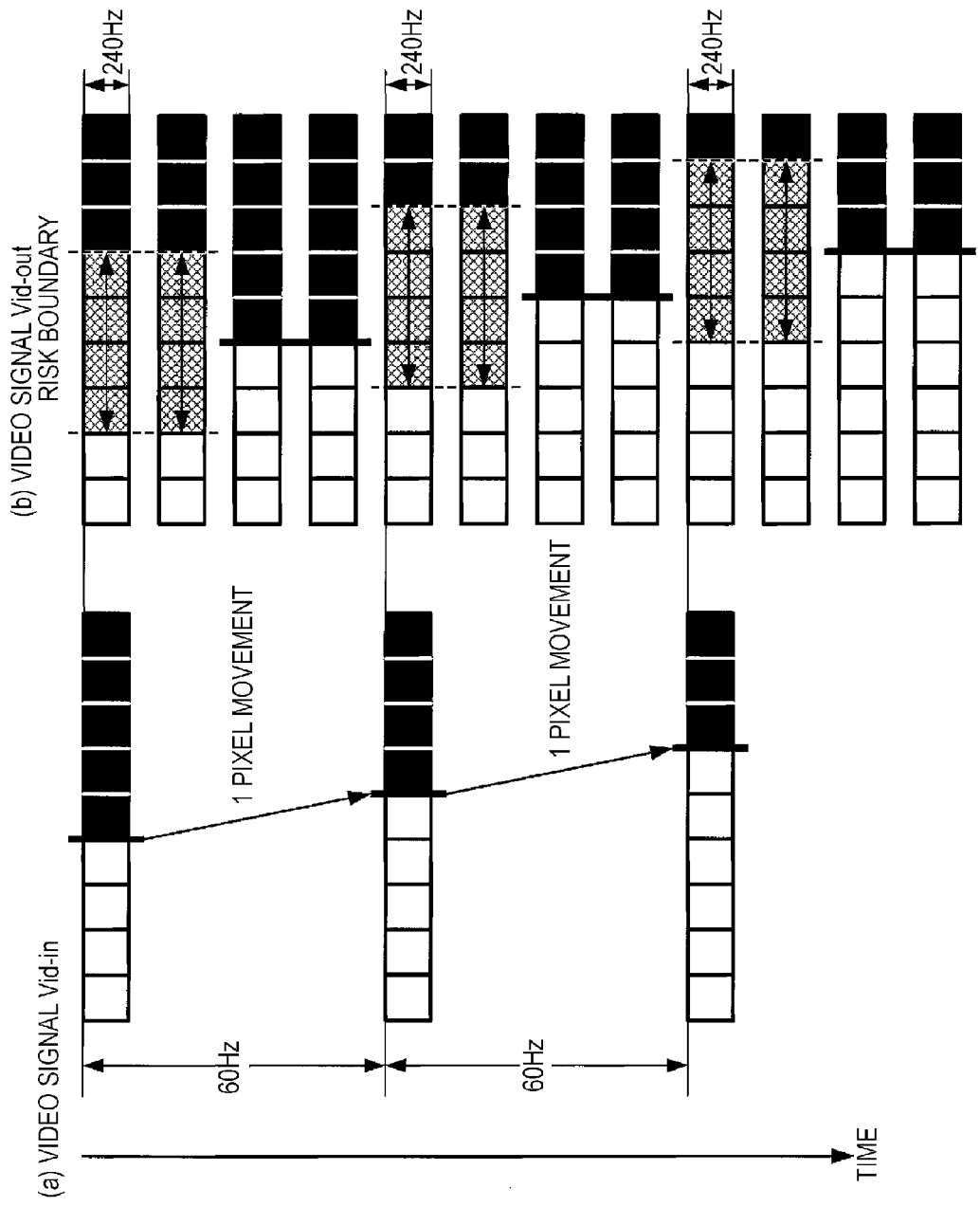
FIG. 23 illustrates explanatory views of the outline of a correction process of a video processing circuit according to a sixth embodiment of the invention.

In this embodiment, when a video signal Vid-in which defines an image shown in FIG. 23(*a*) is supplied, the video signal Vid-in is corrected to a video signal Vid-out shown in FIG. 23(*b*). As shown in FIG. 23(*b*), in this embodiment, in the first and second fields which are the first half of each frame, two continuous bright pixels on the opposite side of the risk boundary from a bright pixel contiguous to the risk boundary are replaced with pixels at the middle gray-scale level Cmid, and two continuous dark pixels on the opposite side of the risk boundary from a dark pixel contiguous to the risk boundary are replaced with pixels at the middle gray-scale level Cmid. Thus, a boundary is not generated between a dark pixel and a bright pixel over two fields. Therefore, in this case, the period in which the risk boundary is present at the same position is 8.33 milliseconds which is half compared to a case where the correction of the correction unit 306 is not performed, and a reverse tilt domain is hard to be generated.

When the image represented by the video signal Vid-in is as shown in FIG. 12(1), and as shown in FIG. 12(3), the second detection unit 3042 detects the risk boundary, the correction unit 306 corrects the video signal to the video signal at the middle gray-scale level Cmid in a portion (in this case, two fields) of one frame for a dot-hatched dark pixel and an obliquely hatched bright pixel in FIG. 24(*a*).

In the same way to think as in the first embodiment, when THETAb=90 degrees, pixels which satisfy the correction condition in the image shown in FIG. 12(1) are as shown in FIG. 24(*b*). When THETAb=225 degrees, pixels which satisfy the correction condition in the image shown in FIG. 12(2) are as shown in FIG. 24(*c*).

According to this embodiment, the same effects as in the third and fifth embodiments are achieved, and the effect of suppressing a reverse tilt domain increases compared to a case where either a bright pixel or a dark pixel is a correction target. The configuration for correcting a video signal of a dark pixel as in the first and second embodiments and the configuration for correcting a video signal of a bright pixel as in the fourth embodiment may be appropriately combined to correct video signals of both of a dark pixel and a bright pixel.

Seventh Embodiment

Next, a seventh embodiment of the invention will be described.

When movement is involved in an image, in a pixel contiguous to a risk boundary in an image of a current frame represented by a video signal Vid-in, if movement including a previous frame one frame before the current frame is taken into consideration, it is necessary to correct the video signal or it is not necessary to correct the video signal. In this embodiment, in a configuration in which video signals of a dark pixel and a bright pixel are corrected as in the sixth embodiment, a correction-target pixel is determined taking into consideration movement of the image from the previous frame to the current frame. In the following description, the same parts as those in the sixth embodiment are represented by the same reference numerals, and description thereof will not be repeated appropriately.

Figure 25:
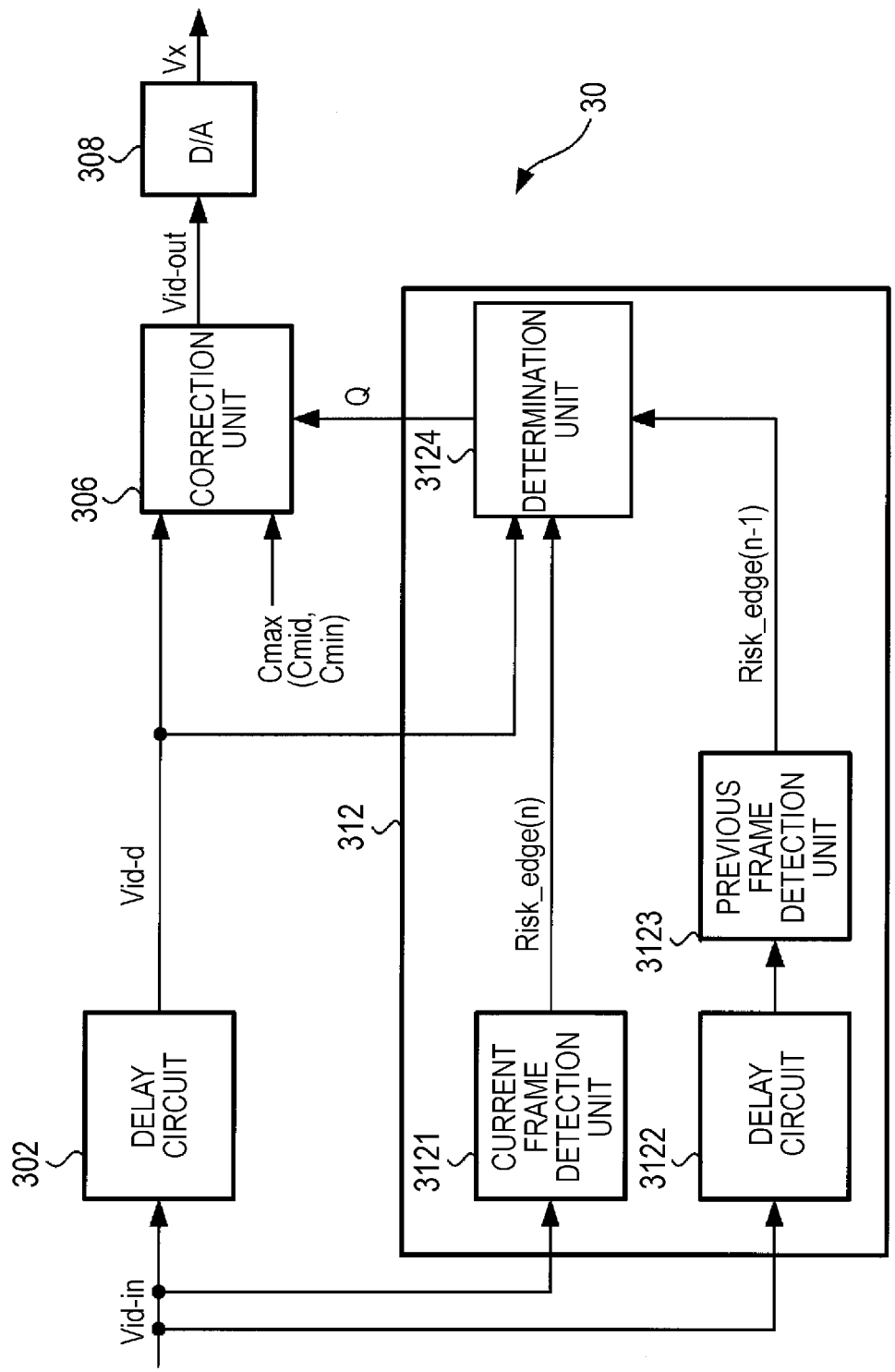
FIG. 25 is a diagram showing the configuration of a video processing circuit according to a seventh embodiment of the invention.

Next, the details of the video processing circuit 30 will be described with reference to FIG. 25. As shown in FIG. 25, the video processing circuit 30 includes a delay circuit 302, a boundary detection unit 312, a correction unit 306, and a D/A converter 308.

In this embodiment, the boundary detection unit 312 includes a current frame detection unit 3121, a delay circuit 3122, a previous frame detection unit 3123, and a determination unit 3124.

The current frame detection unit 3121 analyzes the image represented by the video signal Vid-in in the current frame, and determines whether or not there is a portion where a dark pixel (first pixel) in a gray-scale range a and a bright pixel (second pixel) in a gray-scale range b are adjacent to each other in the vertical or horizontal direction. When it is determined that there is an adjacent portion, the current frame detection unit 3121 detects the adjacent portion as a risk boundary, and outputs positional information Risk_edge (n) of the risk boundary.

The delay circuit 3122 has the same configuration as the delay circuit 302, and delays and outputs the supplied video signal Vid-in by one frame period.

The previous frame detection unit 3123 analyzes the image represented by the video signal Vid-in in the previous frame output from the delay circuit 3122, and determines whether or not there is a portion where a dark pixel and a bright pixel are adjacent to each other in the vertical or horizontal direction. When it is determined that there is an adjacent portion, the previous frame detection unit 3123 detects the adjacent portion as a risk boundary, and outputs positional information Risk_edge(n−1) of the risk boundary.

The determination unit 3124 determines whether or not a pixel represented by the video signal Vid-d is a bright pixel or a dark pixel contiguous to the risk boundary extracted by the previous frame detection unit 3123 on the basis of the positional information Risk_edge(n) and Risk_edge(n−1) output from the current frame detection unit 3121 and the previous frame detection unit 3123, and whether or not the pixel is contiguous to the risk boundary which is changed from the previous frame to the current frame. That is, the determination unit 3124 functions as a movement detection unit which performs a movement detection step of detecting movement of the image by the risk boundary which is changed from the previous frame to the current frame.

When the determination result is "Yes", the determination unit 3124 outputs the output signal with the flag Q of "1" in the period corresponding to the first and second fields for r (in this embodiment, r=2) continuous dark pixels in the opposite direction of the risk boundary from the dark pixel, and also outputs the output signal with the flag Q of "1" in the period corresponding to the first and second fields for s (in this embodiment, s=2) continuous bright pixels in the opposite direction of the risk boundary from the bright pixel contiguous to the risk boundary. On the other hand, the determination unit 3143 outputs the output signal with the flag Q of "0" for other pixels.

When the flag Q supplied from the determination unit 3124 is "1", the correction unit 306 corrects the video signal Vid-d of the pixel to the video signal at the middle gray-scale level Cmid, and outputs the corrected video signal as the video signal Vid-out. Thus, in the video signal Vid-out corrected by the correction unit 306, the period in which the risk boundary contiguous to the dark pixel and the bright pixel is present in one frame period becomes shorter than the video signal Vid-in. When the flag Q is "0", the correction unit 306 does not correct the video signal, and directly outputs the video signal Vid-d as the video signal Vid-out.

A specific example of the correction process in the video processing circuit 30 will be described.

In the video processing circuit 30 of this embodiment, while the risk boundary to be detected is different from the method described in the first embodiment, how a video signal of a pixel is corrected on the basis of the risk boundary is the same as in the above-described sixth embodiment.

Figure 26:
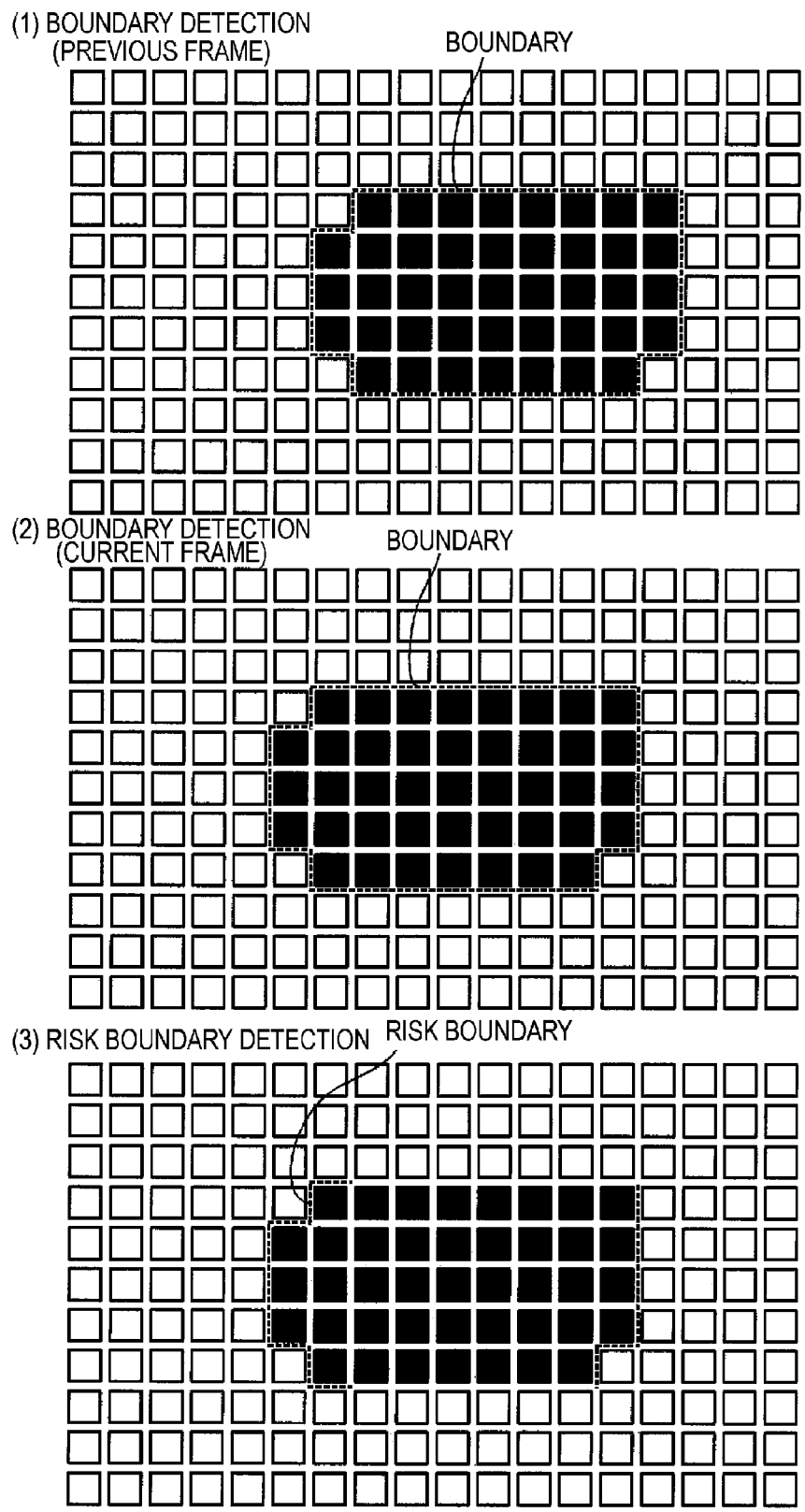
FIG. 26 illustrates explanatory views of a risk boundary detection procedure in the video processing circuit.

When the image represented by the video signal Vid-in in the previous frame is, for example, as shown in FIG. 26(1), and the image represented by the video signal Vid-in in the current frame is, for example, as shown in FIG. 26(2), that is, when a pattern having dark pixels in the gray-scale range a is scrolled in the left direction on a background having bright pixels in the gray-scale range b, a boundary detected by the previous frame detection unit 3123 is as shown in FIG. 26(1), and a boundary detected by the current frame detection unit 3121 is as shown in FIG. 26(2). In the boundary detected by the current frame detection unit 3121, a portion which does not overlap the boundary detected by the previous frame detection unit 3123 becomes a boundary which is changed from the previous frame to the current frame. Thus, the risk boundary of this embodiment is as shown in FIG. 26(3). In the determination unit 3124, a pixel adjacent to a portion corresponding to the risk boundary of a portion where a dark pixel is on the upper and a bright pixel is on the lower and a portion where a dark pixel is on the right and a bright pixel is on the left in the changed boundary becomes a correction target.

A video signal Vid-out when the image represented by the video signal Vid-in is changed from FIG. 26(1) to FIG. 26(2) is shown in FIG. 27(a). The correction unit 306 corrects the video signal to the video signal at the middle gray-scale level Cmid in a portion (in this case, two fields) of one frame for a dot-hatched dark pixel and an obliquely hatched bright pixel in FIG. 27(a).

In the same way to think as in the first embodiment, when THETAb=90 degrees, pixels which satisfy the correction condition in the image shown in FIG. 12(1) are as shown in FIG. 27(b). When THETAb=225 degrees, pixels which satisfy the correction condition in the image shown in FIG. 24(b) are as shown in FIG. 27(c).

According to the seventh embodiment described above, the functional effects common to the above-described sixth embodiment can be achieved, and a video signal can be corrected focusing on a place where a reverse tilt domain is more likely to occur. Therefore, it is possible to effectively suppress the occurrence of a reverse tilt domain while further suppressing variation in the video signal.

Although in this embodiment, the risk boundary has been detected from the boundary changed from the previous frame to the current frame, this configuration may be applied to the configuration of the above-described first to sixth embodiments.

Eighth Embodiment

Next, an eighth embodiment of the invention will be described.

In the following description, the same parts as those in the seventh embodiment are represented by the same reference numerals, and description thereof will not be repeated appropriately.

In the above-described seventh embodiment, video signals of pixels are corrected on the basis of a bright pixel and a dark pixel adjacent to each other with a risk boundary interposed therebetween taking into consideration movement of an image. In contrast, in this embodiment, the video processing circuit 30 detects a boundary between a dark pixel and a bright pixel adjacent to each other in the current frame, and defines pixels contiguous to a risk boundary having moved from the previous frame to the current frame by one pixel (in the vertical, horizontal, or oblique direction) in the detected boundary as a correction target. As already described with reference to FIG. 35, when a region having dark pixels on a background having bright pixels moves by two or more pixels every frame, such a tailing phenomenon does not appear (or is hard to be viewed). Accordingly, the video processing circuit 30 defines pixels contiguous to the risk boundary having moved by one pixel as a correction target, and does not define other pixels as a correction target.

In this embodiment, the determination unit 3124 determines "Yes" for only the pixels contiguous to the risk boundary having moved by one pixel from the boundary detection results of the current frame detection unit 3121 and the previous frame detection unit 3123, and determines "No" for pixels contiguous to the risk boundary not having moved from the previous frame and the risk boundary having moved by two or more pixels. The functions which are realized by other units of the video processing circuit 30 are the same as in the seventh embodiment. With this configuration, as shown in FIG. 35, when an image moves by only one pixel for one frame, the correction unit 306 performs correction so as to suppress a reverse tilt domain. Otherwise, correction is not performed.

Thus, the correction unit 306 can perform correction further focusing on a place where a reverse tilt domain is more likely to occur. Therefore, it is possible to effectively suppress the occurrence of a reverse tilt domain while suppressing variation in the video signal.

In the configuration of this embodiment, the same effects as in the above-described seventh embodiment are achieved. The configuration in which a correction-target pixel is determined on the basis of the risk boundary having moved by only one pixel may also be applied to the configuration of the above-described first to sixth embodiments.

Modifications

Modification 1

Figure 28:
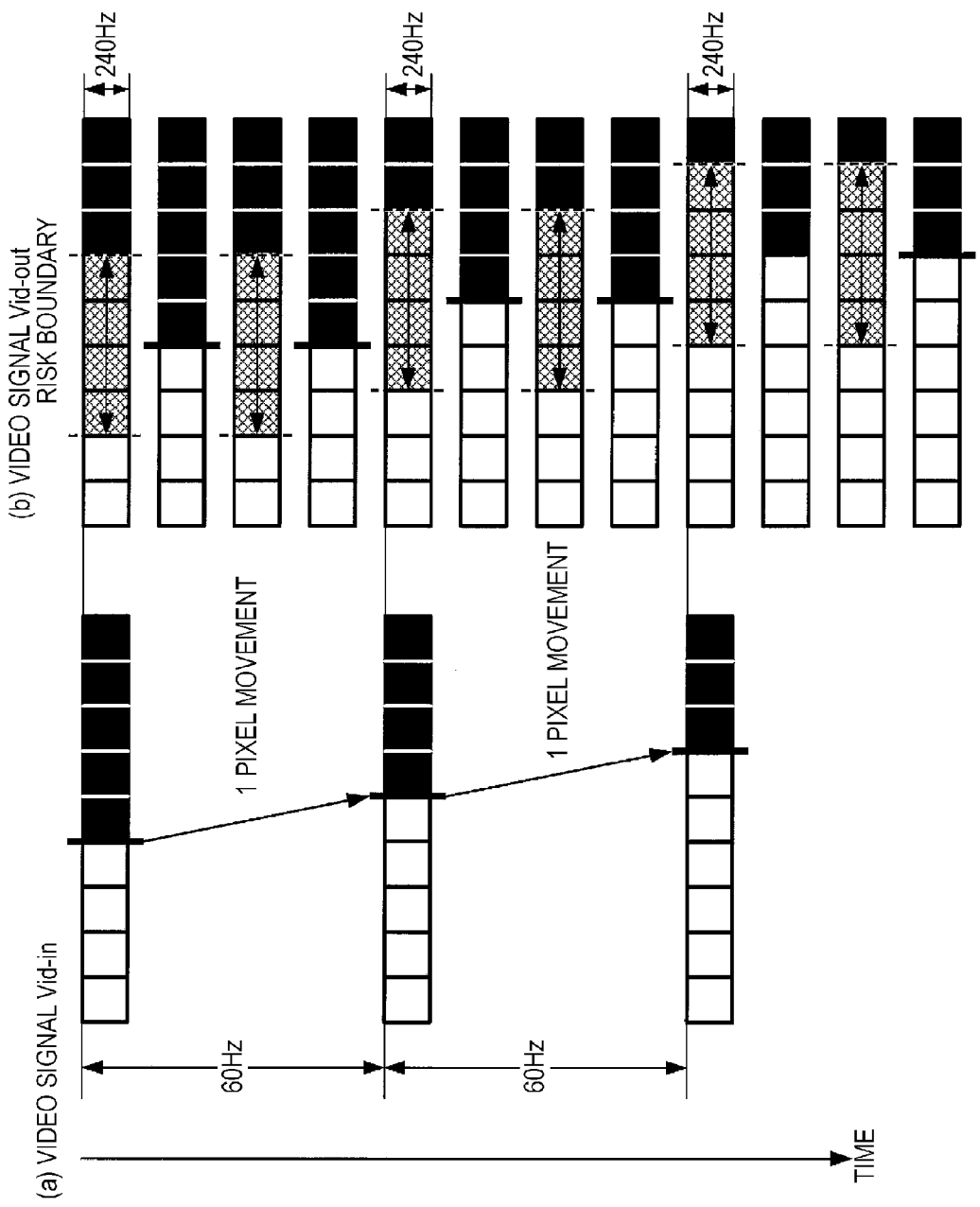
FIG. 28 illustrates diagrams showing a correction process in a video processing circuit according to a modification of the invention.

Although in the video processing circuit 30 of each embodiment, video signals are corrected in the first and second fields (or the third and fourth fields) from among the four fields constituting one frame, video signals may be corrected in other fields. For example, in an example shown in FIG. 28, the video processing circuit 30 corrects video signals in the first and third fields. With this configuration, since the period in which the risk boundary is continuous at the same position is one field (about 4.16 milliseconds) to the maximum, as in the above-described embodiments, the effect of suppressing a reverse tilt domain is achieved.

Figure 29:
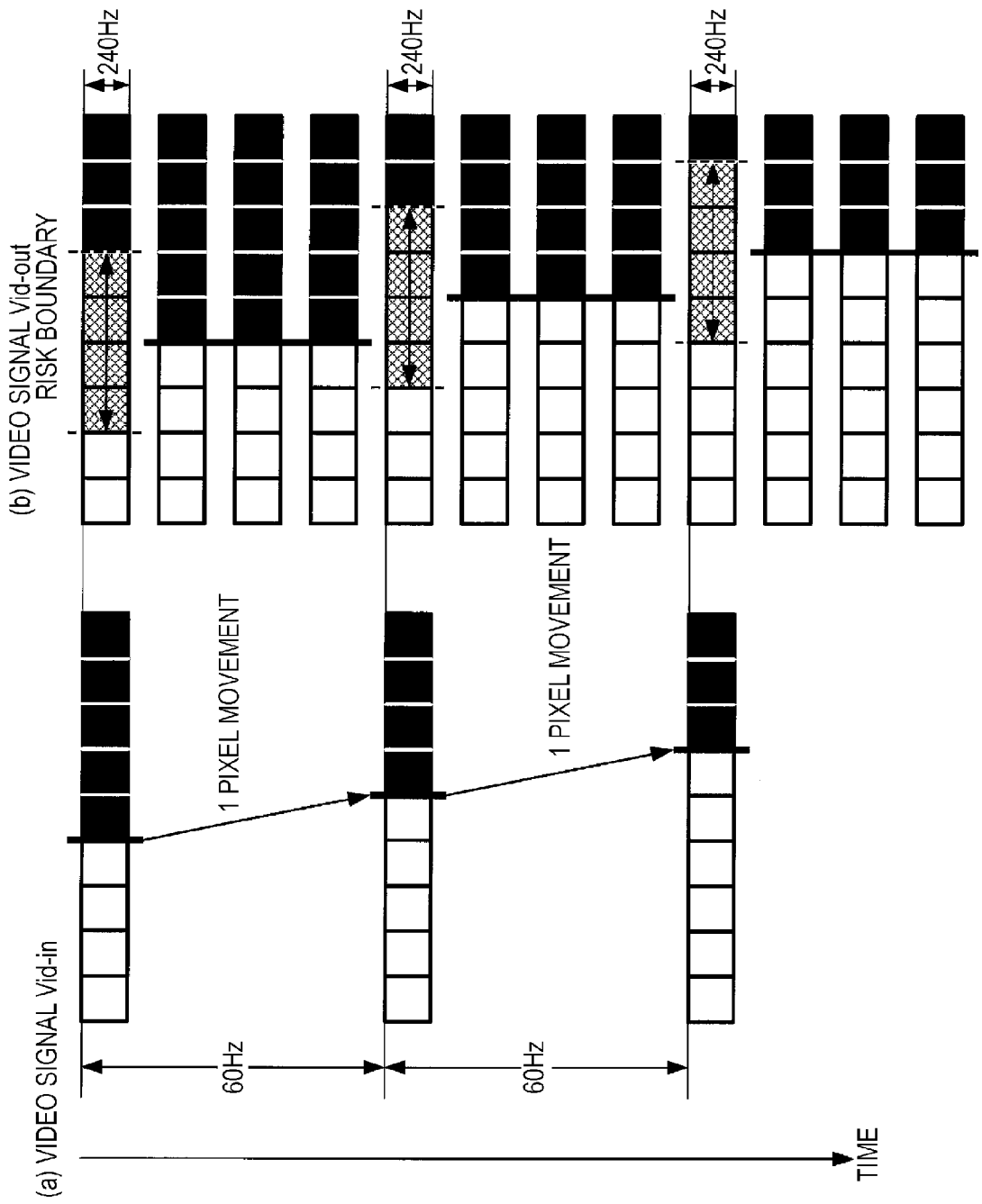
FIG. 29 illustrates diagrams showing a correction process in the video processing circuit of the modification.

Although in the video processing circuit 30 of each embodiment, video signals are corrected in two fields from among the four fields constituting one frame, video signals may be corrected using a different number of fields. For example, in an example shown in FIG. 29, the video processing circuit 30 corrects video signals only in the first field, and does not correct video signals in the second to fourth fields. With this configuration, it is possible to further suppress changes in video signals, and to further prevent the user from perceiving changes in transmittance of pixels. Video signals may be corrected in one field from among the second to fourth fields.

Figure 30:
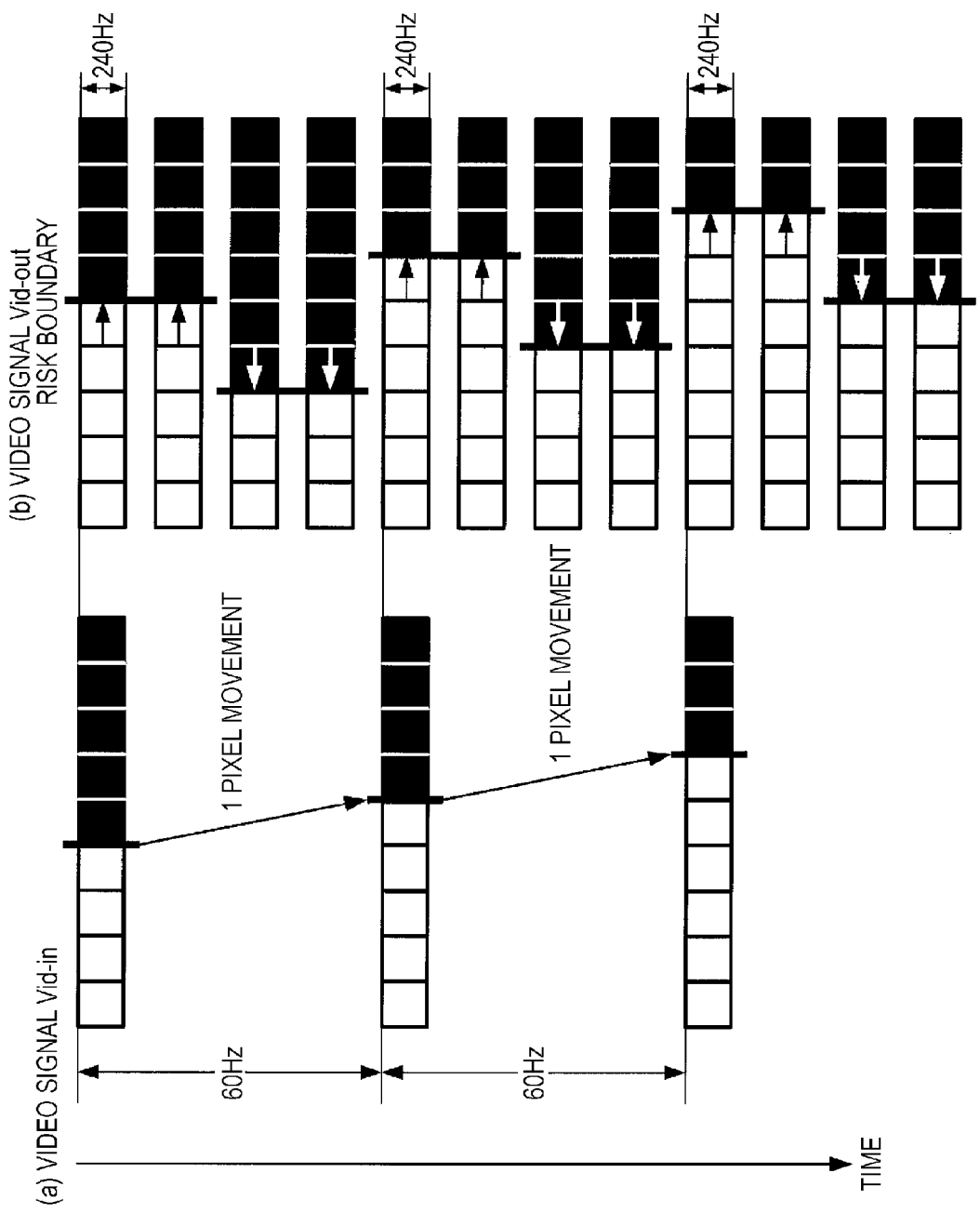
FIG. 30 illustrates diagrams showing a correction process in the video processing circuit of the modification.

The video processing circuit 30 may correct video signals in all of the four fields. For example, in an example of FIG. 30, the video processing circuit 30 corrects video signals in the first and second fields as in the first embodiment, and corrects video signals in the third and fourth fields as in the fourth embodiment. The correction processes of the first to seventh embodiments may be combined appropriately. In short, it should suffice that the video processing circuit 30 corrects video signals such that a risk boundary is present continuously at the same position in one frame period, and a risk boundary is not present at the same position over one frame.

Modification 2

In the above-described embodiments, an example has been described where the VA mode is used for the liquid crystal 105. Next, an example where the TN mode is used for the liquid crystal 105 will be described.

FIG. 31(*a*) is a diagram showing 2-by-2 pixels in a liquid crystal panel 100. FIG. 31(*b*) is a simplified sectional view taken at a vertical plane including line p-q in FIG. 31(*a*).

As shown in (a) and (b) in FIG. 31, it is assumed that, TN mode liquid crystal molecules are initially aligned at a tilt angle of THETAa and a tilt azimuth angle of THETAb (=45 degrees) in a state where the potential difference between the pixel electrode 118 and the common electrode 108 is zero. In the TN mode, contrary to the VA mode, the liquid crystal molecules tilt in the substrate horizontal direction, and therefore, the tilt angle THETAa in the TN mode is greater than the value of the VA mode.

In an example where the TN mode is used for the liquid crystal 105, there are many cases where the normally white mode in which the liquid crystal element 120 is in a white state with no application of voltage is used because a high contrast ratio and the like are obtained.

Figure 4:
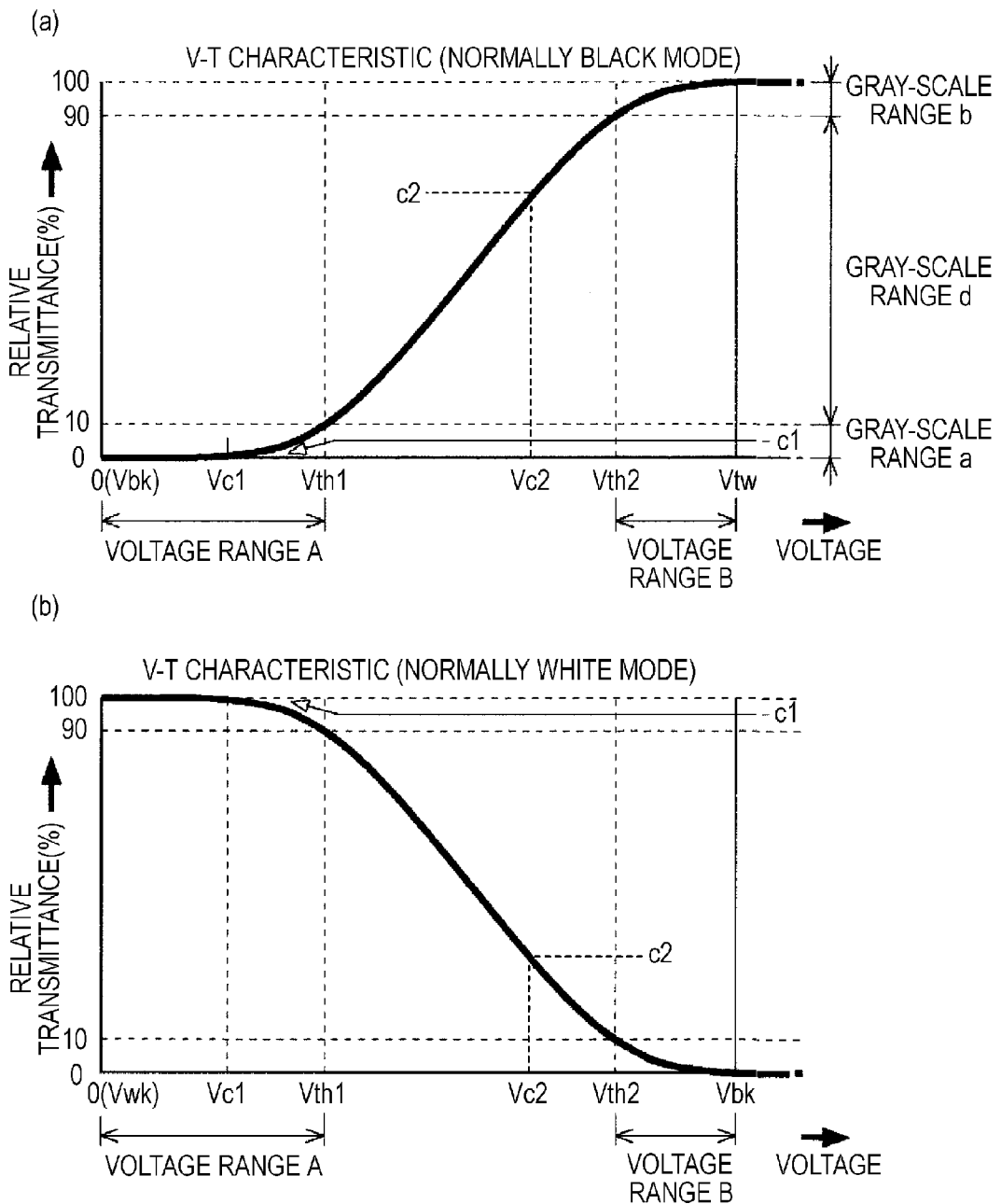
FIG. 4 illustrates diagrams showing the V-T characteristic of a liquid crystal panel constituting the liquid crystal display.

For this reason, when the TN mode is used for the liquid crystal 105 and the normally white mode is used, the relationship between the voltage to be applied to the liquid crystal element 120 and transmittance is represented by the V-T characteristic shown in FIG. 4(*b*), in which the transmittance decreases as the applied voltage increases. However, similarly to the normally black mode, when a pixel belonging to the gray-scale range a and a pixel belonging to the gray-scale range b are adjacent to each other, a risk boundary is generated, and a reverse tilt domain is generated.

In the normally white mode in the TN mode, as shown in FIG. 32(*a*), it is assumed that, in a state where all 2-by-2=4 pixels are white pixels whose liquid crystal molecules are unstable in the (n−1)th frame, only the upper right pixel is changed to a black pixel in the n-th frame. As described above, in the normally white mode, the potential difference between the pixel electrode 118 and the common electrode 108 is greater in a black pixel than in a white pixel, contrary to the normally black mode. For this reason, in the upper right pixel which is changed from white to black, as shown in FIG. 32(*b*), liquid crystal molecules attempt to rise in a direction (direction perpendicular to the substrate surface) along the electric field direction, attempting to change from a state indicated by a solid line to a state indicated by a broken line.

However, the potential difference generated in the gap between the pixel electrode 118 (Wt) of a white pixel and the pixel electrode 118 (Bk) of a black pixel is substantially the same as the potential difference generated between the pixel electrode 118 (Bk) of a black pixel and the common electrode 108, and the gap between the pixel electrodes is narrower than the gap between the pixel electrode 118 and the common electrode 108. Therefore, when compared in terms of intensity of electric field, the lateral electric field generated in the gap between the pixel electrode 118 (Wt) and the pixel electrode 118 (Bk) is stronger than the vertical electric field generated in the gap between the pixel electrode 118 (Bk) and the common electrode 108.

Since the upper right pixel is a white pixel whose liquid crystal molecules are unstable in the (n−1)th frame, it takes time for the liquid crystal molecules to tilt in accordance with the intensity of the vertical electric field. On the other hand, the lateral electric field from the adjacent pixel electrode 118 (Wt) is stronger than the vertical electric field induced by applying a voltage at black level to the pixel electrode 118 (Bk). Therefore, in the pixel to be changed to black, as shown in FIG. 31(*b*), the liquid crystal molecules Rv on the side adjacent to a white pixel is brought into the reverse tilt state earlier than other liquid crystal molecules which attempt to tilt in accordance with the vertical electric field.

The liquid crystal molecules Rv which have been earlier brought into the reverse tilt state adversely affect the movement of other liquid crystal molecules which attempt to rise in the substrate horizontal direction as indicated by a broken line. For this reason, as shown in FIG. 32(*c*), a region where reverse tilt occurs in the pixel which should be changed to black does not stay within the gap between a pixel which should be changed to black and a white pixel, and expands from the gap over a wide range so as to erode the pixel which should be changed to black.

Accordingly, from the content shown in FIG. 32, in the case where white pixels are in the vicinity of an attention pixel to be changed to black, when the white pixels are adjacent to the lower left and left of, and below the attention pixel, reverse tilt occurs in the inner peripheral region along the left edge and lower edge of the attention pixel.

Figure 33:
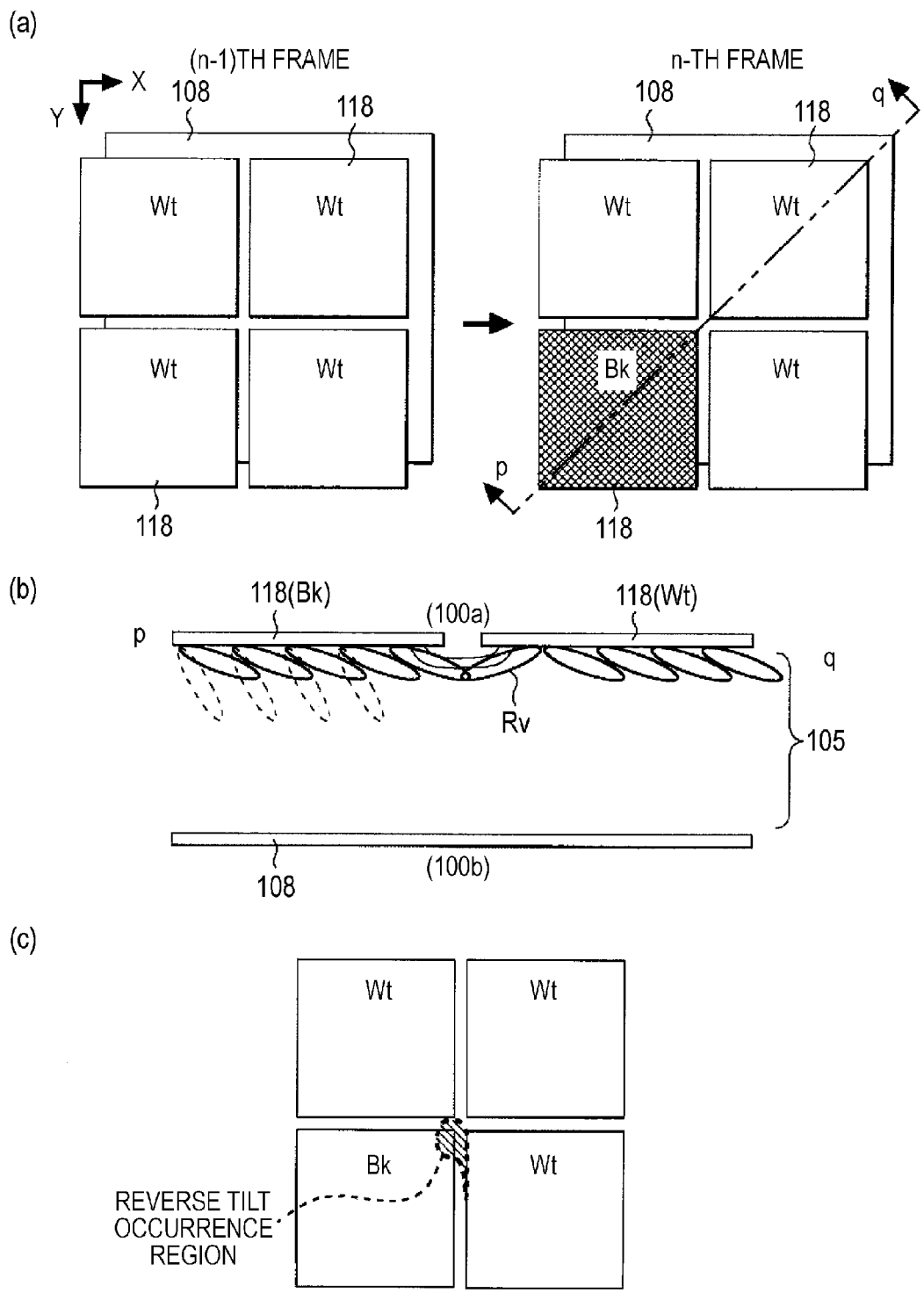
FIG. 33 illustrates explanatory views of reverse tilt which occurs in the liquid crystal panel.

As shown in FIG. 33(*a*), it is assumed that, in a state where all 2-by-2=4 pixels are white pixels whose liquid crystal molecules are unstable in the (n−1)th frame, only one lower left pixel is changed to a black pixel in the n-th frame. Also in this change, in the gap between the pixel electrode 118 (Bk) of a black pixel and the pixel electrode 118 (Wt) of a white pixel, a lateral electric field stronger than a vertical electric field in the gap between the pixel electrode 118 (Bk) and the common electrode 108 is generated. With the lateral electric field, as shown in FIG. 33(*b*), the liquid crystal molecules Rv in a white pixel and on the side adjacent to a black pixel change in alignment earlier than other liquid crystal molecules which attempt to tilt in accordance with the vertical electric field, and are brought into the reverse tilt state. In the white pixel, however, since the intensity of the vertical electric field does not change from the (n−1)th frame, the liquid crystal molecules Rv have little influence on other liquid crystal molecules. For this reason, as shown in FIG. 33(*c*), the region where reverse tilt occurs in the pixel which is not changed from a white pixel is so narrow as to be negligible compared to the example of FIG. 32(*c*).

In the lower left pixel which is changed from white to black from among the 2-by-2=4 pixels, the initial alignment direction of liquid crystal molecules is less likely to be affected by the lateral electric field. Therefore, even when the vertical electric field is applied, there are few liquid crystal molecules which are brought into the reverse tilt state. For this reason, in the lower left pixel, as the intensity of the vertical electric field increases, the liquid crystal molecules correctly rise in the direction perpendicular to the substrate surface as indicated by a broken line in FIG. 27(*b*). As a result, since the lower left pixel is changed to an intended black pixel, display quality is not deteriorated.

For this reason, in the normally white mode in which the tilt azimuth angle THETAb is 45 degrees in the TN mode, in the n-th frame, reverse tilt occurs in the dark pixel under the requirement (1) and in a case where:

(2) in the n-th frame, the dark pixel (applied voltage is high) is positioned on the upper right or right of, or above the adjacent bright pixel (applied voltage is low); and (3) in a pixel which is changed to the dark pixel in the n-th frame, the liquid crystal molecules are unstable in the (n−1)th frame one frame before the n-th frame.

Accordingly, when reconsidering the occurrence state based on the (n+1)th frame, it can be said that, even when a dark pixel satisfies the above-described positional relationship in the (n+1)th frame due to movement of an image, it is preferable to take measures such that the risk boundary contiguous to the pixel is not present continuously at the same position in one frame period in the n-th frame before change.

In the normally white mode, contrary to the normally black mode, the configuration of the video processing circuit 30 may be changed as follows taking into consideration that, the higher (brighter) the gray-scale level, the lower the voltage to be applied to the liquid crystal element.

That is, it should suffice that, in the video processing circuit 30, the second detection unit 3042, or the current frame detection unit 3121 and the previous frame detection unit 3123 which detect the risk boundary extract a portion where a dark pixel is on the lower and a bright pixel is on the upper and a portion where a dark pixel is on the left and a bright pixel is on the right in the n-th frame, and detect the portions as the risk boundary. A pixel whose video signal is corrected by the correction unit 306 on the basis of the risk boundary is as described in the above-described first to eighth embodiments.

Although in this example, an example has been described where the tilt azimuth angle THETAb is 45 degrees in the TN mode, taking into consideration that the occurrence direction of a reverse tilt domain is opposite to the VA mode, measures when the tilt azimuth angle THETAb is other than 45 degrees and the configuration therefor can also be analogized easily from the above description.

If it is assumed that the movement direction of an image pattern is only the horizontal direction, it becomes possible to simplify the configuration compared to a case where it is assumed that the movement direction of the image pattern also includes the vertical direction or the oblique direction.

Although an example has been described where the tilt azimuth angle THETAb is 45 degrees in the VA mode, the same is also applied to a case where the tilt azimuth angle THETAb is 225 degrees in the VA mode.

Modification 3

Although in the above-described embodiments, r=2 and s=2, these values are just an example. Therefore, r and s may be an integer of "2" or more, and these values may be different from each other.

The video processing circuit according to the invention is not limited to a liquid crystal display which uses four-fold speed driving, and can be applied to a liquid crystal display which uses many-fold speed driving, such as two-fold speed driving or eight-fold speed driving. In short, in the embodiment of the invention, it should suffice that, when an image is displayed on the basis of a video signal, a video signal of at least one of a bright pixel and a dark pixel is corrected in at least one of a plurality of fields constituting one frame such that a period in which a risk boundary is present in one frame period is shortened and a risk boundary is not present continuously at the same position in one frame period.

When correcting a dark pixel, the correction unit 306 corrects the video signal to a video signal which specifies a voltage equal to or higher than the threshold value Vth1 as the voltage to be applied to the liquid crystal element 120. When correcting a bright pixel, the correction unit 306 corrects the video signal to a video signal which specifies a voltage equal to or lower than the threshold value Vth2 as the voltage to be applied to the liquid crystal element 120. In this way, the effect of suppressing a reverse tilt domain is achieved.

Modification 4

Although in the above-described embodiments, the video signal Vid-in specifies the gray-scale level of a pixel, the video signal Vid-in may directly specify the voltage to be applied to the liquid crystal element. When the video signal Vid-in specifies the voltage to be applied to the liquid crystal element, a configuration may be made in which a boundary is determined by the applied voltage to be specified, and a voltage is corrected.

In the embodiments, the liquid crystal element 120 is not limited to a transmissive type, and may be a reflective type.

Modification 5

Figure 34:
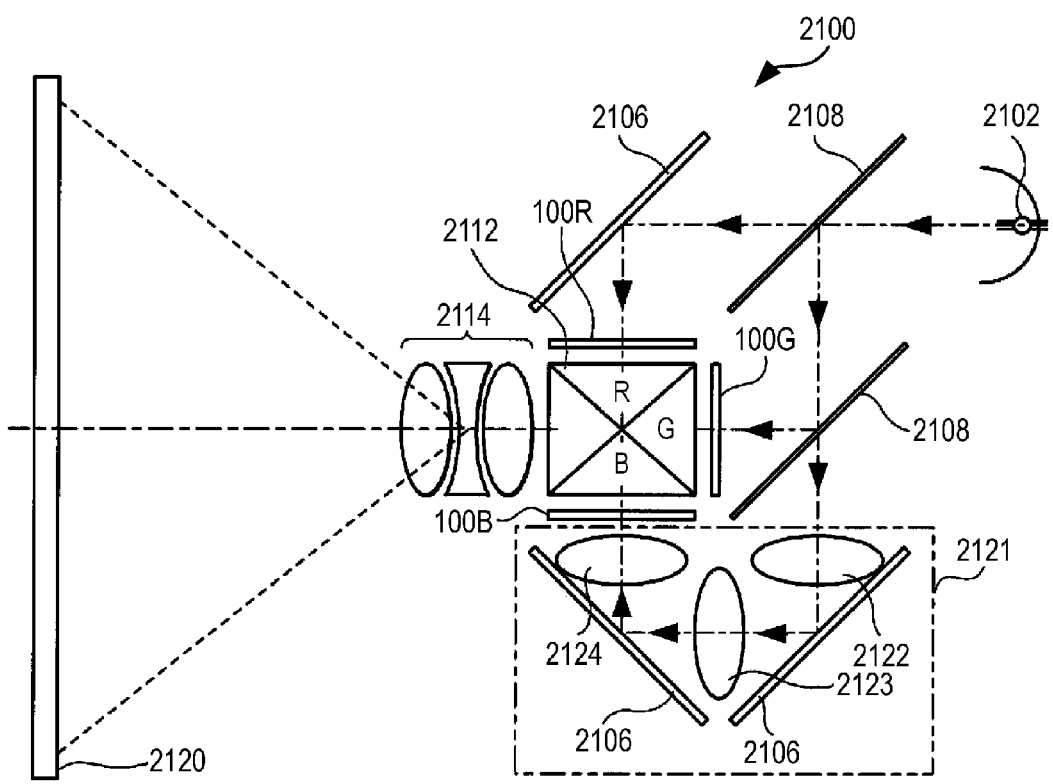
FIG. 34 is a diagram showing a projector to which a liquid crystal display is applied.

Next, a projection display device (projector) in which the liquid crystal panel 100 is used as a light valve will be described as an example of an electronic apparatus using the liquid crystal display of each embodiment described above. FIG. 34 is a plan view showing the configuration of the projector.

As shown in FIG. 34, a lamp unit 2102 including a white light source, such as a halogen lamp, is provided inside the projector 2100. Projection light emitted from the lamp unit 2102 is separated into three primary colors of R (red), G (green), and B (blue) through three mirrors 2106 and two dichroic mirrors 2108 arranged inside the projector, and separated light is guided to light valves 100R, 100G, and 100B corresponding to the respective primary colors. Since B light has an optical path longer than those of R light and G light, B light is guided through a relay lens system 2121 including an incident lens 2122, a relay lens 2123, and an exit lens 2124 so as to prevent optical loss.

In the projector 2100, three liquid crystal displays each including the liquid crystal panel 100 are provided to correspond to the respective R, G, and B colors. The configuration of each of the light valves 100R, 100G, and 100B is the same as that of the liquid crystal panel 100. Video signals that specify gray-scale levels of primary color components of the respective R, G, and B colors are supplied from an external higher-level circuit to drive the light valves 100R, 100G, and 100B.

Light modulated by the light valves 100R, 100G, and 100B is incident on a dichroic prism 2112 in three directions. In the dichroic prism 2112, R light and B light are refracted at 90 degrees, while G light goes straight. Accordingly, images of respective primary colors are combined, and then a color image is projected onto a screen 2120 by a projection lens 2114.

Since light corresponding to the respective primary colors of R, G, and B is incident on the light valves 100R, 100G, and 100B by the dichroic mirrors 2108, there is no need to provide color filters. Transmission images of the light valves 100R and 100B are reflected by the dichroic prism 2112 and then projected, while a transmission image of the light valve 100G is projected directly. Therefore, the horizontal scanning direction by the light valves 100R and 100B is opposite to the horizontal scanning direction by the light valve 100G to display a mirror image.

Examples of electronic apparatuses include, in addition to the projector described with reference to FIG. 34, a television, a view-finder or monitor-direct-view video tape recorder, a car navigation system, a pager, an electronic organizer, an electronic calculator, a word processor, a work station, a video phone, a POS terminal, a digital still camera, a mobile phone, and an apparatus including a touch panel, and the like. The liquid crystal display is of course applicable to various electronic apparatuses.

REFERENCE SIGNS LIST

1: liquid crystal display, 30: video processing circuit, 100: liquid crystal panel, 100a: element substrate, 100b: counter substrate, 105: liquid crystal, 108: common electrode, 118: pixel electrode, 120: liquid crystal element, 302: delay circuit, 304: boundary detection unit, 3041: first boundary detection unit, 3042: second boundary detection unit, 3043: determination unit, 306: correction unit, 308: D/A converter, 312: boundary detection unit, 3121: current frame detection unit, 3122: delay circuit, 3123: previous frame detection unit, 3124: determination unit, 2100: projector.

The invention claimed is:

1. A video processing method which corrects a video signal, the method comprising:
    specifying a voltage to be applied to a liquid crystal element for each pixel and defines the voltage to be applied to the liquid crystal element on the basis of the corrected video signal, the method comprising:
    a risk boundary detection step of detecting a risk boundary which is a portion of the boundary between a first pixel whose applied voltage specified by the video signal falls below a first voltage and a second pixel whose applied voltage exceeds a second voltage higher than the first voltage, and is determined by a tilt azimuth of the liquid crystal; and
    a correction step of correcting the video signal, in at least one field of a plurality of fields constituting one frame so that a period in which the risk boundary is present in one frame period is shortened,
    wherein in one field of one frame the video signal is corrected, whereas in other field of the one frame the video signal is not corrected.

2. The method according to claim 1,
    wherein, in the correction step, a video signal which specifies a voltage to be applied to a liquid crystal element corresponding to the first pixel adjacent to the risk boundary detected in the risk boundary detection step or liquid crystal elements corresponding to r (where r is an integer of 2 or more) continuous first pixels on an opposite side of the risk boundary from the first pixel is corrected to a video signal which specifies the first voltage or higher in any field.

3. The method according to claim 2,
    wherein, in the correction step, a video signal corresponding to the first pixel as a correction target is corrected to a video signal of the maximum gray-scale level.

4. The method according to claim 1,
    wherein, in the correction step, a video signal which specifies a voltage to be applied to a liquid crystal element corresponding to the second pixel adjacent to the risk boundary detected in the risk boundary detection step or liquid crystal elements corresponding to s (where s is an integer of 2 or more) continuous second pixels on an opposite side of the risk boundary from the second pixel is corrected to a video signal which specifies the second voltage or lower in any field.

5. The method according to claim 4,
    wherein, in the correction step, a video signal corresponding to the second pixel as a correction target is corrected to a video signal of the minimum gray-scale level.

6. The method according to claim 1,
    wherein, in the correction step, a video signal which specifies a voltage to be applied to a liquid crystal element corresponding to the first pixel adjacent to the risk boundary detected in the risk boundary detection step or liquid crystal elements corresponding to r (where r is an integer of 2 or more) continuous first pixels on an opposite side of the risk boundary from the first pixel is corrected to a video signal which specifies the first voltage or higher in any field, and
    a video signal which specifies a voltage to be applied to a liquid crystal element corresponding to the second pixel adjacent to the detected risk boundary or liquid crystal elements corresponding to s (where s is an integer of 2 or more) continuous second pixels on an opposite side of the risk boundary from the second pixel is corrected to a video signal which specifies the second voltage or lower in the field.

7. The method according to claim 1, further comprising:
    a movement detection step of detecting a boundary, which changes from a previous frame one frame before a current frame to the current frame, from among the boundaries between the first pixel and the second pixel,
    wherein, in the correction step, the video signal corresponding to a correction-target pixel determined by the risk boundary detected in the risk boundary detection step in the boundary detected in the movement detection step is corrected.

8. The method according to claim 7,
    wherein, in the correction step, the video signal corresponding to a correction-target pixel determined by the risk boundary moved pixel by pixel from a previous frame to a current frame in the boundary detected in the movement detection step is corrected.

9. The method according to claim 1,
    wherein, in the correction step, the video signal corresponding to a correction-target pixel is not corrected in any field of a plurality of fields.

10. The method according to claim 1,
    wherein, in the correction step, the video signal corresponding to a correction-target pixel is corrected for each of a plurality of fields.

11. A video processing circuit which corrects a video signal specifying a voltage to be applied to a liquid crystal element for each pixel and defines the voltage to be applied to the liquid crystal element on the basis of the corrected video signal, the video processing circuit comprising:
    a risk boundary detection unit which detects a risk boundary which is a portion of the boundary between a first pixel whose applied voltage specified by the video signal falls below a first voltage and a second pixel whose applied voltage exceeds a second voltage higher than the first voltage, and is determined by a tilt azimuth of the liquid crystal; and
    a correction unit which corrects the video signal in at least one field of a plurality of fields constituting one frame so that a period in which the risk boundary is present in one frame period is shortened, wherein in one field of one frame, the video signal is corrected, whereas in other field of the one frame the video signal is not corrected.

12. A liquid crystal display comprising:
a liquid crystal panel which has liquid crystal elements with liquid crystal interposed between pixel electrodes provided to correspond to a plurality of pixels in a first substrate and a common electrode provided in a second substrate;
a video processing circuit which corrects a video signal specifying a voltage to be applied to a liquid crystal element for each pixel and defines the voltage to be applied to the liquid crystal element on the basis of the corrected video signal,
wherein the video processing circuit includes
a risk boundary detection unit which detects a risk boundary which is a portion of the boundary between a first pixel whose applied voltage specified by the video signal falls below a first voltage and a second pixel whose applied voltage exceeds a second voltage higher than the first voltage, and is determined by a tilt azimuth of the liquid crystal, and
a correction unit which corrects the video signal in at least one field of a plurality of fields constituting one frame so that a period in which the risk boundary is present in one frame period is shortened,
wherein in one field of one frame the video signal is corrected, whereas in other field of the one frame the video signal is not corrected.

13. An electronic apparatus comprising:
the liquid crystal display according to claim 12.

\* \* \* \* \*